United States Patent [19]
Horie et al.

[11] Patent Number: 5,138,687
[45] Date of Patent: Aug. 11, 1992

[54] RIB OPTICAL WAVEGUIDE AND METHOD OF MANUFACTURING THE SAME

[75] Inventors: Noriyoshi Horie, Moriyama; Hayami Hosokawa, Yawata; Masami Tada, Takatsuki; Tsukasa Yamashita, Nara; Tatsuo Ohgaki, Takatsuki; Hironobu Kiyomoto, Nara, all of Japan

[73] Assignee: Omron Corporation, Kyoto, Japan

[21] Appl. No.: 588,332

[22] Filed: Sep. 26, 1990

[30] Foreign Application Priority Data

| Sep. 26, 1989 | [JP] | Japan | 1-248107 |
| Nov. 29, 1989 | [JP] | Japan | 1-307757 |
| Nov. 29, 1989 | [JP] | Japan | 1-307758 |
| Nov. 29, 1989 | [JP] | Japan | 1-307759 |
| Nov. 29, 1989 | [JP] | Japan | 1-307760 |
| Dec. 15, 1989 | [JP] | Japan | 1-323805 |
| Dec. 28, 1989 | [JP] | Japan | 1-338702 |
| Dec. 28, 1989 | [JP] | Japan | 1-338704 |
| Feb. 27, 1990 | [JP] | Japan | 2-44527 |
| May 18, 1990 | [JP] | Japan | 2-126943 |
| Jul. 12, 1990 | [JP] | Japan | 2-186646 |
| Jul. 18, 1990 | [JP] | Japan | 2-191669 |
| Jul. 26, 1990 | [JP] | Japan | 2-196262 |
| Jul. 26, 1990 | [JP] | Japan | 2-196263 |
| Aug. 9, 1990 | [JP] | Japan | 2-209261 |
| Aug. 22, 1990 | [JP] | Japan | 2-219009 |

[51] Int. Cl.$^5$ .............................. G02B 6/12; G02B 6/10
[52] U.S. Cl. .................................. 385/129; 385/131
[58] Field of Search ........................ 350/96.11–96.14

[56] References Cited

U.S. PATENT DOCUMENTS

| 3,984,173 | 10/1976 | Shaw | 350/96.12 |
| 4,376,160 | 3/1983 | Evanchuk | 430/321 |
| 4,420,873 | 12/1983 | Leonberger et al. | 350/96.12 X |
| 4,518,219 | 5/1985 | Leonberger et al. | 350/96.12 |
| 4,652,290 | 3/1987 | Cho et al. | 350/96.12 X |
| 4,701,008 | 10/1987 | Richard et al. | 350/96.12 |
| 4,776,655 | 10/1988 | Robertson et al. | 350/96.12 |
| 4,789,642 | 12/1988 | Lorenzo et al. | 350/96.12 X |
| 4,929,302 | 5/1990 | Valette | 350/96.12 X |
| 4,938,553 | 7/1990 | Maerz et al. | 350/96.12 X |

OTHER PUBLICATIONS

Journal of Applied Physics, vol. 45, No. 10, Oct. 1974, "Submicrometer resolution replication of relief patterns for integrated optics".

2nd European Conference on Integrated Optics, Oct. 17–18, 1983; pp. 108–111; K. Tiefenthaler and W. Lukosz: "Embossing Technique for Fabricating 10 Components . . . ".

Patent Abstracts of Japan, vol. 10, No. 101 (P-447)(2158), Apr. 17, 1986; & Abstract-JP-A-60 232 509 (Nippon Denshin Denwa Kosha).

H. Kiyomoto et al. "Characteristics of Single Mode Channel Waveguide Fabricated by Photopolymerization", and H. Hosokawa et al., Simultaneous Fabrication of Grating Couplers and an Optical Waveguide by Photopolymerization, JSAP Cat. No. AP901110-03, p. 973, 31p-F-11 and p. 974, 31p-F-12, respectively, Mar. 29–31, 1990.

H. Hosokawa et al. "Simultaneous Fabrication of Grating Couplers and an Optical Waveguide by Photopolymerization", 1990 Technical Digest Series vol. 5, p. 26, MF6, Mar. 26–28, 1990 Hilton Head, S.C.

Newspaper "Kagaku Kogyo Nippo", Apr. 13, 1990.

(List continued on next page.)

Primary Examiner—Akm E. Ullah
Attorney, Agent, or Firm—Dickstein, Shapiro & Morin

[57] ABSTRACT

On a substrate (1), a core layer (2) is formed such that the core layer (2) includes a rib section (2a) fabricated to be integral therewith. The core layer (2) and the rib section (2a) are formed with a liquid material to be solidified under an energy irradiation, for example, a UV-setting resin. A clad layer (3) is disposed on the core layer (2). A buffer layer (4) is formed between the core layer (2) and the substrate (1).

99 Claims, 63 Drawing Sheets

OTHER PUBLICATIONS

H. Sunagawa et al. "Waveguide-Type Differential Detection Device for Magneto-optical Disk Pickup", material QQE86-177 of Quantum Electronics Group published from the IECE of Japan, as stated in the Spec. at p. 10.

C. T. Ting et al. "Study of Planarized Sputter-deposited $SiO_2$", J. Vac. Sci. Technol. 15 (3), May/Jun. 1978, p. 1105, Spec at p. 152.

T. Mogami et al. "$SiO_2$ Planarization by Two-Step rf Bias-Sputtering", J. Vac. Sci. Tech. B3 (3), May/Jun. 1985, p. 857-Spec at p. 152.

H. Hosokawa et al. "Novel Single Mode Channel Waveguide Fabricated by Photopolymerization for Integrated Optic Sensors", Proceedings of the 6th Intern'l Conference, OFS '89, Paris, France, Sep. 18-20, 1989. Springer Proceedings in Physics, vol. 44, Optical Fiber Sensors, p. 30.

H. Hosokawa et al. "Single Mode Channel Waveguide Fabricated by Photopolymerization", JSAP Catalog No. AP 891123-03, p. 962, 30a-ZH-5, Sep. 27-30, 1989.

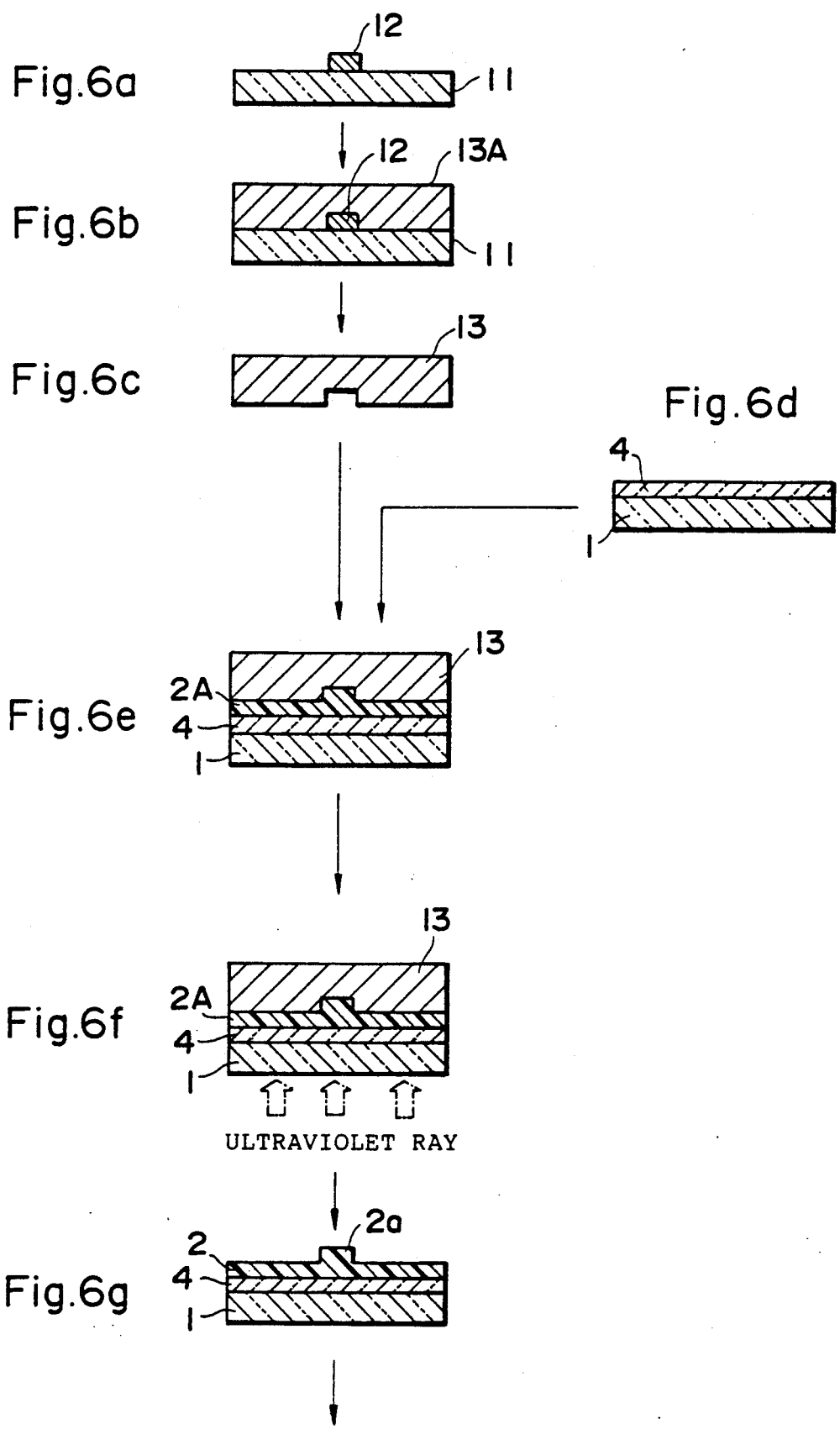

Fig.12
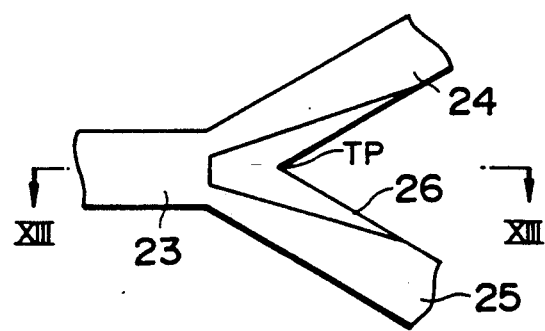
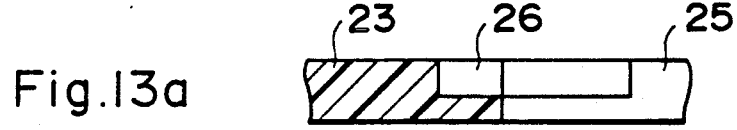
Fig.13a
Fig.13b
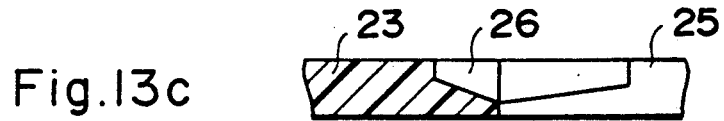
Fig.13c
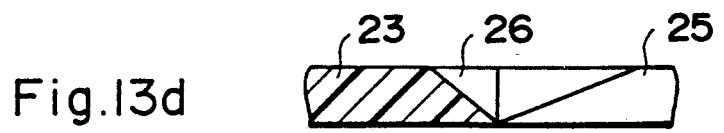
Fig.13d
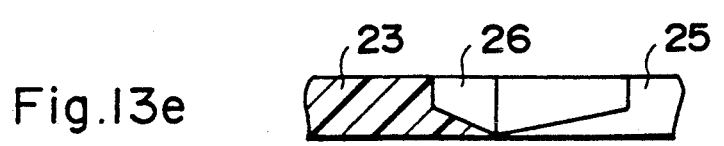
Fig.13e

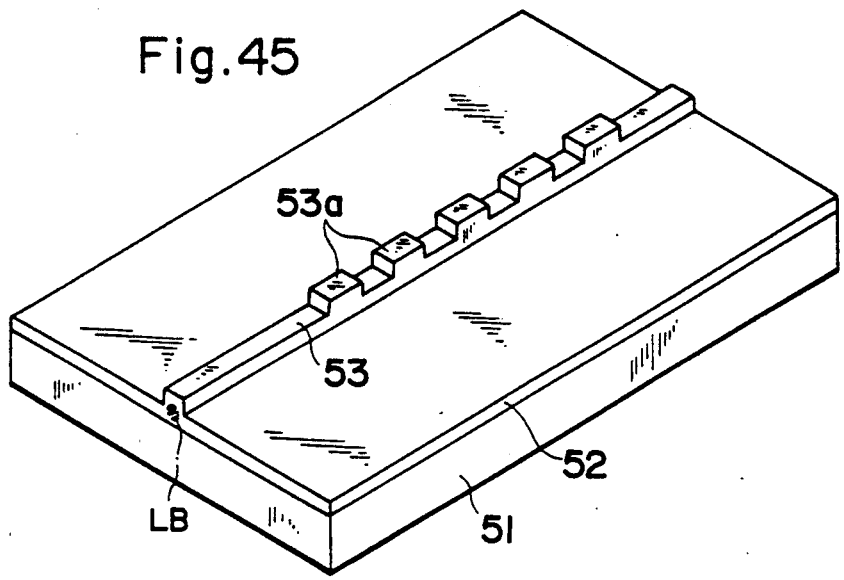
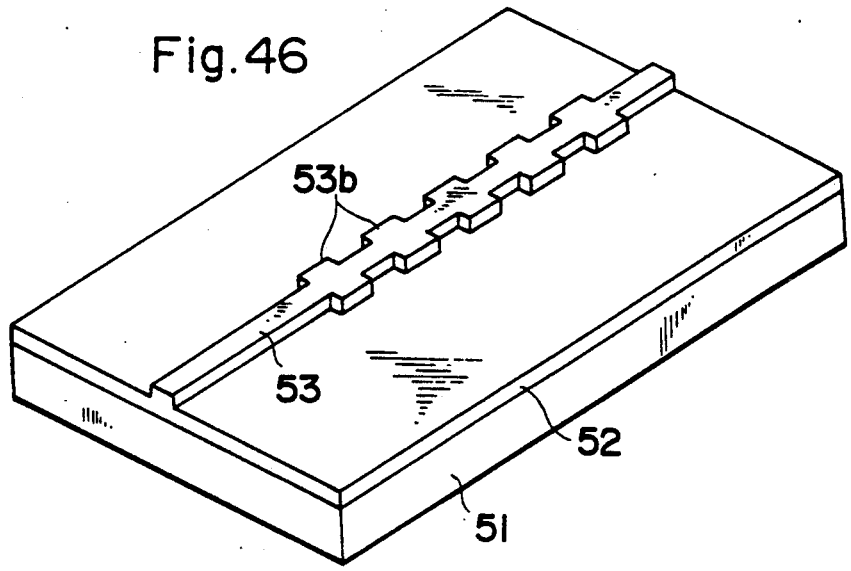

ULTRAVIOLET RAY

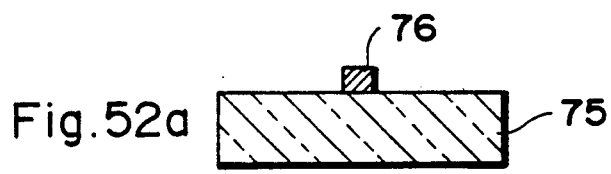
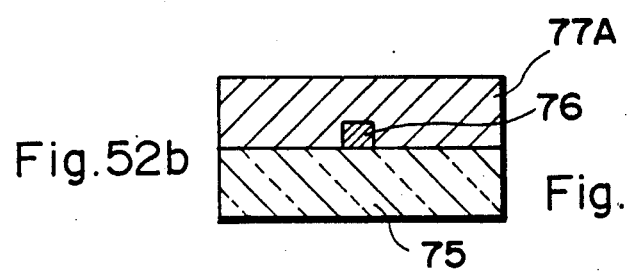
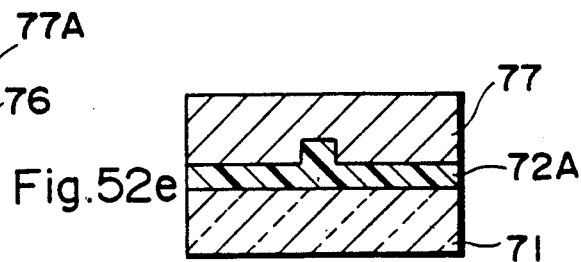
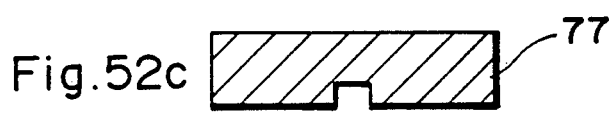
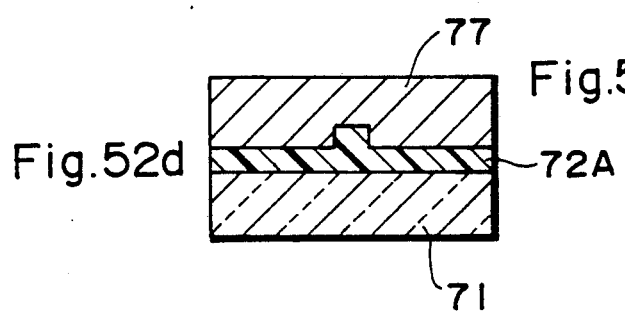
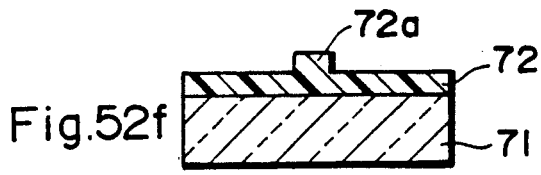
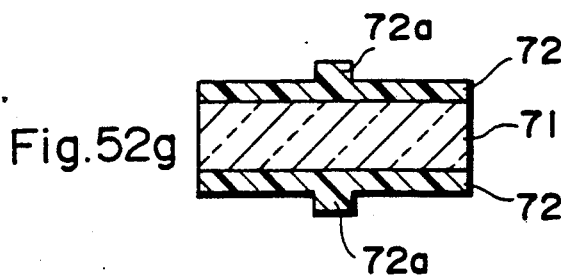

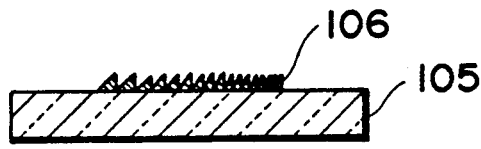
Fig.71a
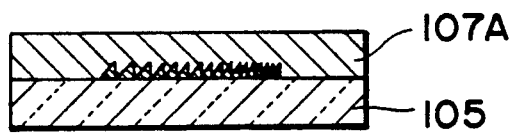
Fig.71b
Fig.71c
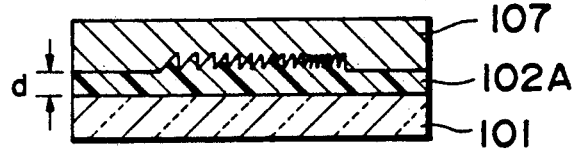
Fig.71d
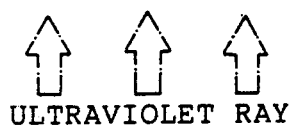
ULTRAVIOLET RAY
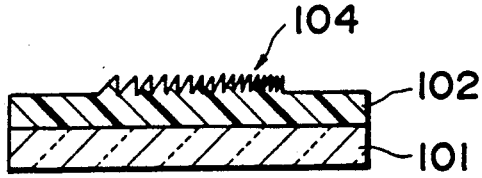
Fig.71e

ULTRAVIOLET RAY

RIB OPTICAL WAVEGUIDE AND METHOD OF MANUFACTURING THE SAME

BACKGROUND OF THE INVENTION

1. Field of the Invention

The present invention relates to a rib optical waveguide, various kinds of optical waveguide devices using the same, and an optical waveguide layer device including an optical waveguide layer or film on which a grating, a waveguide lens, etc. are formed and to a method of manufacturing the rib optical waveguide, the optical waveguide devices, and the optical waveguide layer devices by use with liquid materials which are solidified through an energy irradiation of ultraviolet ray and the like.

2. Description of Related Art

A rib optical waveguide includes a substrate, a core layer formed on the substrate, and a rib portion manufactured therein along a light propagation direction to be integral with the core layer. In a plane orthogonal to the light propagation direction, the propagation light is confined along a direction of depth of the core layer in association with a difference between refractive indices respectively of the core layer and the air and a difference between refractive indices respectively of the core layer and the substrate; whereas, the light is confined along a direction of width of the core layer (rib portion) by use of a phenomenon that the effective refractive index is increased in the proximity of the rib portion because the thickness of the rib portion is larger than that of the other core layer portions.

Conventionally, an ion irradiation high-speed etching has been used to manufacture a rib optical waveguide in some cases. However, this manufacturing process has the following problems. The manufacturing process of this method is complex and is not satisfactory in terms of mass production and reproducibility. Owing to the long manufacturing period of time, the production cost is high. Since surfaces of the optical waveguide become coarse through the etching, the dimensional precision is lowered and the light propagation loss is increased. Since etching is employed to fabricate an optical waveguide pattern, the available contour of the optical waveguide (rib section) is restricted.

On the other hand, in the conventional rib-type optical waveguide, since the core layer section in which the rib portion is included is exposed, the waveguide is likely to be damaged, which leads to a problem of inconvenience in handling the waveguide.

In a case of a single-mode rib optical waveguide, when the difference between the refractive indices respectively of the core layer or film and its environmental materials (the air and the substrate) is decreased, the thickness of the core layer and the width of the rib section can be increased, which facilitates the fabrication of the waveguide. However, in the conventional rib optical waveguide, since a portion of the core layer is exposed to the air, when a material having a high refractive index is used to manufacture the core layer, the dimension of the core layer becomes to be smaller and hence the manufacturing thereof is difficult. Moreover, when the difference between the refractive indices respectively of the core layer and the substrate is taken into consideration, there arises a problem that the available substrate materials are limited.

As a branching optical waveguide, there has been known a single-mode Y-shaped branching waveguide manufactured through a thermal diffusion of titanium (Ti) on a substrate of LiNbO₃. This waveguide comprises a basic or fundamental three-dimensional waveguide route and two branching three-dimensional waveguide routes which branch in a Y shape from the basic waveguide route. The difference between refractive indices respectively of the Y-shaped branching waveguide and the substrate is about $10^{-3}$ and the branching angle is about 1° to about 2°. The light passing through the basic waveguide path toward the branching section branches at the branching point to propagate into two Y-shaped branching waveguide routes. Conversely, lights respectively proceeding through the two branching waveguide routes toward the branching section are combined with each other to propagate through the basic waveguide route.

In a Y-shaped branching waveguide of this kind, due to a small difference between the refractive indices respectively of the waveguide portion and the substrate, a large branching angle cannot be obtained. Namely, an increased branching angle leads to a greater radiation loss. This is because the overlapping of the modes in the basic waveguide route and the branching waveguide routes becomes smaller as the branching angle is increased, which lowers the coupling coefficient.

As described above, since a large branching angle is not allowed for the Y-shaped waveguide of the prior art, in order to increase the gap between two branching waveguide paths or routes, it is necessary to elongate the distance of the branching waveguide. Particularly, in a case where Y-shaped branching waveguides are connected in a multiple stage to obtain many branching lights, there is required quite a long distance, which leads to a problem that the device size of the waveguide is increased.

In an optical waveguide produced through a thermal diffusion of titanium (Ti) on a LiNbO₃ substrate, in order to propagate a light through a curved path on the substrate, the waveguide on the substrate is required to have a contour of a curved line. FIG. 115 shows a curved optical waveguide 242 fabricated on a LiNbO₃ substrate 241 through a thermal diffusion of titanium. In such a curved waveguide of the prior art, owing to the symmetric distribution of refractive indices along a direction of the width of the waveguide, the electromagnetic field distribution of the propagation light is expanded toward the outside of the curved portion and hence a radiation loss results. The radiation loss increases as the radius of curvature is descreased in the curve of the optical waveguide. Consequently, in order to minimize the radiation loss, the radius of curvature is required to be increased, which disadvantageously increases the device size of the optical waveguide.

FIGS. 116 shows a state in which a light propagates through the optical waveguide formed through a thermal diffusion of titanium on the LiNbO₃ of FIG. 115. In this figure, a letter r denotes a radial direction of the curve and a curve a denotes a distribution of an effective refractive index $n_{eff}$ of the optical waveguide, the distribution is symmetric with respect to the central line. In consequence, in the straight-line portion of the optical waveguide, a magnetoelectric field distribution b also becomes symmetric with respect to the central line. However, in the curved portion, a magnetoelectric field distribution c of the propagation light is expanded toward the outside of the curve, which causes a radiation loss as indicated by a hatching portion. For example, in a case of a single-mode Ti-diffusion curved waveguide on a Z-cut LiNbO$_3$ substrate, assuming that a wavelength of the propagation light is 0.6328 micrometers, a waveguide width is 4 micrometers, a refractive index of the substrate is 2.2, and a difference between the refractive indices respectively of a core and a clad of the waveguide is $10^{-3}$; the radiation loss becomes about 3 dB/cm for the radious of curvature to be about 3 cm. In consequence, in order to set the radiation loss to a value not exceeding 3 dB/cm, the radius of curvature is required to be set to several centimeters or more. This leads to a problem of an increase in the size of the waveguide device.

An optical waveguide like the Ti diffusion LiNbO$_3$ waveguide has an identical contour of the cross section in a longitudinal direction, an identical beam pattern of the propagation light is developed regardless of positions. As above, the conventional optical waveguide has a limited freedom of beam pattern for the guided light; consequently, when an optical coupling takes place with an optical element having a different beam pattern a radiation loss is caused by the difference between the beam patterns, which lowers the optical coupling efficiency. For example, as shown in FIG. 117, there may occur a case where a light emitted from a laser diode 251 is delivered to a Ti-diffusion optical waveguide 253 formed on an LiNbO$_3$ substrate 250 such that a light irradiated from the optical waveguide 253 is optically coupled with an optical fiber 252. The light emitted from the laser diode 251 has a beam pattern LBA, which is an elliptic contour with a considerable flatness. In contrast thereto, the light guided through the Ti-diffusion optical waveguide 253 on the LiNbO$_3$ substrate 250 has a beam pattern, which takes a shape depending on the Ti diffusion state as denoted by letters LBB and LBC. Since the optical fiber 252 includes a core having a circular cross section, the beam LBD of light passing therethrough has a truely round contour. Namely, because the beam pattern of the propagation light varies depending on the optical elements to be optically coupled with each other, a radiation loss occurs in an optical coupling section, which hence leads to a problem of a low coupling efficiency.

As a representative optical channel waveguide, there has been known a Ti-diffusion optical waveguide 261 manufactured by diffusing titanium into a substrate of LiNbO$_3$ as described above and as shown in FIG. 118. When forming a grating in the optical waveguide 261 of this type, it is difficult or impossible to fabricate the grating only in the optical waveguide portion. Namely, the grating section 262 is inevitably formed in a range wider than the width of the optical waveguide 261.

In consequence, an optical waveguide provided with the grating cannot approach another optical waveguide not having such a grating, which limits the function of the device and which disadvantageously increases the device size.

Furthermore, when fabricating an optical waveguide with a grating section, a process to form the grating is required in addition to an optical waveguide manufacturing process. Consequently, an optical waveguide pattern masking process, a titanium diffusion process, a grating pattern masking process, and an etching process are necessary, which results in a complex manufacturing procedure and which requires a long period of time. As a result, there arise problems that the manufacturing procedure is unsuitable for mass production, that the production cost is increased, and that the reproducibility is deteriorated.

In an optical waveguide lie the conventional Ti-diffusion LiNbO$_3$ optical waveguide, the waveguide is fabricated only on a surface of a substrate. In consequence, there have been problems that the utilization efficiency of the substrate surfaces is not increased, that the waveguide device contour is limited, and that a plurality of substrates or a large-sized substrate is required when many functions are to be included in the waveguide device.

On the other hand, in the conventional optical waveguide, a waveguide functioning as a signal line is arranged in a two-dimensional fashion on a surface of a substrate. Consequently, in a case where a parallel optical signal processing, which is indispensable for realization of an optical computer, is to be achieved on optical signals, the amount of information which can be processed at the same time is limited. This leads to a problem that the information processing speed is lowered.

Conventionally, a waveguide grating device is produced as follows. Namely, a glass waveguide is formed on a substrate of silicon (Si) and then a grating device is manufactured on the glass waveguide by means of an electron beam writing apparatus operating under control of a minicomputer.

In consequence, the fabrication process of the grating device is complex and requires a long period of time, and hence is not suitable for mass production.

An example of manufacturing a plurality of grating couplers on a substrate has been described in the "Waveguide-Type Differential Detection Device For Magnetooptical Disk pickup" by H. Sunagawa et al. in the material OQE86-177 of Quantum Electronics Group published from the IECE of Japan. The device includes, as shown in FIG. 119 a substrate 270 and three focusing grating couplers 271 to 273 arranged on an optical waveguide of the substrate 270. A light reflected from an optomagnetic disk is irradiated onto these grating couplers 271 to 273 from orthogonal positions just thereover or from inclined positions thereover having an inclination with respect to a line orthogonal to a plane of the couplers. The grating coupler 271 has a grating period, which is slightly larger than grating periods of the other grating couplers 272 and 273. Namely, the grating coupler 271 is formed to excite the light in a transverse magnetic (TM) mode; whereas the grating couplers 272 and 273 are provided to excite the light in a transverse electric (TE) mode. The light reflected from the optomagnetic disk is represented as a composite vector of a P component (Ep) and an S component (Es) of the electric field. The Ep component of the reflection light satisfies a phase matching condition in the grating coupler 271 and hence excites the TM mode light. The Es component of the reflection light meets a phase matching condition in the grating couplers 272 and 273 to excite the TE mode light. The Ep component rarely conducts an optical coupling with the grating couplers 272 and 273, whereas the Es component rarely achieves an optical coupling with the grating coupler 271. As a result, the reflection light from the optomagnetic disk is respectively separated through the grating couplers 271 to 273 into the Ep and Es components so that the lights are focused onto the respective foci P71, P72, and P73. These focused lights are respectively received by optical sensors producing output signals. Based on the output signals, there are generated a disk read signal, a focusing error signal, and a tracking error signal.

In a grating coupler of this kind, the lights of two types of waveguide modes including the TM and TE modes are excited only in the respective separate regions. Namely, the TM and TE mode lights are driven only in the region of the grating coupler 271 and the regions of the grating couplers 272 and 273, respectively. This consequently leads to a problem of a deteriorated light utilization efficiency. In other words, although the light reflected from the optomagnetic disk enters the overall area including the regions of the grating couplers 271 to 273, the optical coupling of the light is accomplished only in the optical waveguide layer, which is only a portion of the area.

The emission (coupling) efficiency of a grating coupler depends on a length of the coupler and an emission loss coefficient determined by a thickness and a cross-sectional countour of the grating. In consequence, for attaining a highly efficient grating coupler, the length thereof must be increased. This does not necessarily meet the requirement for minimization of the size of optical functional elements.

An optical waveguide lens achieving operations such as a focusing, a divergence, and a collimation on a propagation light passing through a two-dimensional optical waveguide is an essential part when configuring an integrated optical circuit for use in signal processing.

An example of the conventional optical waveguide lens includes, as shown in FIG. 120, a substrate of LiNbO$_3$, a titanium diffusion waveguide 281 formed thereon, and a grating 282 of a refractive index modulation type for a lens manufactured through a proton exchange.

However, in order to fabricate an optical waveguide lens of this kind, several processes are required, including a process in which a thin titanium layer is accumulated on and is thermally diffused into the LiNbO$_3$ substrate to form an optical waveguide and a process to create a grating pattern and to achieve a proton exchange for creating a grating section. In consequence, the total number of manufacturing steps is increased and the manufacturing processes becomes complex. Moreover, due to a long period of time necessary for the fabrication, this manufacturing method is not suitable for the mass production.

Furthermore, as an example of the conventional optical waveguide lens, there has been known a geodesic lens. The geodesic lens has a two-dimensional waveguide including a curved portion to form an appropriate curved plane, which serves as a lens for a propagation light. In an example of a geodesic lens formed on an optical waveguide on a substrate, a curved surface to be a geodesic lens is created on a substrate of glass, LiNbO$_3$, or the like and an optical waveguide is formed on the substrate surface including the curved surface by an ion exchange method.

In order to fabricate a geodesic lens on a substrate, a portion of the substrate is required to be polished in a spherical surface to form a geodesic lens on the substrate. For manufacturing a lens free from aberration, the surface is required to be formed in an aspherical shape. For this purpose, an ultrasonic machining, a diamond honing, a diamond cutting, a diamond polishing, etc. have been employed in the prior art.

However, the curved surface machining methods above are attended with a problem that a long period of work is to be achieved by use of a special apparatus operating with a high precision under control of a computer and hence the methods are not appropriate for mass production.

As an example of an optical element, a grating coupler has been well known. In the grating coupler, a light is guided from an external position into an optical waveguide fabricated on a substrate or a light is emitted therefrom to an external location. Particularly, a grating coupler has been recently adopted in an optical pickup of an optomagnetic disk (reference is to be made to the foregoing material written by Sunagawa et al.) In accordance with the material above, the grating coupler is produced as follows.

On a substrate of Pyrex, a glass #7059 is sputtered and then an Si-N layer is accumulated thereon by use of a plasma chemical vapor deposition (CVD) method. An electron beam resist of a positive type is applied on the resultant surface; thereafter, chromium (Cr) is evaporated thereon to prevent a charge-up phenomenon. By use of an electron beam writing apparatus, a desired grating patternn is drawn on the electron beam resist layer.

After the electron beam writing operation is finished, the chromium film is removed by use of an etching solution and then the electron beam resist is developed with a developer. Moreover, a reactive ion etching (RIE) is accomplished on the Si-N film with the electron beam resist set as a mask. Finally, the electron beam resist is removed by use of a dissolving agent to attain a grating coupler.

The manufacturing method of the prior art above employs electron beam lithography and hence takes a long period of time to create the optical element. This method is also not suitable for mass production. In addition, two etching processes are included and hence the manufacturing processes are required to be controlled with a high precision, which leads to a problem that the production cost of optical elements cannot be reduced.

SUMMARY OF THE INVENTION

It is therefore an object of the present invention a rib optical waveguide which can be easily produced and which is suitable for mass production and to a method of manufacturing the same.

Another object of the present invention is to enhance protection of a core layer of the waveguide.

Still another object of the present invention is to provide a rib optical waveguide for which, even when a single mode optical waveguide is taken into consideration, the thickness of the core layer and the width of the rib section can be increased and which can be easily manufactured by use of an arbitrary material for the substrate.

Another object of the present invention is to provide a branching optical waveguide in which a large branching angle is developed and which operates with a relatively decreased loss.

Another object of the present invention is to provide a rib-type corner-bent waveguide which can be used to reduce the size of a waveguide device.

Still another object of the present invention is to provide a beam shape conversion device in which in an optical coupling with various optical elements having different cross-sectional contours of the propagation light beam, the matching between the light beam patterns is retained to develop a high optical coupling efficiency.

Another object of the present invention is to minimize the device size of an optical channel waveguide, even when a grating section is disposed therein, without limiting the freedom with respect to the location of the waveguide.

Further another object of the present invention is to provide a rib optical waveguide including a waveguide in each of a plurality of surfaces of a substrate.

Another object of the present invention is to provide a three-dimensional optical circuit in which without increasing an area of a substrate, the number of waveguides on the substrate can be increased to improve the integration degree of the optical circuit, to save the circuit space, and to increase the functionality of the circuit.

Still another object of the present invention is to provide a grating device of a waveguide type having a relatively simple fabrication process having a relatively short production period of time, and which is suitable for mass production.

Further another object of the present invention is to provide a composite grating coupler and a manufacturing method of the same capable of increasing a utilization efficiency per unitary area of light beams entering or being emitted from a position of a waveguide layer in association with a plurality of different propagation modes or light beams entering or being emitted from a position of a waveguide layer in association with a plurality of differenct wavelengths.

Another object of the present invention is to provide a composite grating coupler in which light beams propagating through an optical waveguide layer from different directions toward a predetermined position are emitted to a position outside of the waveguide layer or in which light beam entering the predetermined position from positions outside the waveguide layer are coupled with the waveguide layer.

Another object of the present invention is to provide a grating coupler which is capable of attaining a high emission efficiency and which can be minimized in size.

Further another object of the present invention is to provide an optical waveguide lens which can be fabricated in a relatively easy fashion and which is suitable for mass production.

Still another object of the present inventionn is to provide an optical waveguide device and a method of manufacturing the same in which electrodes for controlling a propagation light based on a thermooptical effect can be easily formed and in which an optical effect other than the thermooptical effect is adopted to control the propagation light.

Another object of the present invention is to provide an optical waveguide layer device including a grating element in which the thickness of the waveguide layer can be controlled with a high precision and in which quite a thin waveguide layer can be formed.

Another object of the present invention is to provide a grating element which is capable of developing a high emission efficiency and which can be manufactured by use of an ultraviolet-ray curing (setting) resin.

Still another object of the present invention is to provide an optical element and a manufacturing method of the same which can be fabricated in a relatively short period of time, in an easy manner, and at a low cost.

The rib optical waveguide according to the present invention includes a substrate, a core layer having a rib portion formed on the substrate characterized in that said core layer is formed with a liquid material which is solidified through by an enregy irradiation.

The method of fabricating the rib optical waveguide in accordance with the present invention includes a step of preparing a stamper having a recessed groove associated with the rib portion, a step of injecting a liquid material which is solidified through an enregy irradiation thereonto between the stamper and the substrate, a step of conducting an energy irradiation to solidify the liquid material so as to form a core layer, and a step to remove thereafter the stamper.

The liquid materials which are solidified through an energy irradiation thereonto include a light setting (curing or hardening) resin or a thermosetting resin, for example an ultraviolet (UV)-ray setting resin. As an inorganic material, a coating solution for creating a thermosetting film may be employed. In this regard, the term "liquid material" also implies a gel material.

In accordance with the present invention, since the core layer having the rib section is formed with a liquid material which is solidified through an enregy irradiation thereonto, the waveguide can be manufactured by use of a stamper and hence the fabrication is facilitated. Namely, the manufacturing process is superior for mass production and in the reproducibility of the waveguide. Moreover, the production period of time is decreased and consequently the cost of the waveguide can be reduced. In addition, when the stamper is manufactured with a high precision, a waveguide can be produced with a smooth waveguide surface, which can lower the light propagation loss. The stamper is fabricated from a master of the rib optical waveguide, which can be manufactured by use of various methods, for example, by electron beam lithography. Consequently, optical waveguides having various kinds of rib structures can be created.

The rib optical waveguide in accordance with the present invention comprises a substrate, a core layer having a rib section formed on the substrate, and a clad layer formed to be tightly fixed on the core layer by use of a material having a refractive index smaller than a refractive index of the core layer.

When both of the core and clad layers are formed with the liquid material which is solidified under an energy irradition, the manufacturing process can be favorably simplified. However, the core and clad layers may be fabricated with different materials, respectively. For example, as a core layer material, a material developing a nonlinear optical effect may be used.

In accordance with the present invention, since the core layer is protected by the clad layer, the core layer is prevented from being damaged, which facilitates handling of the products. Moreover, even when the core layer has a high refractive index, by selecting the clad layer having an appropriate refractive index, the thickness of the core layer and the width of the rib section can be increased in a case where the single-mode propagation is achieved, which facilitates manufacturing. Since the thickness of the core layer and the width of the rib section can be increased, the optical coupling for the input/output operations with an optical fiber and the like is advantageously facilitated.

The rib optical waveguide according to the present invention is characterized by comprising a substrate, a core layer having a rib section formed on the substrate, and a buffer layer formed with material having a refractive index smaller than a refractive index of the core layer and disposed between the substrate and the core layer. The core and buffer layers may be fabricated with arbitrary materials.

By use of a combination of the core and buffer layer materials respectively having appropriate refractive indices, single-mode light propagation can be implemented with the thickness of the core layer and the width of the rib section set to large values; moreover, the substrate can be formed with an arbitrary material.

The rib-type branching waveguide in accordance with the present invention includes a first rib section for forming a basic waveguide route and at least two rib sections branching from the first rib section for configuring branching waveguide routes branching from the basic waveguide route. The waveguide is characterized in that in a section where the first rib section is linked with the second rib sections, the thickness of at least either one of a center portion of the first rib section and an inner portion of each second rib section is thinner than the thickness of the other portion.

In accordance with the present invention, in a section where the first rib section is linked with the second rib sections, the thickness of at least either one of a center portion of the first rib section along a width direction and an inner portion of each second rib section along a width direction is thinner than the thickness of the other portion. Consequently, in the branch portion of the optical waveguide, the degree of overlapping of field distribution patterns of the propagation mode before and after the branch point is increased. That is, even when the branch angle is increased, the propagation light loss can be suppressed. As a result, the branch angle can be set to a great value. In consequence, when producing an optical device by use of the branching waveguide according to the present invention, the size of the optical device can be reduced and the integration degree can be increased.

Furthermore, in at least either one of a center portion of the first rib section and an inner portion of each second rib section, when the thickness is formed to be asymmetric with respect to a center line in the width direction of the waveguide, a branching ratio can be adjusted by controlling the film thickness of the rib section. As a result, an optical waveguide having a desired branch ratio can be fabricated.

The present invention is characterized in that in the rib-type corner-bent optical waveguide including a core layer having a rib section with a curved portion, said core layer being formed on a substrate, the curved portion of the rib section including an inner side portion and an outer side portion with respect to the radial direction is formed so that the thickness of the inner side portion is larger than that of the outer side portion.

In accordance with the present invention, since the thickness of the inner side portion is larger than that of the outer side portion in the curved section, the peak position of the refractive index distribution of the waveguide in the radial direction is shifted toward the inner side relative to the center line of the waveguide.

In consequence, the peak position of the magnetic field distribution of the propagation light in the direction of the waveguide width shifts to the inner side of the curved section of the waveguide, which reduces the radiation loss in the curved section. Moreover, the radius of curvature can be minimized in the curved section and hence the size of the waveguide device can be reduced.

The rib optical waveguide according to the present invention includes a substrate and a core layer having a rib section formed on the substrate. The waveguide is characterized in that the cross section of the rib section has a contour which is continuously varied in the longitudinal direction to change the beam shape of the propagation light into a predetermined contour.

In accordance with the present invention, since the contour of the cross section of the rib section is continuously varied in the longitudinal direction, the effective refractive index distribution in the core layer portion just beneath the rib section changes depending on the contour of the cross section of the rib section. As a result, a proparation light beam pattern is obtained in association with the cross-sectional contour of the rib section. With this provision, the cross-sectional contour of the propagation light beam at the input and output end surfaces of the rib optical waveguide can be adjusted in association with a cross-sectional shape of a light beam of an optical element to be optically coupled with the propagation light beam. As a result, the deterioration of the coupling efficiency due to the radiation loss can be avoided. Consequently, many kinds of optical elements can be optically coupled with a high efficiency.

The channel optical waveguide in accordance with the present invention is a rib-type optical waveguide including a substrate and a core layer having a rib section formed on the substrate. The waveguide is characterized in that the core layer is formed with a liquid material which is solidified when subjected to an energy irradiation such that a grating is formed in a predetermined position of the rib section to be integral therewith.

The grating is implemented by periodically altering the width of the rib section, the thickness (height) thereof, or the width and height thereof. The grating may be blazed.

In the rib optical waveguide, the rib section is formed, in the core layer fabricated on the substrate, along the light propagation direction so as to be integral with the core layer. In a plane orthogonal to the light propagation direction, the propagation light is confined in the direction of the thickness of the core layer depending on a difference between refractive indices respectively of the core layer and the air and a difference between refractive indices respectively of the core layer and the substrate. In the width direction of the core layer (rib section), the propagation light is confined by use of a phenomenon that because the thickness of the rib section is larger as compared with the other portion of the core layer, the effective refractive index is higher in the vicinity of the rib section. Between the substrate and the core layer, there may be disposed a buffer layer formed with a material having a refractive index smaller than a refractive index of the core layer. Or, a clad layer may be formed with a material having a refractive index smaller than a refractive index of the core layer to be tightly fixed on the core layer.

The rib optical waveguide according to the present invention is fabricated as follows. A stamper is prepared having a recessed groove associated with a rib section and a grating to be disposed in the rib section a liquid material which is solidified under an energy irradiation is injected between the stamper and the substrate. Thereafter, an energy irradiation is applied onto the liquid material to solidify the material so as to form a core layer with a rib section integrally formed therein, the rib section having a grating. The stamper is then removed to complete the manufacturing of the waveguide.

The liquid materials which ar solidified through an energy irradiation thereonto include a light setting resin or a thermosetting resin, for example an ultraviolet (UV)-ray setting resin. As an inorganic material, a coating solution for creating a thermosetting film may be employed. In this regard, the term "liquid material" also implies a gel material.

In accordance with the present invention, since the core layer in which the rib section is integrally formed is manufactured with a liquid material which is solidified through an enregy irradiation thereonto, the waveguide can be manufactured by use of a stamper and hence the fabrication is facilitated. Namely, the manufacturing process is superior for mass production and for reproducibility of the waveguide. Moreover, the production period of time is decreased and consequently the cost of the waveguide can be reduced. The stamper is fabricated from a master of the rib optical waveguide, which can be manufactured by use of various methods, for example, an electron beam lithography. Consequently, there can be created optical waveguides having the grating and rib structures of various contours.

Furthermore, in accordance with the present invention, the grating can be formed only in a rib portion just above an optical waveguide. Consequently, the degree of freedom for contours of the waveguide and the grating is increased, which leads to a functional expantion and which advantageously reduces the device size.

It is favorable to dispose the clad layer described above so as to be tightly fixed on the core layer. When both of the core and clad layers are manufactured with a liquid material which is solidified under an energy irradiation as above, the processes can be favorably simplified. However, the core and clad layers may also be structured with different materials, respectively. For example, as a material of the core layer, a substance having a nonlinear optical effect may be adopted.

With the provision of the clad layer, the core layer is protected by the clad layer and hence the core layer is prevented from being damaged, which facilitates the handling of the waveguide. Furthermore, even when the core layer has a high refractive index, by selecting the clad layer having an appropriate refractive index, the core layer thickness and the rib section width may be set to large values in a case where the single-mode light propagation is to be accomplished, which simplifies the fabrication. Since the core layer thickness and the rib section width can be increased, the optical coupling with an optical fiber and the like for input/output operations is advantageously facilitated.

It is further desirable to dispose a buffer film between the substrate and the core layer. The core and buffer layers may be manufactured with arbitrary materials.

With the provision of the buffer layer and with a combination of the core and buffer layer materials respectively having appropriate refractive indices, the single-mode light propagation can be achieved with the core layer thickness and the rib section width respectively set to large values. Moreover, the substrate can be formed with an arbitrary material.

The rib optical waveguide according to the present invention includes a substrate and a core layer having a rib section formed on the substrate and is characterized that the core layer having the rib section is formed on at least two surfaces of the substrate.

In accordance with the present invention, since the core layer having the rib section is formed on a plurality of surfaces of the substrate so as to form a waveguide therein, the utilization efficiency of the substrate surfaces is increased. In consequence, the size of the waveguide devices using the rib type waveguide can be reduced. Furthermore, the core layer having the rib section is not limited to any particular location on the substrate and hence the degree of freedom is improved with respect to the contour of the waveguide device.

The three-dimensional optical circuit in accordance with the present invention is characterized in that the core layer having the rib section is arranged in a three-dimensional manner on the substrate.

According to the present invention, since a plurality of core layers having the rib section are arranged in a three-dimensional manner on the substrate, a function which conventionally requires a plurality of substrates can be implemented by use of a substrate. Moreover, the degree of freedom is increased with respect to the shape of the waveguide device.

In addition, in contrast with a fact that the substrate is required to have a large area to form a plurality of waveguides thereon in the prior art, many waveguides can be configured on a small-sized substrate in accordance with the present invention. This leads to minimization of the size of the waveguide device.

Thanks to the three-dimensional structure of optical waveguides, the spacial parallel optical processing essential for a development of an optical computer can be achieved, which hence increases the amount of information to be processed at a time and which improves the information processing speed.

The waveguide-type grating device according to the present invention is characterized in that a two-dimensional optical waveguide and a grating formed thereon are integrally fabricated on a substrate by use of an organic or inorganic substance which has a property to change its state from a liquid state into a solid state.

In accordance with the present invention, since a two-dimensional optical waveguide and a grating formed thereon are integrally fabricated on a substrate by use of an organic or inorganic substance which develops a property to change its state from a liquid state into a solid state so as to configure a waveguide-type grating device, it is possible to employ a stamper or the like to produce the grating device. The manufacturing process is relatively facilitated in consequence to reduce the production period of time. Namely, this fabrication is suitable for mass production and is superior in reproducibility. This results in a cost reduction and hence enables a low-cost grating device of the waveguide-type to be produced. Moreover, the thickness of the waveguide can be easily set to a arbitrary value.

It is favorable to fabricate between the two-dimensional optical waveguide and the substrate a buffer layer with a material having a refractive index smaller than a refractive index of the waveguide.

As a result, a two-dimensional optical waveguide can be formed on an arbitrary substrate.

The composite grating coupler in accordance with the present invention is characterized in that at an identical position on an optical waveguide layer formed on a substrate, in order to couple or to separate lights associated with a plurality of propagation modes or a plurality of wavelengths, there are arranged in an overlapping manner a plurality of gratings having respective different periods in association with the propagation modes or the wavelengths.

The method of producing the composite grating coupler in accordance with the present invention is characterized in that a stamper is beforehand prepared to fabricate in the identical location the gratings respectively having the plural different periods such that an organic substance is applied between the stamper and the substrate, thereby integrally forming on the substrate the optical waveguide layer and the gratings having the plural different periods.

The method of producing the composite grating coupler in accordance with the present invention is characterized in that a stamper is beforehand prepared to fabricate in the identical location the gratings respectively having the plural different periods and an optical waveguide layer is fabricated on the substrate in advance such that an organic substance is applied between the optical waveguide layer of the substrate and the stamper, thereby forming on the waveguide layer of the substrate the gratings having the plural different periods.

In accordance with the present invention a light incident to a position of the waveguide layer formed on the substrate is separated through the composite grating coupler into light beams depending on the propagation modes or wavelengths so as to propagate through the waveguide layer. Light beams passing through the waveguide layer toward a position, which are being respectively associated with different propagation modes or wavelengths, are emitted from the position to an outside space. As above, since the light beams respectively associated with a plurality of different propagation modes or wavelengths enter or are emitted from the coupler through the overall area of the composite grating coupler, the light utilization efficiency of the area of the grating coupler is improved. In addition, with a composite grating coupler, a plurality of propagation modes can be selected and a plurality of wavelengths can be separated.

Moreover, by altering the thickness of each grating constituting the composite grating coupler, the light diffraction efficiency of each grating can be varied, which enables the branch ratio to be arbitrarily set or adjusted for each propagation mode and/or each wavelength.

In the composite grating coupler according to the present invention, light beams propagating through the optical waveguide layer formed on the substrate from different directions to a predetermined position are emitted therefrom toward an outside space or light beams incidents from outside spaces to the predetermined position are coupled with the waveguide layer on the substrate to be propagated toward different directions in the waveguide layer. For this purpose, the composite grating coupler is characterized in that a plurality of gratings respectively associated with different directions are formed at the position in an overlaping manner. The plural gratings may be provided with respectively different periods or with respectively different thickness thereof.

In accordance with the present invention, input and output operations of light beams associated with different propagation directions can be accomplished by use of a composite grating; moreover, the utilization efficiency is improved for each propagation light beam.

The grating coupler according to the present invention is characterized by comprising a grating disposed on an optical waveguide layer formed on a substrate for emitting a propagation light into an outside space and reflect means disposed on the substrate for reflecting a propagation light which has not emitted from said light emitting grating and which has passed therethrough such that the reflection light has a phase identical to a phase of the light emitted from the grating.

The reflect means above may be implemented by use of a reflective grating formed on the optical waveguide layer or by use of a reflective mirror disposed on the substrate.

In accordance with the present invention, the propagation light which has not emitted from said light emission grating and which has passed therethrough is reflected on the reflect means to return again to the light emission grating so as to be emitted therefrom with a phase equal to the phase of the light emitted from the grating. Since the light reflected from the reflect means is also emitted from the grating, the power of light emitted from the grating coupler is increased by the amount of the reflected light, thereby achieving a highly efficient light emission. In addition, since the length of the light emission grating need not be excessively increased, the size of the grating coupler may possibly be minimized.

Moreover, the light emitted from the grating coupler has an amplitude distribution which can be obtained by adding an amplitude distribution of the emission light of the propagation light to an amplitude distribution of the emission light of the reflection light. Consequently, a large amplitude is attained at the end positions and a small amplitude is developed at a center position. This is analogous to an amplitude distribution of super-resolution, namely, the emission light can be focused to have quite a small beam diameter.

The optical waveguide lens in accordance with the present invention is characterized in that on an optical waveguide formed on a substrate, a projected portion for a lens is fabricated to be integral with the optical waveguide by use of an organic or inorganic substance which develops a characteristic to change its state from a liquid state to a solid state and that the projected section has a thickness or a width along the light propagation direction which is changed in order for a distribution of an effective refractive index in the optical waveguide to be varied in a direction orthogonal to a light propagation direction.

With the provision of the projected portion for a lens, the effective refractive index changes in a portion of the optical waveguide just beneath the projection so as to refract propagation lights, thereby achieving lens functions, for example, to focus, to diverge, and to collimate lights.

The optical waveguide lens according to the present invention is characterized in that on an optical waveguide formed on a substrate, a plurality of projected portions for grating lenses are formed to be integral with the waveguide by use of an organic or inorganic material developing a property to change its state from a liquid state to a solid state as follows. Namely, in order to periodically vary the effective refractive index in the waveguide with a period, which alters in a direction orthogonal to the light propagation direction; the projected portions vary, in a direction orthogonal to the light propagation direction, the thickness thereof, the width thereof along the light propagation direction, or the width or interval thereof along a direction orthogonal to the light propagation direction.

Thanks to the plural grating lens projections, the effective refractive index of a portion of the waveguide just below the projections is increased, thereby forming a grating of a refractive index modulation type in the waveguide. Since the period of the grating alters in a direction orthogonal to the light propagation direction, the lens functions, for example, to focus, to diverge, and to collimate lights are accomplished.

The optical waveguide according to the present invention denotes a concept implying an optical waveguide layer or film. Contours respectively of the lens projections and grating lens projection may be decided depending on the lens operations such as the light focusing, diversion, and collimation.

As above in accordance with the present invention, since an organic or inorganic material changing from a liquid state to a solid state is adopted to manufacture a optical waveguide lens to be integral with the optical waveguide, the monoblock molding technology using a stamper and the like can be applied to fabricate the optical waveguide lens in a relatively easy fashion. In consequence, the waveguide is suitable for the mass production and the reproducibility of products is increased. Moreover, the production cost is considerably minimized and hence a low-cost waveguide lens can be produced.

With the provision of the buffer layer formed between the substrate and the waveguide, said layer having a uniform thickness and a refractive index less than a refractive index of the waveguide, an arbitrary substance may be used for the substrate.

The optical waveguide lens in accordance with the present invention is characterized in that a clad layer is formed on a substrate by use of an organic or inorganic material changing from a liquid state to a solid state such that the clad layer includes a portion having a curved area of a spherical surface. Moreover, on the clad layer, an optical waveguide layer having a uniform thickness and a refractive index greater than a refractive index of the clad layer is formed with an organic or inorganic material changing from a liquid state to a solid state.

In accordance with the present invention, the waveguide and the waveguide lens are fabricated with an organic or inorganic material changing from a liquid state to a solid state, the monoblock molding technology using a stamper and the like can be adopted to manufacture the optical waveguide lens in a relatively easy fashion. In consequence, the waveguide lens is suitable for the mass production and the production reproducibility is increased. Moreover, the production cost is considerably minimized and hence a low-cost waveguide lens can be manufactured.

The optical waveguide device according to the present invention is characterized by comprising a substrate disposed with a light control electrode and a waveguide layer having an optical waveguide formed on the substrate with a material to be solidified through an energy irradiation.

The method of producing the optical waveguide device in accordance with the present invention is characterized in that a stamper having a contour associated with a shape of a waveguide layer to be created is prepared and the optical wave control electrode is formed on a predetermined surface location of the substrate such that a liquid substance to be solidified under an energy irradiation is injected between the stamper and the surface of the substrate in which the electrode is formed. An energy irradiation is then applied to the liquid material to solidfy the material so as to form a waveguide layer. Thereafter, the stamper is removed to complete the production process.

The liquid substances solidified through an energy irradiation include a light setting resin or a thermosetting resin, for example, an ultraviolet (UV)-setting resin. As the inorganic material, a coating solution used to form a thermosetting film may possibly be employed. The term "the liquid material" also implies a gel substance.

In accordance with the present invention, since the light control electrode can be formed on a substrate manufactured with an arbitrary substance other than the material to be solidified through an energy irradiation, the propagation can be controlled by use of optical effects of the substrate other than the thermooptical effect, for example, by use of an acoustooptic effect thereof. Furthermore, with an appropriate selection of the substrate material, the electrode may be easily produced by use of a known technology already established. Consequently, the present invention is also quite advantageous in a case where thermooptical effects of the waveguide layer material are used.

Since the material solidifying through an energy irradiation is adopted to create the waveguide layer on the substrate, an optical waveguide in the waveguide layer can be fabricated by use of a stamper and hence the production thereof is facilitated. The waveguide device is superior with respect to the mass production and reproducibility; morever, the production period of time is minimized and consequently the production cost is lowered. Since the stamper is prepared by use of a master of the optical waveguide, which can be fabricated through various methods, for example, an electron beam lithography, it is possible to produce the optical waveguide and the waveguide layer in various contours.

The optical waveguide layer device according to the present invention is characterized by including an optical waveguide layer configured with an inorganic substance on a substrate by use of a thin film growing technology and an optical element layer formed on the optical waveguide layer with a material solidifying through an energy irradiation thereonto, said optical element layer having a predetermined optical element (for example, a grating or a waveguide lens).

The grating device in accordance with the present invention is characterized by comprising a optical waveguide layer formed with an inorganic material on a substrate by use of a thin film growing technology such as a sputtering, a chemical vapor deposition, or the like and a grating layer fabricated with an organic substance on the optical waveguide layer.

According to the present invention, since the optical waveguide layer is formed with an inorganic material on a substrate by use of a thin film growing technology such as a sputtering, a chemical vapor deposition, or the like, the film thickness of the optical waveguide layer can be easily accomplished. Namely, the thickness of the layer can be controlled with a high precision; moreover, an optical waveguide layer having a reduced thickness can be produced.

In accordance with the present invention the highly precise control can be easily achieved on the thickness of the optical waveguide layer, and the film thickness may possibly be controlled on a submicron order. Consequently, the fluctuation in the thickness of the optical waveguide layers is reduced and hence the fluctuation in the optical characteristics such as light input/output angles is mitigated. Namely, the optical characteristics of the grating elements are improved.

Furthermore, since the optical waveguide layer is constituted with an inorganic material, when compared with ones fabricated with organic materials, a more stable characteristic is developed with respect to the environmental conditions.

In addition, since the optical element layer including the grating layer as a representative example in which a shape of the optical element (grating) is required to be formed is configured with an organic material and the like, the layer may be easily formed, for example, through a resin molding. Consequently, the optical element is advantageously suitable for the mass production.

The present invention is characterized in that on a substrate transparent with respect to an ultraviolet ray, an optical waveguide layer having a grating is formed with a resin of an ultraviolet-setting type such that a wavelength selective layer is formed between the substrate and the waveguide layer, said wavelength selective layer reflecting a light having a wavelength at least identical to a wavelength of a light to be propagated through the waveguide layer, said wavelength selective layer being transparent with respect to an ultraviolet ray.

In accordance with the present invention, the substrate allows an ultraviolet ray to pass therethrough and the wavelength selective layer disposed between the substrate and the optical waveguide layer is also transparent with respect to the ultraviolet ray. In consequence, it is possible to apply an ultraviolet-setting resin to a stamper to form the grating and the optical waveguide layer. The substrate is then attached onto the resin so as to irradiate an ultraviolet ray through the substrate and the wavelength selective layer onto the resin to solidify the ultraviolet-setting resin.

Furthremore, since the wavelength selective layer disposed between the substrate and the optical waveguide layer reflects a light in a wavelength band associated with the propagation light, a light diffracted by the grating from the waveguide layer to the substrate is reflected from the wavelendth selective layer into a space side. As a result, the grating develops a high emission efficiency.

The wavelength selective film may be structured by forming an optical filter or the like on a surface of the substrate or may be implemented by a surface layer of the substrate.

The optical device according to the present invention is characterized by comprising a substrate, an optical element forming layer fabricated on the substrate with a liquid material to be solidified through an energy irradiation thereonto, and an optical element layer formed on the optical element forming layer.

In the method of manufacturing the optical device according to the present invention, a substrate and a stamper having a depression with a contour of an objective optical element are prepared such that a liquid material to be solidified under an energy irradiation is injected between the stamper and the substrate. An energy irradiation is applied to the resin to solidify the resin so as to form an optical element forming layer. Thereafter, the stamper is removed and then an optical material is accumulated on the optical element forming layer to fabricate an optical element layer.

As above, there is produced an optical device having an optical element layer of which the effective refractive index varies in a successive fashion or in an discontinuous manner, thereby developing such optical functions as the light propagation, branching, diffraction, coupling, reflection, and scattering.

The liquid materials solidifying under an energy irradition include a light setting resing or a thermosetting resin such as an ultraviolet-setting resin. The inorganic substance may include a coating liquid used to form a thermosetting film. The expression "a liquid state" also implies a gel state.

Moreover, the optical materials include materials which can be accumulated through an accumulation technology, for example, ZnO (refractive index $n=2.015$) and ZnS (refractive index $n=2.35$).

In accordance with the present invention, with a stamper beforehand prepared, the optical device can be manufactured through the forming and accumulation processes, which hence considerably reduces the period of time necessary for the production of the optical device. Namely, the optical device is quite suitable for the mass production. In addition since the etching process is unnecessitated, a high-precision control of the fabrication process is not required. Consequently, the production cost of the optical device can be lowered in accordance with the present invention.

The optical device according to the present invention is characterized by including a first substrate, an optical element forming layer fabricated on the first substrate with a liquid material solidifying under an energy irradiation, an optical element layer formed on the optical element forming layer, and a second substrate attached onto the optical element layer.

In the method of manufacturing the optical device in accordance with the present invention, a first substrate and a stamper having a depression with a contour of the objective optical element are prepared and then a liquid material under an energy irradiation is injected between the stamper and the first substrate. An energy irradiation is then applied to solidify the liquid material so as to form an optical element forming layer, thereby removing the stamper. An optical substance is accumulated on the optical element forming layer to form an optical element layer; thereafter, a second substrate is attached onto the optical element layer.

Since the second substrate protects the optical element layer, the optical element layer is prevented from being damaged, which facilitates handling of the optical device.

The optical device in accordance with the present invention is characterized by comprising a substrate and an optical element layer attached onto the substrate by use of an attaching material.

In the method of manufacturing the optical device in accordance with the present invention, a first substrate and a stamper having a depression with a contour of the objective optical element are prepared and then a liquid material solidifying under an energy irradiation is injected between the stamper and the first substrate. An energy irradiation is then applied to solidify the liquid material so as to form an optical element forming layer, and the stamper is removed. An optical material is accumulated on the optical element forming layer to form an optical element layer and then a second substrate is attached onto the optical element layer by use of an attaching material. Thereafter, the first substrate and the optical element forming layer are removed.

As a result, there is produced an optical device including an optical element layer attached onto the second substrate by use of an attaching material.

Since the optical element layer is exposed to an external space (for example, the air) having a smaller refractive index, the refractive index difference can be increased, which enables the thickness of the optical element layer to be minimized.

BRIEF DESCRIPTION OF THE DRAWINGS

These and other objects and advantages of the present invention will become apparent by reference to the following description and accompanying drawings wherein:

FIGS. 6a to 6k are diagrams showing examples of processes for manufacturing the rib optical waveguide of FIG. 5;

FIGS. 9a and 9b to FIG. 24 are diagrams showing waveguide variations in accordance with the present invention;

FIGS. 9a and 9b are diagrams showing variations each including a depressed portion only in a rib section for a basic optical waveguide;

FIG. 12 is a view showing an example of a rib section of a rib-type Y-shaped branching waveguide;

FIGS. 13a to 13e are cross-sectional views of the rib example of FIG. 12 along a line XIII—XIII;

FIG. 14 a view showing an example of a rib section of a rib-type Y-shaped branching waveguide;

FIGS. 17 to FIGS. 22a and 22b are diagrams showing waveguide examples each having an asymmetric depressed portion;

FIG. 17 is a diagram showing an example of a waveguide in which the depressed portion is of a rectangular shape;

FIG. 18 is a cross-sectional view of the waveguide example of FIG. 17 along a line XVIII—XVIII;

FIG. 19 is a diagram showing an example of a waveguide in which the depressed portion includes a V-shaped groove;

FIG. 20 is a cross-sectional view of the waveguide example of FIG. 19 along a line XX—XX;

FIG. 21 is a diagram showing a waveguide example in which a depressed portion is formed in each branching waveguide;

FIGS. 22a and 22b are cross-sectional views of the waveguide example of FIG. 21 along a line XXII—XXII;

FIGS. 23 and 24 are plan views showing other variations of the waveguide;

FIG. 45 is a perspective view showing an eighth embodiment of a rib optical waveguide in accordance with the present invention;

FIGS. 46, 47, and 48 are perspective view respectively showing the ninth, tenth, and eleventh embodiments of the waveguide according to the present invention;

FIGS. 52a to 52g are cross-sectional views showing examples of manufacturing processes of the rib-type polyhedral optical waveguide of FIG. 51;

FIGS. 67 and 68 are perspective views showing examples of an optical switch and a directional coupler wherein FIGS. 67 and 68 show examples of a horizontal coupling and a vertical coupling, respectively;

FIGS. 71a to 71e are cross-sectional views showing examples of manufacturing processes of the grating coupler of FIG. 70;

FIGS. 75 to 77 are diagrams showing a twenty-seventh embodiment of a composite grating coupler according to the present invention wherein FIG. 75 shows a perspective view of the overall configuration of the coupler, FIG. 76 illustrates a partially magnified perspective view of the coupler, and FIGS. 77 shows a magnified cross-sectional view thereof along a line LXXVII—LXXVII of FIG. 75;

FIG. 78 is a perspective view showing the overall configuration of the coupler;

FIG. 79 is a magnified perspective view of the coupler, FIG. 79 being equivalent to the cross-sectional view of FIG. 77;

FIG. 80 is a perspective view showing the overall configuration of the coupler;

FIG. 81 is a partially magnified perspective view of the coupler;

FIG. 85 is a perspective view showing an example of the waveguide having an optical waveguide lens;

FIG. 86 is a cross-sectional view of the example of FIG. 85 along a line LXXXVI—LXXXVI;

FIG. 87 is a schematic diagram associted with FIG. 85 showing a state in which propagation light beams are focused;

FIG. 89 is a perspective view showing an example of an optical waveguide having an optical waveguide lens;

FIG. 90 is a cross-sectional view of the example along a line LXXXX—LXXXX of FIG. 89;

FIG. 91 is a schematic diagram associated with FIG. 89 showing a state in which propagation light beams are focused;

FIG. 92 is a perspective view showing an example of an optical waveguide having an optical waveguide lens;

FIG. 93 is a cross-sectional view of the example along a line LXXXXIII—LXXXXIII of FIG. 92;

FIG. 94a is a perspective view showing an example of an optical waveguide having an optical waveguide lens;

FIG. 94b is a cross-sectional view of the example along a line XXXXIIII—LXXXXIIII of FIG. 94a;

FIGS. 95a to 95g are cross-sectional views showing examples of processes of manufacturing an optical waveguide layer including a geodesic lens of FIG. 94a;

FIG. 96a is a perspective view showing an example of an optical waveguide having an optical waveguide lens;

FIG. 96b is a cross-sectional view of the example along a line LXXXXVI—LXXXXVI of FIG. 96a;

FIG. 97 is a disassembled perspective view showing a Bragg-type modulator;

FIG. 98 is a perspective view for explaining the operation of the Bragg-type modulator;

DESCRIPTION OF THE PREFERRED EMBODIMENTS

Figure 1:
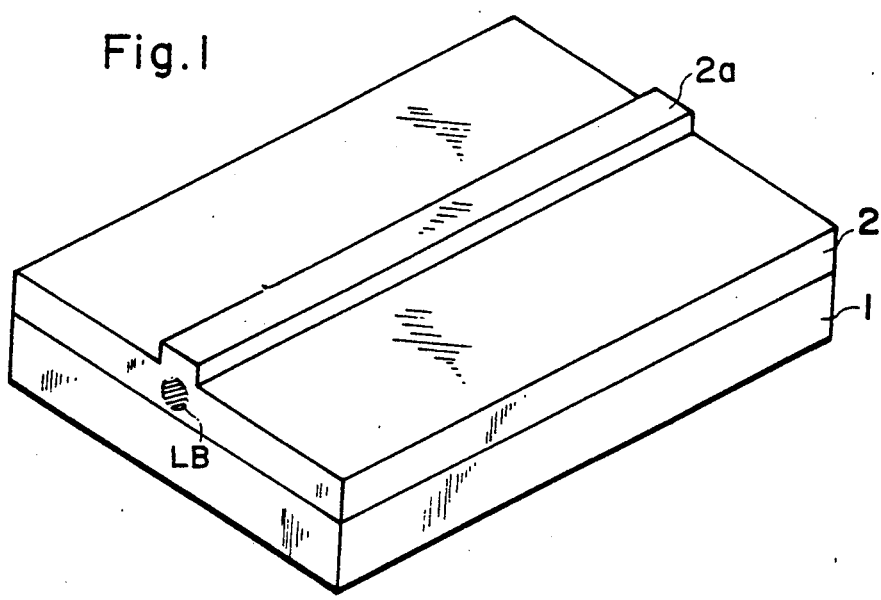
FIG. 1 is a perspective view schematically showing a first embodiment of a rib optical waveguide in accordance with the present invention.

FIG. 1 shows a first embodiment of a rib-type optical waveguide in accordance with the present invention.

The rib-type single-mode optical waveguide of FIG. 1 includes a substrate 1 and a core layer or film 2 formed thereon. The core layer 2 includes a rib section or portion 2a, which projects upward and extends toward a direction. The rib section 2a is fabricated to be integral with the core layer 2.

A light beam LB propagates through the core layer 2 just beneath the rib section 2a as indicated with a broken line and a hatching portion. The light beam LB is confined in the core layer 2 along the vertical direction based on a difference between refractive indices respectively of the core 2 and the air and a difference between refractive indices respectively of the core 2 and the substrate 1. In the horizontal direction, the light beam LB is confined therein at a position just below the rib portion 2a because the effective refractive index at the position immediately beneath the rib section 2a is higher than refractive indices developed in the peripheral locations.

As the substrate 1, a glass substrate of SiO$_2$ having a refractive index 1.46 is for example employed. The core film may be fabricated with an ultraviolet (UV)-setting (curing) resin. The manufacturing method thereof will be described alter. The core layer 2 may be provided with a refractive index 1.47. As above, the core layer 2 has a refractive index slightly larger than that of the substrate 1, which allows the thickness of the core layer 2 and the width of the rib section 2a to be increased in a single-mode optical waveguide.

In addition, a thermosetting substance may be adopted to form the core layer 2. An inorganic material of this type includes for example, a coating liquid employed to form a thermosetting film. Of many kinds of such coating liquid, it is favorable to use a coating liquid containing such substances which form a film through a firing process as ZrO$_2$, TiO$_2$, Al$_2$O$_3$, and SiO$_2$.

Figure 2A:
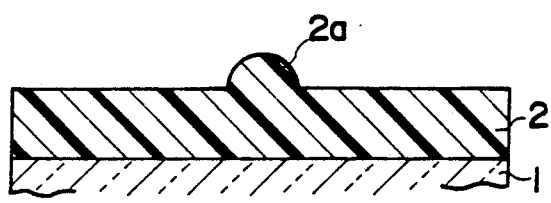
FIGS. 2a to 2e are cross-sectional views showing examples of the contour of a rib section.
Figure 2B:
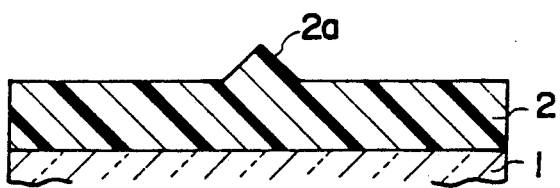
Figure 2C:
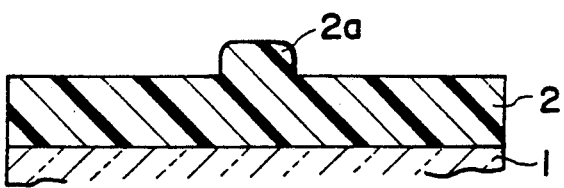
Figure 2D:
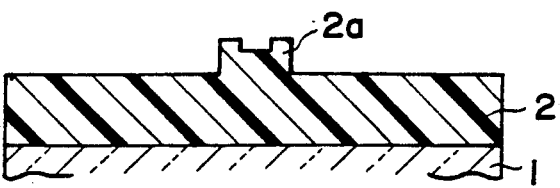
Figure 2E:
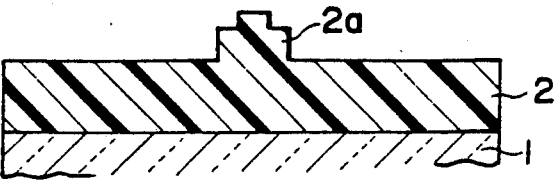

The rib section 2a may have an arbitrary cross-sectional contour. In addition to the rectangular shape of FIG. 1, there may be employed, as shown in FIGS. 2a to 2e, a semi-circular form (FIG. 2a), a triangular contour (FIG. 2b), a generally rectangular shape having rounded corners (FIG. 2c), a generally rectangular form with a small recessed groove in a center thereof (FIG. 2d), and a generally rectangular form with a small projected band in a center (FIG. 2e).

Figure 3:
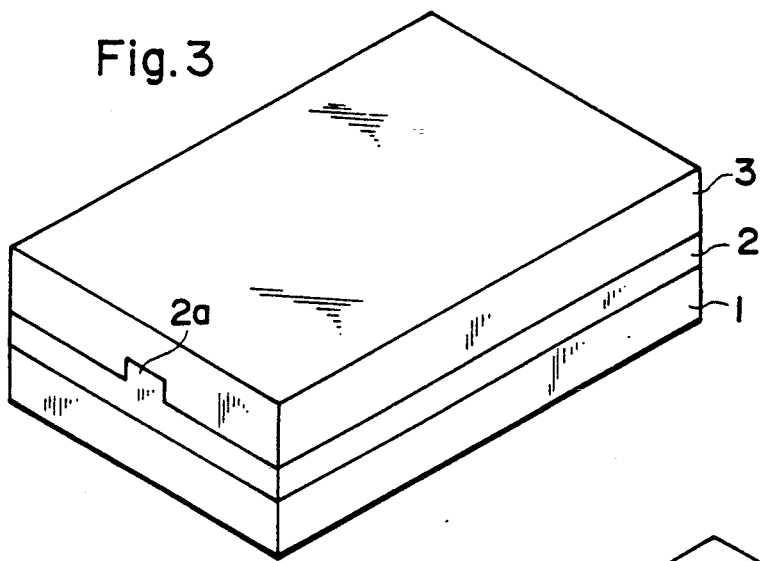
FIGS. 3 to 5 are perspective views respectively showing the second, third, and fourth embodiments of a rib optical waveguide according to the present invention.

FIG. 3 shows a second embodiment of a rib optical waveguide according to the present invention.

The single-mode rib-type waveguide of FIG. 3 includes a core layer 2 and a clad layer 3 formed to be tightly fixed thereon. The clad film 3 is formed with a substance having a refractive index sightly smaller than a refractive index of the core layer 2. For example, for the core layer 2 formed with a UV-setting resin, the clad layer may be fabricated with a UV-setting resin of which a refractive index is less than that of the core layer 2. The refractive index of a UV-setting resin can be changed by altering the amount of fluorine therein. When the UV-setting resin is adopted to manufacture the core film 2 and the clad layer 3, the manufacturing method thereof is facilitated, which will be described later. The substrate 1 is formed, for example, with an SiO$_2$ glass.

The clad layer 3 may be fabricated with, in addition to the organic materials such as the UV-setting resin, inorganic materials. When using such an inorganic substance, the clad layer 3 may be formed in an evaporation method, or the like.

Furthermore, the core layer 2 may be manufactured with, in addition to the UV-setting resin and the coating liquid producing a thermosetting film, such nonlinear organic and inorganic optical materials developing nonlinear optical characteristics as MNA (refractive index=1.8), PTS (refractive index=1.88), and KDP (KH$_2$PO$_4$).

In this fashion, with the provision of the buffer layer 3 on the core layer 2, the core layer 2 can be protected.

Figure 4:
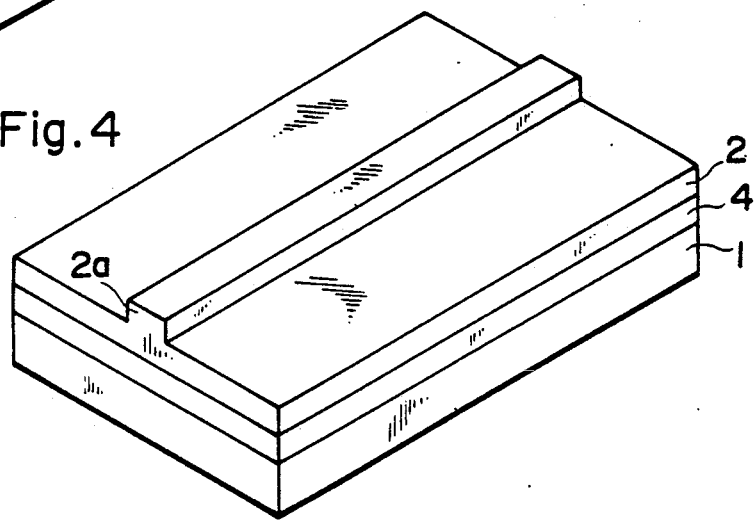

FIG. 4 shows a third embodiment of a rib optical waveguide according to the present invention.

The single-mode rib-type waveguide of FIG. 4 includes a substrate 1, a core layer 2, and a buffer layer 4 formed therebetween. The buffer layer 4 is fabricated with a substance having a refractive index slightly smaller than a refractive index of the core layer 2.

The substrate 1 is manufactured, for example, with LiNbO₃, Si, or GaAs. An SiO₂ glass as sputtered thereonto in an RF sputtering method to create the buffer layer 4. The core layer 2 may be fabricated with the UV-setting resin, the coating liquid forming a thermosetting film, and the nonlinear organic and inorganic optical materials.

The provision of the buffer film 4 enables a substrate of an arbitrary substance to be employed.

Figure 5:
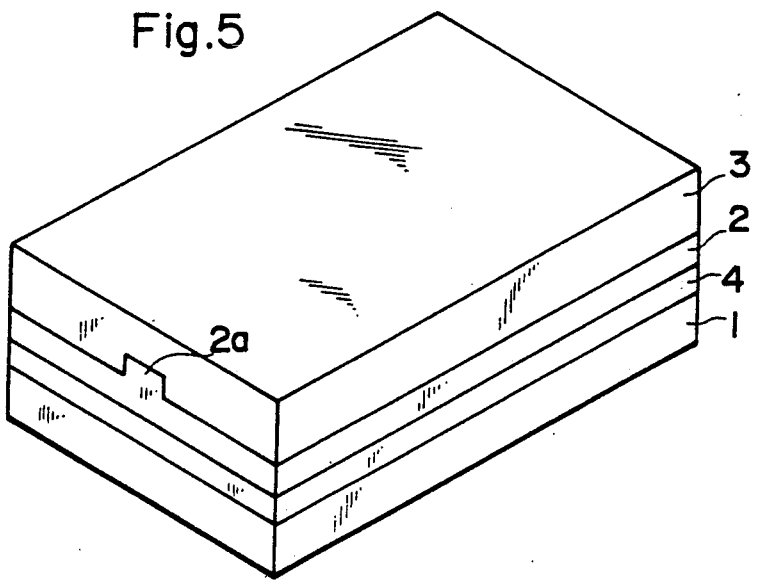

FIG. 5 shows a fourth embodiment of a rib optical waveguide in accordance with the present invention. This waveguide includes a substrate 1, a core layer 2, a buffer layer 4 formed therebetween, and a clad layer 3 disposed on the core layer 2.

Also in the second to fourth embodiments, the rib section 2a of the core layer may be formed in an arbitrary shape.

FIGS. 6a to 6k are cross-sectional views showing an example of process of manufacturing the rib-type single-mode optical waveguide of FIG. 5. In this example, the buffer layer is formed with SiO₂, whereas the core and clad layers are fabricated with a UV-setting resin.

First, a master board or an original plate of the single-mode waveguide is manufactured by use of an electron beam lithography. An electron beam resist is applied on a glass substrate such that a pattern of a rib section is drawn on the resist by use of an electron beam. The resist film is then developed to produce an original board having a remaining resist 12 to be used as the rib section on the glass substrate 11 (FIG. 6a).

Subsequently, an electroforming process is conducted on the board to accumulate nickel (Ni) 13A and then the master board is removed, thereby fabricating a nickel stamper (FIGS. 6b and 6c).

On the other hand, an RF sputtering of SiO₂ is carried out on an optical waveguide substrte 1 to produce a buffer layer 4 (FIG. 6d).

A UV-setting resin 2A as a material of the core layer is applied onto the buffer layer 4 of the substrate 1. Thereafter, the nickel stamper 13 is placed thereron. The substrate 1 are pushed toward the stamper 13 to obtain a predetermined pressure in the gap between the buffer layer 4 on the substrate and the nickel stamper 13. A vibration may also be applied thereto if necessary (FIG. 6e).

Through the rear surface of the substrate 1, an ultraviolet ray is radiated to solidify the UV-setting resin (FIG. 6f).

After the resin is solidified, the stamper 13 is peeled off (FIG. 6g), thereby completly producing the core layer 2 of the UV-setting resin on the buffer layer 4.

Figure 6H:
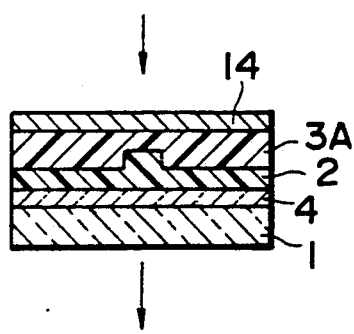

Between a forming plate 14 transparent with respect fo an ultraviolet ray and the core layer 2, a UV-setting resin 3A is injected to form a clad layer (FIG. 6h). An ultraviolet ray is then radiated through the forming plate 14 to solidify the UV-setting resin 3A (FIG. 6i), thereby creating the buffer layer 3.

Figure 6I:
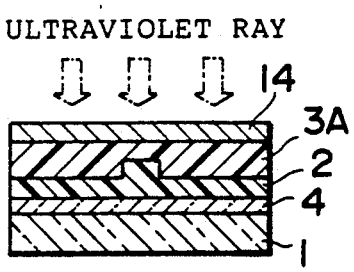
Figure 6J:
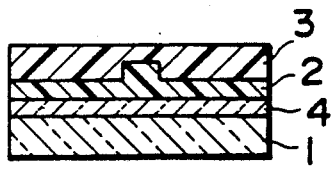
Figure 6K:
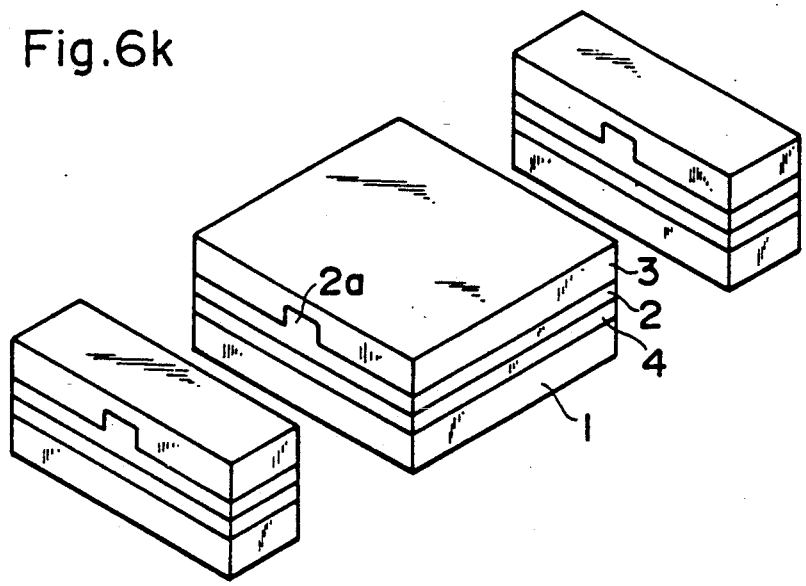

Finally, the forming plate 14 is removed (FIG. 6j). When necessary, division grooves are formed on the rear surface of the substrate so as to divide the entire waveguide along the grooves, thereby producing optical waveguide end surfaces (FIG. 6k). This enables a light to be incident to an end surface of the rib-type optical waveguide.

When manufacturing a rib optical waveguide not including the cad layer of FIG. 4, the processes of FIGS. 6h to 6j need only be omitted.

For a production of a rib optical waveguide not having the buffer layer of FIG. 3, it is only necessary to omit the process of FIG. 6d and to inject the UV-setting resin 2A in the process of FIG. 6e between the substrate 1 and the stamper 13.

In order to fabricate a rib optical waveguide not having the clad layer the buffer layer of FIG. 1, the processes of FIG. 6d and FIGS. 6h to 6j need only be eliminated.

Figure 7A:
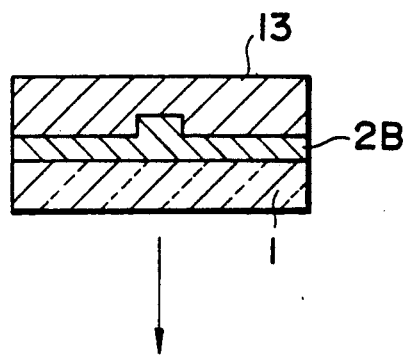
FIGS. 7a to 7c are diagrams illustratively showing examples of processes for manufacturing the rib optical waveguide of FIG. 1.
Figure 7B:
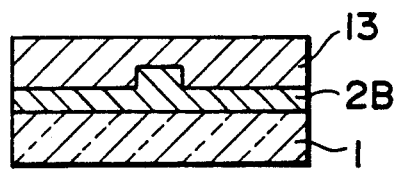
Figure 7C:
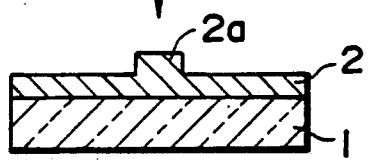

FIGS. 7a to 7c show a process of producing the rib optical waveguide of FIG. 1 by use of a coating liquid forming a thermosetting film as a core material.

The coating liquid forming a film 2B is filled in a gap between a substrate 1 and the stamper 13 thus produced. The pressure between the stamper 13 and the substrate 1 is controlled to be a predetermine pressure value (FIG. 7a). The coating liquid 28 is then baked to be solidified (FIG. 7b), thereby forming a core layer 2. Finally, the stamper 13 is peeled off (FIG. 7c).

Figure 8:
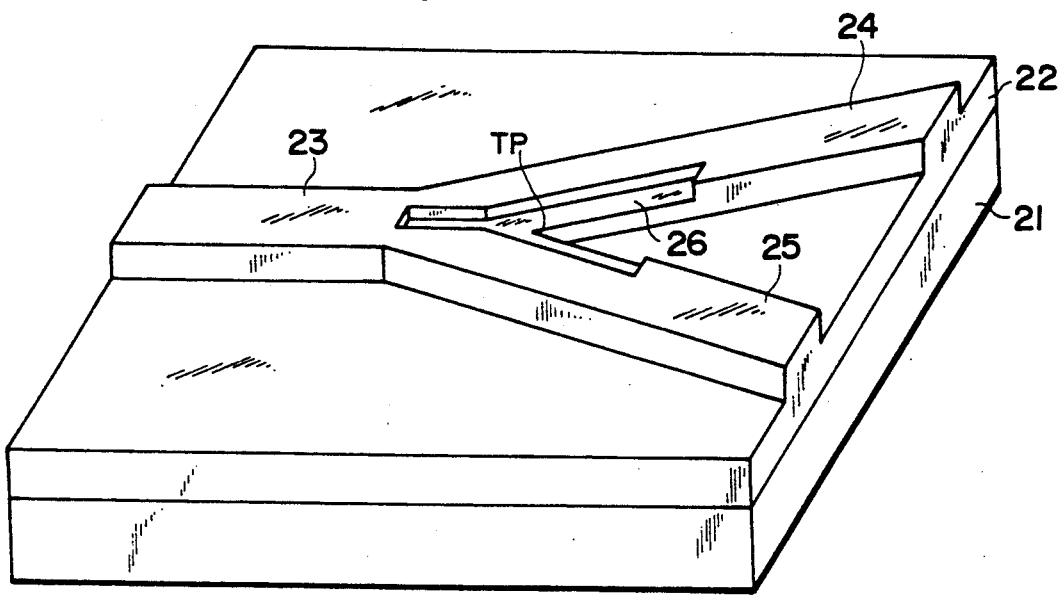
FIG. 8 is a perspective view showing a fifth embodiment of a rib-type Y-shaped branching optical waveguide in accordance with the present invention.

FIG. 8 shows a fifth embodiment of a rib-type Y-shaped optical waveguide.

This waveguide includes a substrate 21 and a core layer 22 fabricated thereon. The core layer 22 has a rib section projected upward. The rib section is formed to be integral with the core layer 22.

The rib section includes a rib section 23 for a fundamental or basic optical waveguide and rib sections 24 and 25 for branching waveguides, which forms Y-shaped branching waveguides extending from an end of the basic waveguide.

In a portion where the branching waveguide rib sections 24 and 25 branch from the basic waveguide rib section 23, a depressed (recessed) portion 26 is formed in these rib sections. The depression 26 is formed in the basic waveguide rib section 23 at a central portion in a width direction thereof and is formed in each branching waveguide rib section 24 and 25 at an inner side along a width direction thereof. For convenience in the following description, a portion where the inner walls respectively of the branching waveguide rib sections 24 and 25 meet each other is called a branch point TP.

In the core layer 2, a light beam propagates just below the rib sections 23 to 25 in accordance with the light confining principle described above. The light passing just beneath the basic waveguide rib section 23 toward the branch point Tp is then separated to propagate through the core layer 22 just beneath each of the Y-shaped branching waveguide rib sections 24 and 25 (these portions serve as Y-shaped branching waveguides). Thanks to the depressed portion 26 in the branch section, the overlapping of field patterns associated with the propagation mode is increased before and the after the branch point TP. Consequently, even if the branch angle between the branch waveguides is increased, the optical loss can be suppressed. Namely, the branch angle may be set to a large value. Conversely, light beams respectively passing through the Y-shaped branching waveguides toward the branch point Tp are combined therein such that the resultant light propagates through the basic waveguide.

The substrate 21 is fabricated, for example, with an SiO₂ glass. The core layer 22 and the rib sections 23 to 25 may be manufactured in an integral manner with a UV-setting resin by use of a stamper in the manufacturing method above.

In addition, for example, a thermosetting substance may also be employed for the core layer 22 and the rib sections 23 to 25.

Figure 9A:
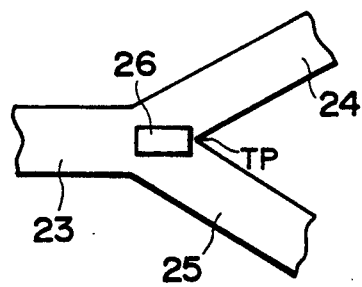

FIG. 9a is a plan view showing only a rib section in a variation of the waveguide. In the rib-type Y-shaped branching waveguide of FIG. 9a, a depressed section 26 is formed from the branch point TP toward the basic waveguide rib section 23. The depression 26 has a rectangular contour in a plan view.

Figure 9B:
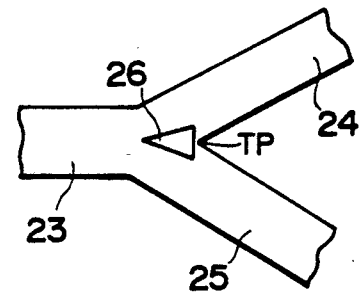

Moreover, FIG. 9b is a plan view showing only a rib section in another variation of the waveguide. In the rib-type y-shaped branching waveguide shown in FIG. 9b, a depressed section 26 is formed to extend from the branch point TP toward the basic waveguide rib section 23. The depression 26 has a triangular contour in a plan view. Namely, the depressed portion 26 is expanded in its width from the rib section 23 toward the rib sections 24 and 25.

Figure 10A:
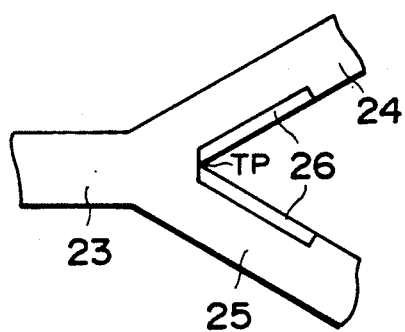
FIGS. 10a and 10b are diagrams showing variations of the waveguide each including a depressed portion only in a rib section for each branching optical waveguide.

In addition, FIG. 10a is a plan view showing only a rib section in still another variation of the waveguide. In the rib-type Y-shaped branching waveguide of FIG. 10a, a depressed section 26 is formed in an inner side of each of the rib sections 24 and 25 to extend from the branch point TP toward the branching waveguide rib sections 24 and 25. In each of the rib sections 24 and 25, the depression 26 has substantially a rectangular contour when viewed from the top side.

Figure 10B:
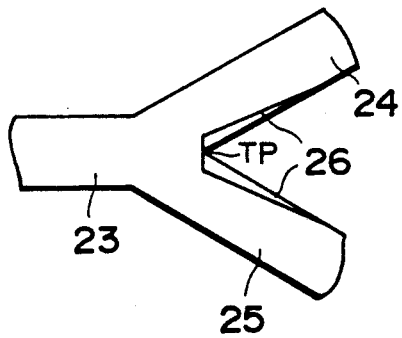

Moreover, FIG. 10b is a plan view showing only a rib section in still another variation of the waveguide Also in the rib-type Y-shaped branching waveguide of FIG. 10b, a depressed section 26 is formed in an inner side of each of the rib sections 24 and 25 to extend from the branch point TP toward the branching waveguide rib sections 24 and 25. In each of the rib sections 24 and 25, the depression 26 has substantially a triangular contour in a plan view, the triangle becoming narrower from the branch point TP toward an end of the section.

Figure 11A:
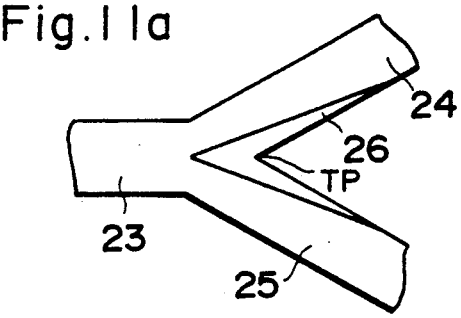
FIGS. 11a to 11d are diagrams showing variations of the waveguide each including a depressed portion in a rib section for a basic optical waveguide and in a rib section for each branching optical waveguide.
Figure 11B:
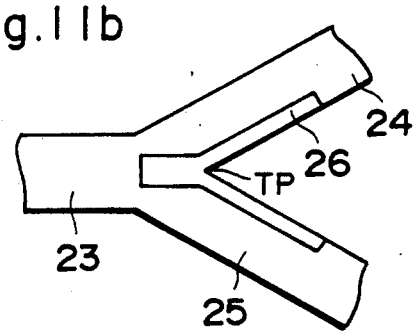

FIGS. 11a to 11d show further other variations of the waveguide. In these rib-type Y-shaped branching waveguide, a depressed portion 26 is formed to extend from the branch point TP toward the basic branching waveguide rib section 23 and toward each of the branching waveguide rib sections 24 and 25. In the variation of FIG. 11a, the depression 26 is formed such that two triangles are arranged to be centered on the propagation direction of the light beam in the basic waveguide rib section 23. The variation of FIG. 11b has the depression 26 in the basic branching waveguide rib section 23 and each of the branching waveguide rib sections 24 and 25 so as to have a rectangular contour in each section when viewed from the top side (identical to the waveguide device of FIG. 8).

Figure 11C:
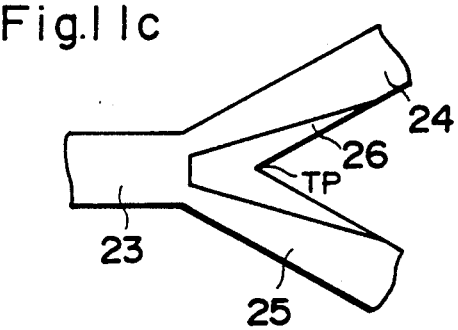
Figure 11D:
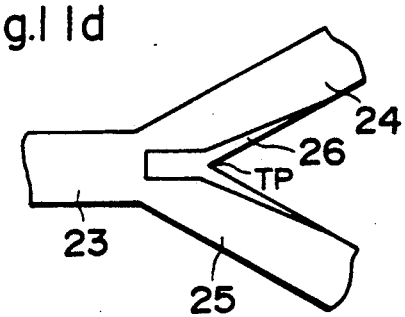

In FIG. 11c, the depression 26 expands its width from the basic branching waveguide rib section 23 toward each of the branching waveguide rib sections 24 and 25 in the form of a trapezoid, which is similar to the depressed portion 26 of FIG. 11a. The depression 26 of FIG. 11d has a rectangular shape in the basic branching waveguide rib section 23 in a plan view; whereas, the depression 26 is formed in a triangular contour in each of the branching waveguide rib sections 24 and 25.

FIGS. 13a to 13e show cross-sectional shapes of the depressed portion 26 taken along a line XIII—XIII in a waveguide of FIG. 12 showing a depression having a contour identical to that shown in FIG. 11c. The cross-sectional contours of the depression 26 may include, in addition to a rectangular shape of FIG. 13a, a triangle contour increasing its depth toward the branch point TP (FIG. 13b), a pentagon (FIG. 13c), a triangle with its vertex on the substrate 21 (FIG. 13d), and a pentagon with its vertex on the substrate 21 (FIG. 13e).

Figure 14:
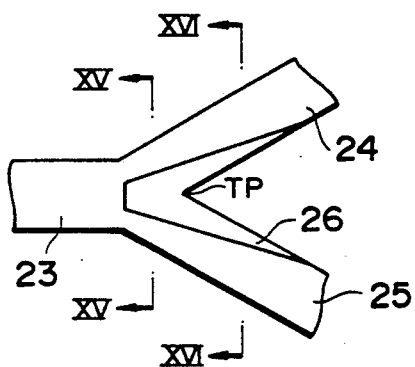
Figure 15A:
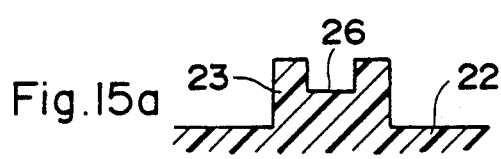
FIGS. 15a to 15d are cross-sectional views of the rib example of FIG. 14 along a line XV—XV.
Figure 16A:
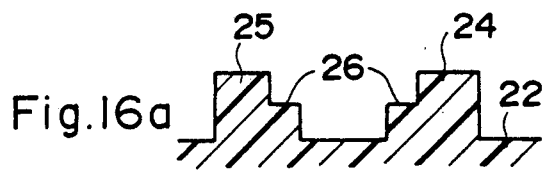
FIGS. 16a to 16c are cross-sectional views of the rib example of FIG. 14 along a line XVI—XVI.
Figure 15B:
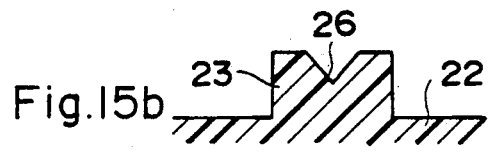
Figure 16B:
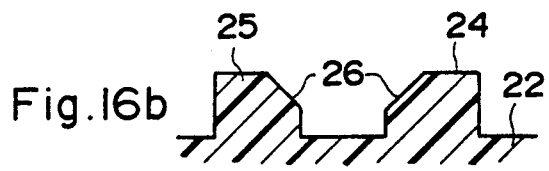
Figure 15C:
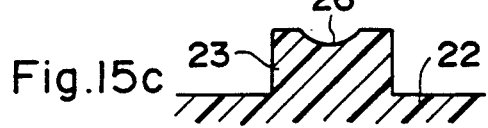
Figure 16C:
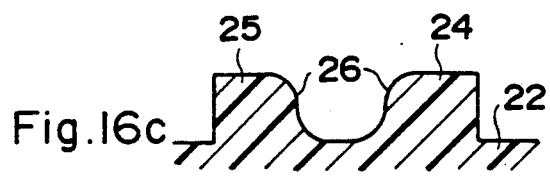

FIGS. 15a to 15d show cross-sectional views of the basic waveguide rib section 23 taken along a line XV—XV of FIG. 14 (representing the same waveguide as that of FIG. 12). FIGS. 16a to 16c show cross-sectional views of the branching waveguide rib sections 24 and 25 taken along a ling XVI—XVI of FIG. 14.

Figure 15D:
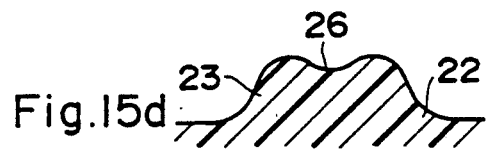

In the rib-type Y-shaped branching waveguide, the rib portion having a depression may also have an arbitrary cross-sectional contour in a direction of the width thereof. The rib section 23 may be formed in a contour which includes, for example, a generally rectangular shape with a depression 26 at a center, the depression having a small rectangular shape in its cross section (FIG. 15a), a generally rectangular shape with a small V-shaped groove formed as depression 26 at a center (FIG. 15b), a generally rectangular shape with a small spherical groove formed as depression 26 at a center (FIG. 15c), or a generally trapezoidal shape with rounded corners, the trapezoid having a small rounded groove formed as depression 26 at a center (FIG. 15d).

The branching waveguide rib sections 24 and 25 may be formed in contours such as a shape of stairs (FIG. 16a), a contour having an inclined inside surface (FIG. 16b), and a generally rectangular shape with a rounded inner portion (16c).

Naturally, in each rib section of FIGS. 9a, 9b, 10a, 10b, and 11a to 11d, the depressed portion 26 may be formed with various kinds of cross-sectional contours.

Figure 17:
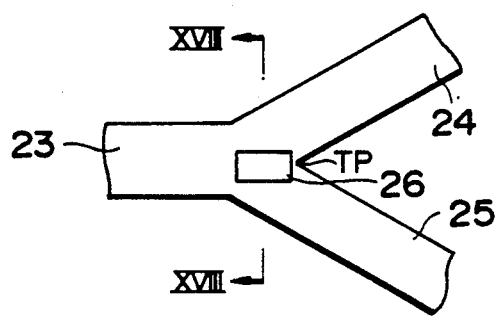
Figure 18:
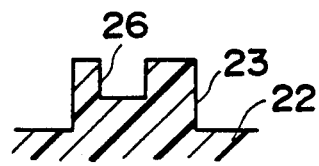
Figure 19:
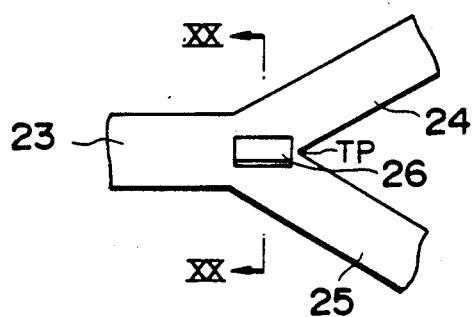
Figure 20:
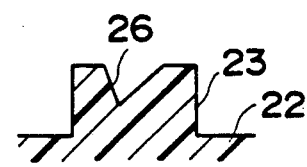

FIGS. 17 to 20 show further other variations. In each variation, a central line of the light propagation direction of the basic waveguide is not aligned with a central line of the depressed portion 26, which namely is asymmetric with respect to the central line of the light propagation direction. In the variation of FIG. 17 of which a cross section along a line XVIII—XVIII is shown in FIG. 18, the depression 26 has a rectangular contour. The variation of FIG. 19 of which a cross section along a line XX—XX is shown in FIG. 20 includes a depression 26 having a contour of a V-shaped groove.

Figure 21:
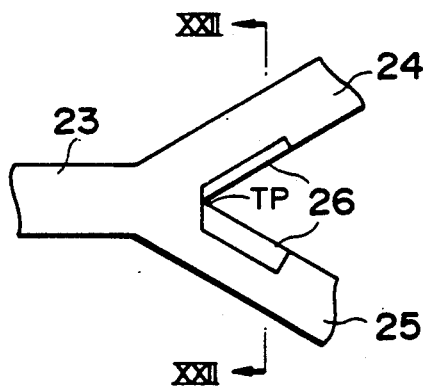
Figure 22A:
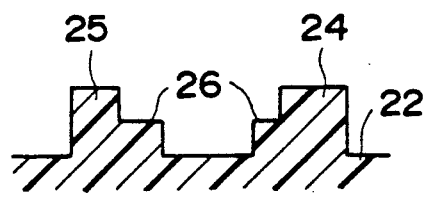
Figure 22B:
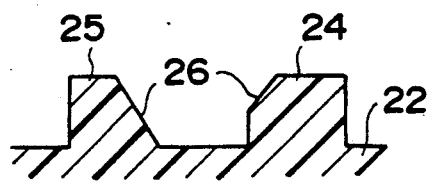

Moreover, FIG. 21 shows an example in which the depressed portion 26 formed in each of the branching waveguide rib sections 24 and 25 has an asymmetric shape. The depression 26 may be of a contour which may be, for example as shown in FIGS. 22a and 22b, a shape of stairs (FIG. 22a) or a contour having an inclined inner side (FIG. 22b) in its cross section.

Figure 23:
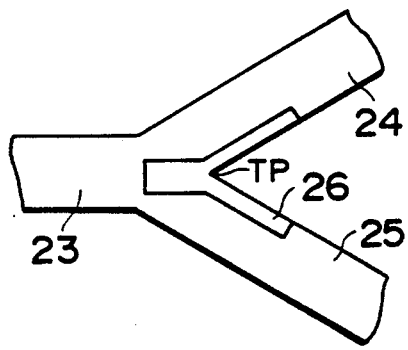

Furthermore, in the variation of FIG. 23, the depression 26 of FIG. 17 and the depression 26 of FIG. 21 are fabricated in the rib section 23 and the rib sections 24 and 25, respectively.

As shown in FIGS. 17 to 23, thanks to the asymmetric contour of the depressed portion 26, the branch ratio of light beams passing through the branching waveguides can be adjusted in an arbitrary manner.

Figure 24:
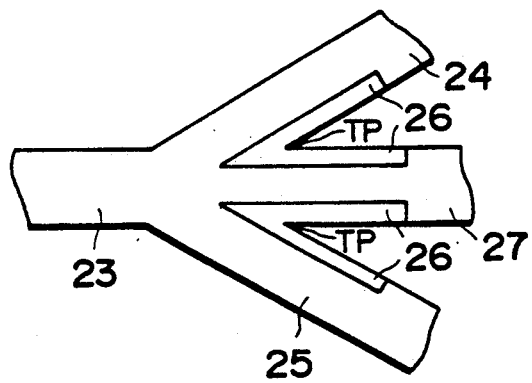

FIG. 24 shows another variation in which in addition to the branching waveguide rib sections 24 and 25, a third branching waveguide rib section 27 is disposed therebetween. Namely, the present invention can be applied to a case where three or more optical waveguides are included. In the central rib section 27, a depression 26 is formed at positions opposing the respective depressions 26 of the rib sections 24 and 25.

In the waveguide above, a buffer layer may be disposed between the substrate 21 and the core layer 22; moreover, a protective film may be formed to cover the core layer 22 and the Y-shaped branching waveguide rib sections.

Figure 25:
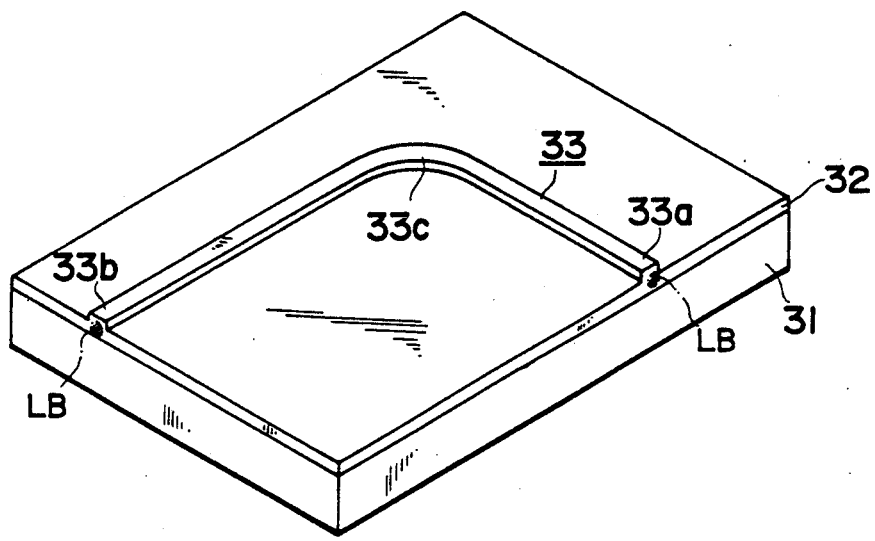
FIG. 25 is a perspective view showing a sixth embodiment of a rib-type corner-bent optical waveguide in accordance with the present invention.

FIG. 25 shows a sixth embodiment of a rib-type corner-bent optical waveguide in accordance with the present invention.

The rib-type curved optical waveguide of FIG. 25 includes a substrate 31 and a core layer 32 formed thereon with a material having a refractive index larger than a refractive index of the substrate 31. The core layer 32 has a rib portion 33 projected upward. The rib portion 33 is formed to be integral with the the core layer 32 and includes a straight-line portion (having end portions 33a and 33b) and a curved portion 33c.

A light beam LB propagates in the core film 32 just under the rib section 33 as indicated with a broken line and a hatching portion.

The substrate 31 may be formed with an SiO2 glass substrate. The core layer 32 and the rib section 33 may be manufactured with a UV-setting resin. In addition thereto, for example, the thermosetting substance described above may be adopted to form the core layer 32 and the rib portion 33.

The core layer 32 including the rib section 33 can be fabricated, by use of a stamper beforehand prepared, on the substrate 31 in a resin forming process. If necessary, a buffer layer may be disposed between the substrate 31 and the core layer 32. A protective film may be formed to cover the core layer 32 and the rib section 33.

Figure 26:
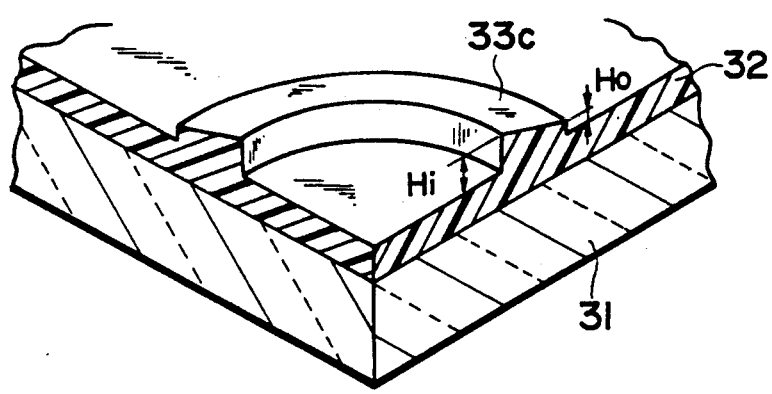
FIG. 26 is a magnified perspective view of the curved portion of the rib-type corner-bent optical waveguide of FIG. 25.
Figure 27:
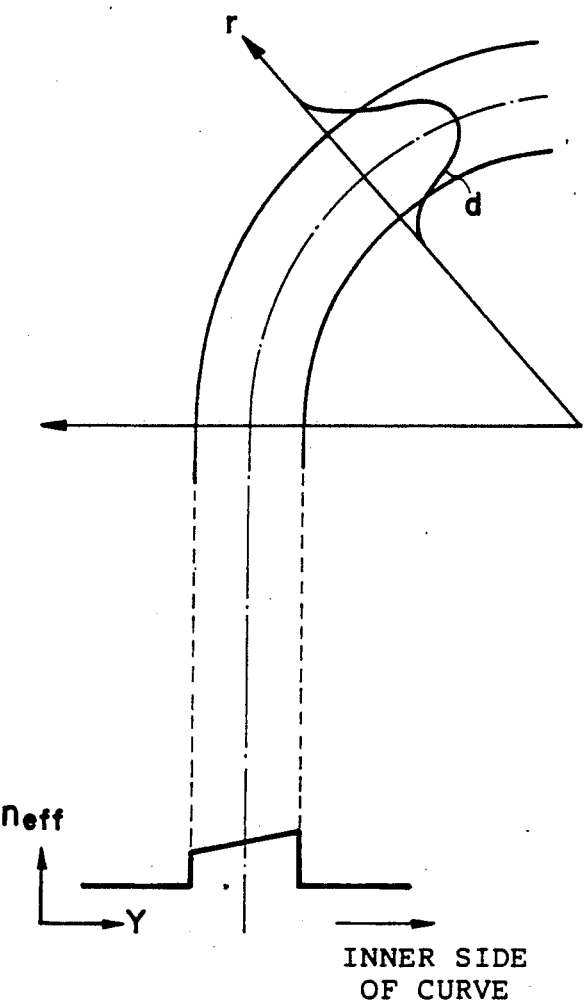
FIG. 27 is a graph showing a field distribution associated with the propagation mode in the rib-type corner-bent optical waveguide of FIG. 25.

FIG. 26 shows a magnified diagram of the curved portion 33c of the rib section 33 in the waveguide of FIG. 25. As can be seen from this diagram, in the curved portion 33c of the rib section 33, an outer height (thickness) $H_0$ is less than an inner height (thickness) $H_i$. In consequence, in the core layer 32 just below the curved portion 33c of the rib section 33, the effective refractive index $n_{eff}$ is higher on the inner side as shown in FIG. 27. As a result, the electromagnetic field distribution d of the propagation light includes a peak position shifted toward the inner side and develops a shape similar to a symmetric contour. Namely, the radiation loss occurring in the conventional corner-bent optical waveguide is minimized.

In the end portions 33a and 33b of the straightline portion of the waveguide shown in FIG. 25, the rib section 33 has a rectangular cross section and hence both sides are of an identical height. In the cross-sectional shape above, from the portions 33a and 33b of the rectangle toward the curved portion 33c, the contour of the rib section 33 is continuously varied so as to be linked with the curved section 33c of which the inner and outer sides have different heights.

Figure 28:
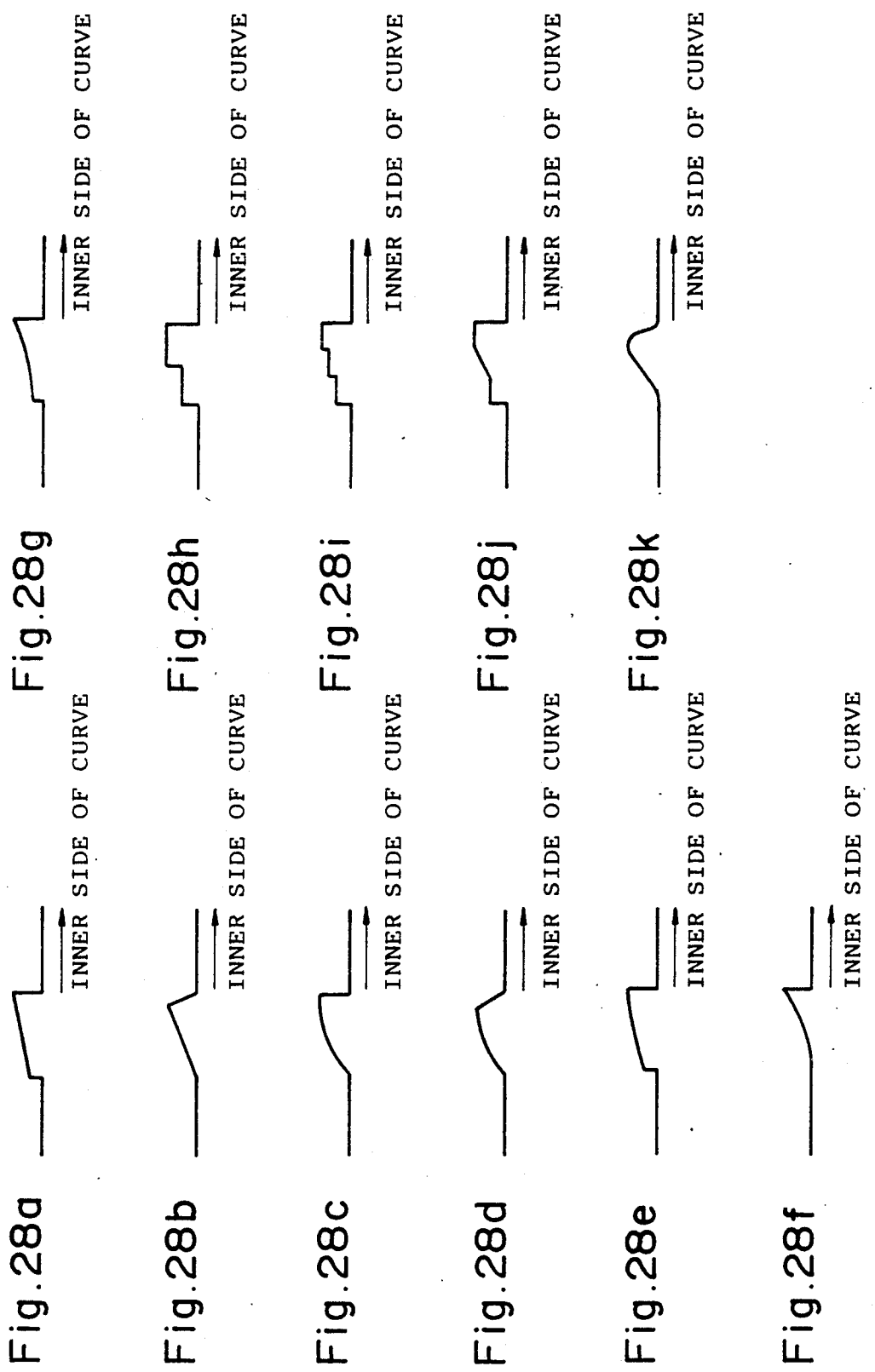
FIGS. 28a to 28k are cross-sectional views showing examples of the contour of curved portion of the rib section.

The curved portion of the rib section 33 may be of any cross-sectional shape only if the inner thickness is larger than the outer thickness in the curved portion. In addition to the trapezoidal contour of FIGS. 25 and 26 (FIG. 28a), there may be adopted, for example, a triangular shape (FIG. 28b), a semi-quadrant form (FIG. 28c), a generally triangular contour with a convex upper edge (FIG. 28d), a generally trapezoidal shape with a convex upper edge (FIG. 28e), a generally rectangular form with a concave upper edge (FIG. 28f), a generally trapezoidal contour with a concave upper edge (FIG. 28g), a contour of stairs (FIGS. 28h and 28i), a shape of stairs with an inclined edge at an intermediate point (FIG. 28j), and a generally triangular contour with rounded corners (FIG. 28k).

Figure 29:
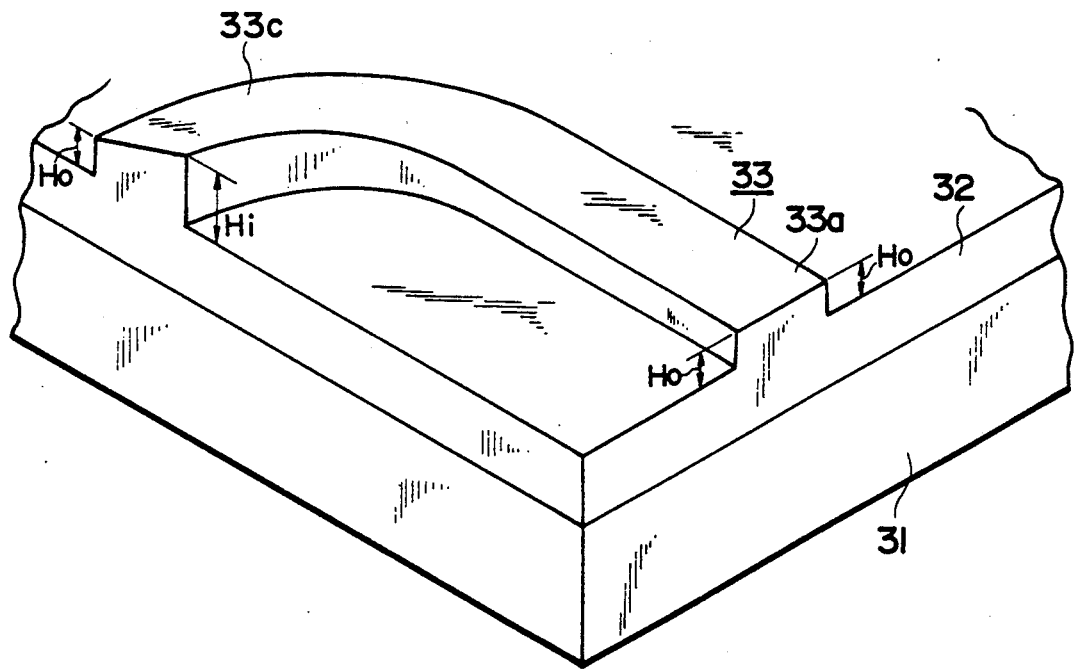
FIGS. 29, 30, and 31 are perspective views respectively showing states in which the thickness of the rib-type curved optical waveguide is continuously varied from a straight-line portion toward the curved portion.
Figure 30:
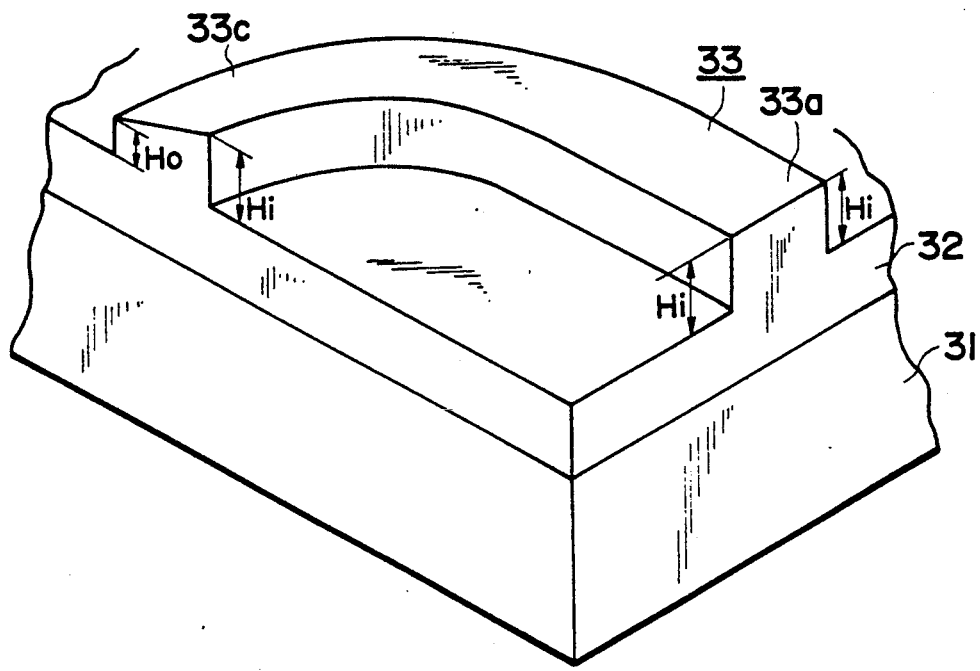
Figure 31:
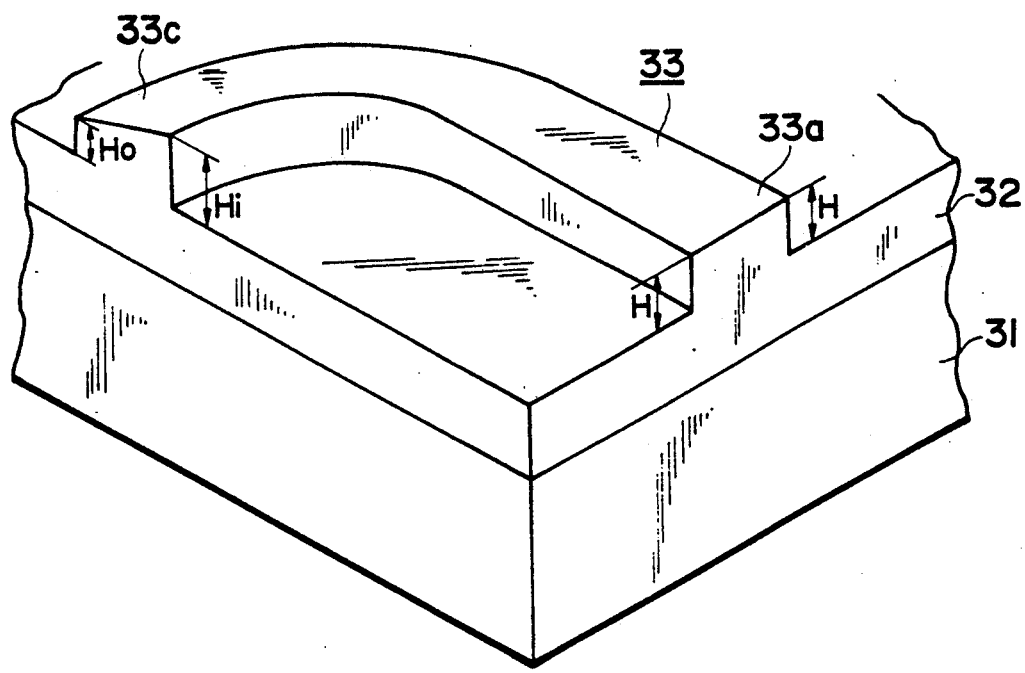

FIGS. 29 to 31 respectively show states in which from a straight portion 33a having a rectangular cross section toward a curved portion having different heights on the inner and outer sides thereof, the cross-sectional contour of a rib portion 33 is continously changed. In FIG. 29, the rib section 33 has a fixed outer thickness $H_o$, and an inner thickness $H_i$ thereof is successively increased from the straight portion 33a toward the curved portion 33c.

In a waveguide of FIG. 30, the rib section 33 has a fixed inner thickness $H_i$, whereas an outer thickness $H_o$ thereof is successively decreased from the straight portion 33a toward the curved portion 33c.

In FIG. 31, the outer thickness of the rib section 33 is continuously decreased from H to $H_0$ in a direction from the straight portion 33a toward the curved portion 33c, whereas the inner thickness is continuously increased from H to $H_i$.

Figure 32:
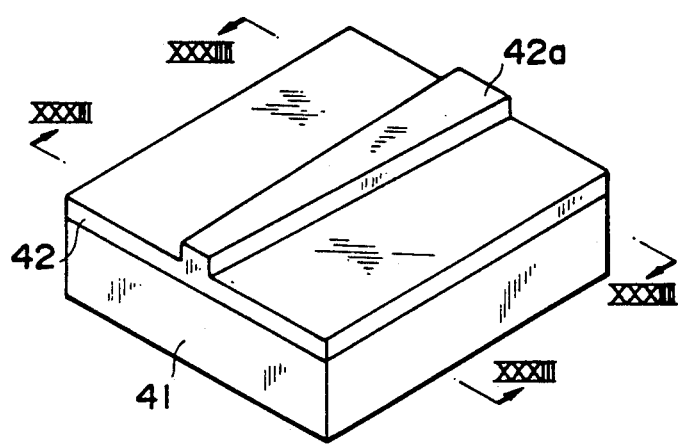
FIG. 32 is a perspective view showing a seventh embodiment of a rib optical waveguide used as a beam shape conversion device in accordance with the present invention.
Figure 33:
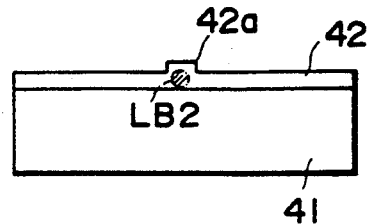
FIG. 33 is a cross-sectional view of the seventh embodiment of FIG. 32 along a line XXXIII—XXXIII.
Figure 34:
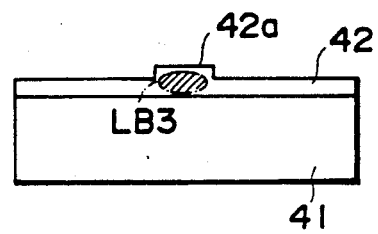
FIG. 34 is a cross-sectional view of the seventh embodiment of FIG. 32 along a line XXXIIII—XXXIIII.

FIG. 32 is a perspective view showing an example of a rib-type optical waveguide in a seventh embodiment used as a beam contour conversion device in accordance with the present invention. FIGS. 33 and 34 respectively show cross sections taken along lines XXXIII—XXXIII and XXXIIII—XXXIIII of FIG. 32. In these cross-sectional views, for an easy understanding of the beam contour, the hatching is not employed. This is also the case of FIGS. 36, 37, 39, 40, 42, and 43.

The rib-type optical waveguide of FIG. 32 includes a substrate 41 and a core layer 42 formed thereon, the layer 42 having a refractive index larger than a refrative index of the substrate 41. The core layer 42 includes at a center thereof a rib portion 42a projecting upward and extending in a direction. The rib portion 42 and the core layer 42 are integrally fabricated. A light beam propagates through the core layer 42 just below the rib section 42a.

The rib section 42 has a rectangular cross section, which continuously increases its width in a direction from a side to the other side. Consequently, the cross-sectionional shape of the propagation light beam LB2 is a very small circle on the side where the cross section is smaller. The cross-sectional contour is successively altered such that on the other side, the contour of the beam light LB3 is an ellipse having a longer axis in the horizontal direction.

The core layer 42 having the rib portion 42a can be formed, by use of a stamper beforehand prepared, through a resin forming process. An etching process and a lift-off method may also be adopted to form the core layer 42 with the rib section 42a.

The substrate 41 may be implemented by use of an SiO2 glass substrate, for example; whereas the core layer 42 may be fabricated with a UV-setting resin. In addition to the resin, for example, a thermosetting material may also be employed to fabricate the core layer 42.

If necessary, a clad layer may be disposed between the substrate and the core layer. A protective layer may be formed to cover the core layer.

Figure 35:
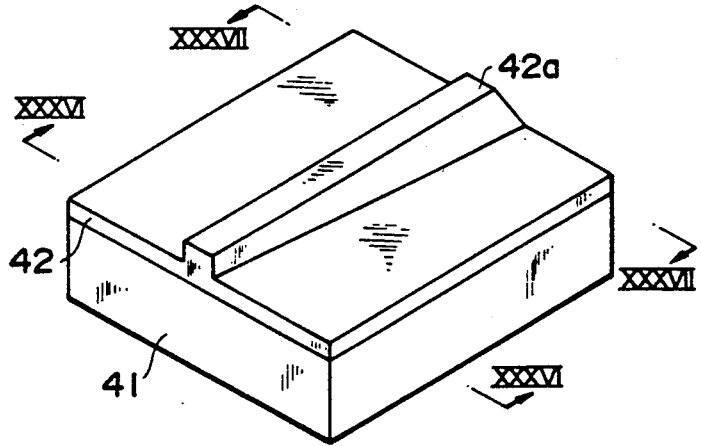
FIG. 35 is a perspective view showing a variation example of the rib-type optical waveguide.
Figure 36:
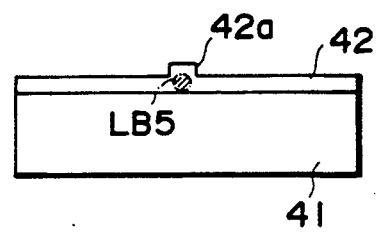
FIG. 36 is a cross-sectional view showing the variation of FIG. 35 along a line XXXVI—XXXVI.
Figure 37:
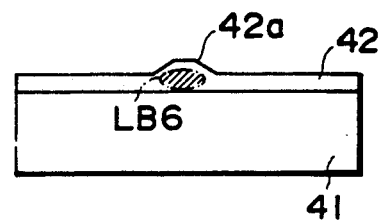
FIG. 37 is a cross-sectional view showing the variation of FIG. 35 along a line XXXVII—XXXVII.

FIG. 35 is a perspective view showing a variation of the rib-type optical waveguide. FIGS. 36 and 37 respectively show cross sections along lines XXXVI—XXXVI and XXXVII—XXXVII of FIG. 35. In these diagrams, the same constituent components are assigned with an identical reference numeral and a redundant description thereof will be avoided.

A rib section of a rib-type optical waveguide 42 of FIG. 35 has a cross section of which the contour is rectangle on a side as shown in FIG. 36. The contour continuously varies therefrom toward the opposite side to be a trapozoidal shape as shown in FIG. 37. With this provision, the propagation light beam LB5 on the side of the rectangular contour has a shape of a small circle. The beam shape is then converted so as to be an ellipse on the other end, the ellipse being elongated along the horizontal direction.

Figure 38:
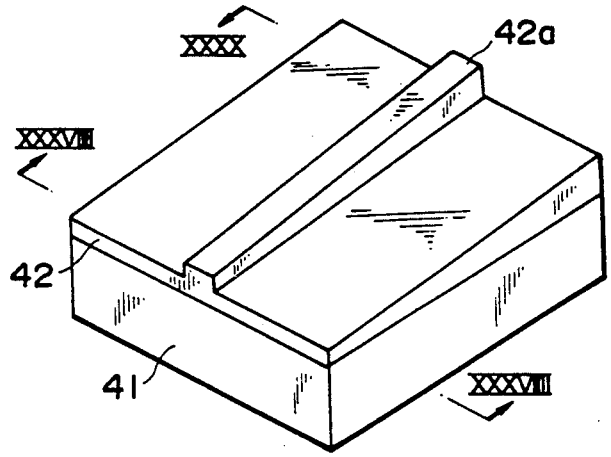
FIG. 38 is a perspective view showing another variation example of the rib-type optical waveguide.
Figure 39:
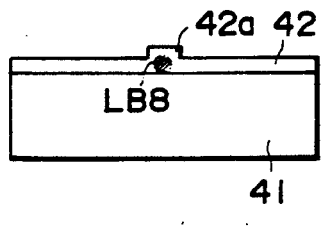
FIG. 39 is a cross-sectional view showing the variation of FIG. 38 along a line XXXVIIII—XXXVIIII.
Figure 40:
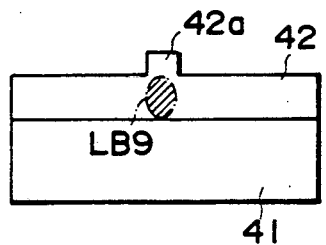
FIG. 40 is a cross-sectional view showing the variation of FIG. 38 along a line XXXX—XXXX.

FIG. 38 is a perspective view showing another variation of a rib optical waveguide. FIGS. 39 and 40 respectively show cross sections taken along lines XXXVIIII—XXXVIIII and XXXX—XXXX of FIG. 38. Also in these figures, like in the case of FIG. 32, the same constituent components are assigned with the same reference numeral and a redundant description thereof will be avoided.

In the waveguide of FIG. 38, a core layer 42 continuously increases its thickness along a direction from a side to the other side. Although a rib section 42a has a fixed width, the height thereof is continuously increased from the side toward the other side. Consequently, as shown in FIG. 39, the propagation light beam LB8 on the side of the rectangular contour has a shape of a small circle. The beam shape is then converted into a beam LB9 having a contour of an ellipse on the other end, the ellipse being elongated along the vertical direction.

Figure 41:
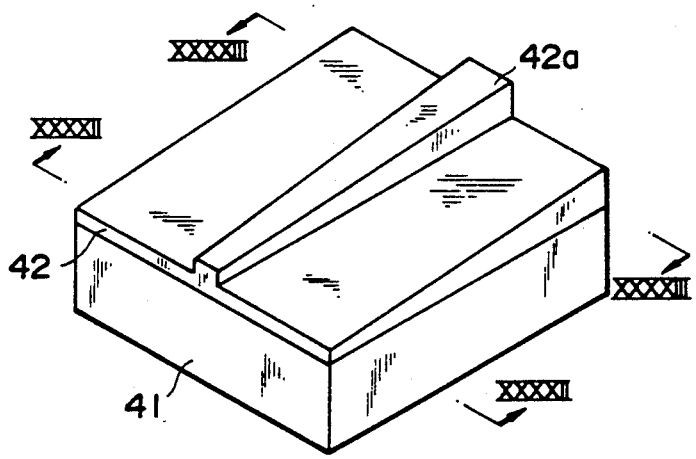
FIG. 41 is a perspective view showing still another variation example of the rib-type optical waveguide.
Figure 42:
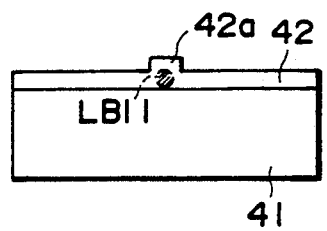
FIG. 42 is a cross-sectional view showing the variation of FIG. 41 along a line XXXXII—XXXXII.
Figure 43:
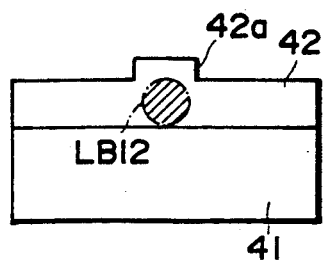
FIG. 43 is a cross-sectional view showing the variation of FIG. 41 along a line XXXXIII—XXXXIII.

Furthermore, FIG. 41 is a perspective view showing still another variation of a rib optical waveguide. FIGS. 42 and 43 respectively show cross sections taken along lines XXXXI—XXXXI and XXXXIII—XXXXIII of FIG. 42. Also in these diagrams, like in the case of FIG. 32, the same constituent components are assigned with the same reference numeral and a redundant description thereof will be dispensed with.

In the waveguide of FIG. 41, a core layer 42 continuously increases its thickness along a direction from a side to the other side. Moreover, a rib section 42a successively increases its width and height from the side toward the other side. Consequently, as shown in FIG. 42, the propagation light beam LB11 on the side has a shape of a small circle. In contrast thereto, as shown in FIG. 43, the cross section of the beam is converted such that the beam LB12 develops a contour of an enlarged circle at the other end portion.

Figure 44:
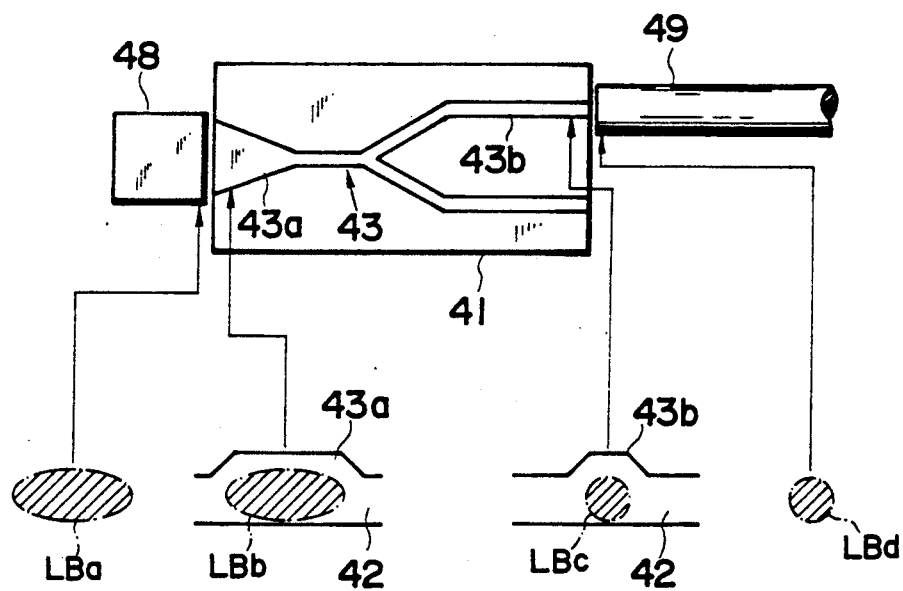
FIG. 44 is a diagram including a plan view showing an example in which a laser diode is optically coupled with an optical fiber by use of a beam shape conversion device in accordance with the present invention and cross-sectional views of the propagation light beam.

FIG. 44 shows a state in which a laser diode 48 and an optical fiber 49 are optically coupled respectively with a first side and a second side of a rib optical waveguide including a rib section of which the cross-sectional contour changes in a continuous fashion. On a substrate 41 is formed a Y-shaped branching rib section 43 having a cross section of which the contour is a trapezoid on the first side. The rib section 43 branches into two subsections; moreover, the width of the trapezoidal shape is continuously reduced toward the second side. In consequence, in the first-side portion 43a, there is attained a propagation light pattern LBb having an elliptic contour substantially identical to the shape of the emission beam pattern LBa of the laser diode 48. In the second-side portion 43b, a propagation light pattern LBc is attained with a circular shape which is almost equal to the contour of the propagation light pattern LBd of the optical fiber 49. As above, also for optical elements respectively having different propagation light patterns, a pattern matching can be accomplished between the propagation light patterns to be optically coupled. This resultantly prevents the light coupling los from being increased.

Naturally, in the rib section 43 having a Y-shaped branching contour in FIG. 44, a depressed portion as shown in FIG. 8 may be formed.

FIG. 45 shows an eighth embodiment in accordance with the present invention.

The rib single-type optical waveguide of FIG. 45 comprises a substrate 51 and a core layer 52 fabricated thereon. The core layer 52 includes at a center thereof a rib portion 53 projecting upward and extending in a direction. In a predetermined location of the rib section 53, there is disposed a grating 53a configured by periodically altering the thickness (height) of the rib section 53. The rib section 53 and the grating 53a are formed to be integral with the core layer 52.

A light beam LB is propagated through the core layer 52 just below the rib section 53 as indicated with a broken line and a hatching portion. The light beam LB is confined in the core layer 52 along a vertical direction based on a refrative index difference between the core layer 52 and the air and a refractive index difference between the core layer 52 and the substrate 51. In the horizontal direction, the beam LB is confined therein just beneath the rib section 53 owing to a fact that the effective refractive index in the core layer 52 just below the rib section 53 is higher than those developed in the peripheral portions.

Thanks to existence of the grating 53a formed by periodically changing the thickness of the rib section 53, the effective refractive index just beneath the rib section 53 also periodically develops a high value. A grating of a refractive index distribution type is resultantly formed in the propagation route of the light beam LB. The grating is provided with functions, for example, to reflect therefrom or to pass therethrough a light beam LB having a particular wavelength.

The substrate 51 may be formed, for example, with an $SiO_2$ glass having a refractive index of 1.46. The core layer 52 may be fabricated with a UV-setting resin. The fabrication method will be described later. The core layer 52 may possibly be provided with a refractive index of 1.47. In this fashion, since the obtained core layer 52 has a refractive index which is slightly higher than that of the substrate 51, the thickness of the core layer 52 and the width of the rib section 53 can be increased in a single-mode optical waveguide.

In addition to the material above, a thermosetting resin, for example, may also be adopted to form the core layer 52. As an example of a thermosetting inorganic substance, there may be used a coating liquid forming a thermosetting film. Of various types of coating solutions, it is favorable to use coating solutions containing such substances solidifying through a firing process as $ZrO_2$, $TiO_2$, $AlO_3$, and $SiO_2$.

The rib section 53 may be formed with an arbitrary cross-sectional contour. In addition to the rectangular shape shown in FIG. 45, there may be used such contours as a semi-circle, a triangle, a generally rectangular contour with rounded corners, a generally rectangular shape with a small depressed groove formed at a center thereof, and a generally rectangular contour with a small projected band configured at a center thereof.

Figure 47:
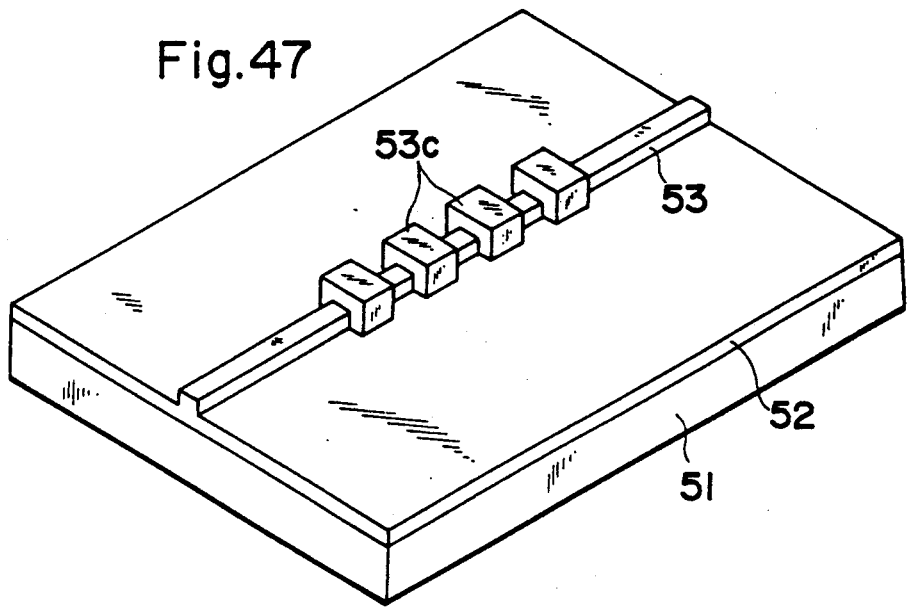

The grating may also be structured in various contours. FIG. 46 shows a ninth embodiment according to the present invention in which a grating 53b is configured by periodically varying the width of a rib section 53. FIG. 47 shows a tenth embodiment according to the present invention in which a grating 53c is configured by periodically varying the thickness and width at each objective position of a rib section 53. These gratings 53b and 53c each may have functions, for example, to reflect therefrom or to pass therethrough a propagation light beam having a particular wavelength.

Figure 48:
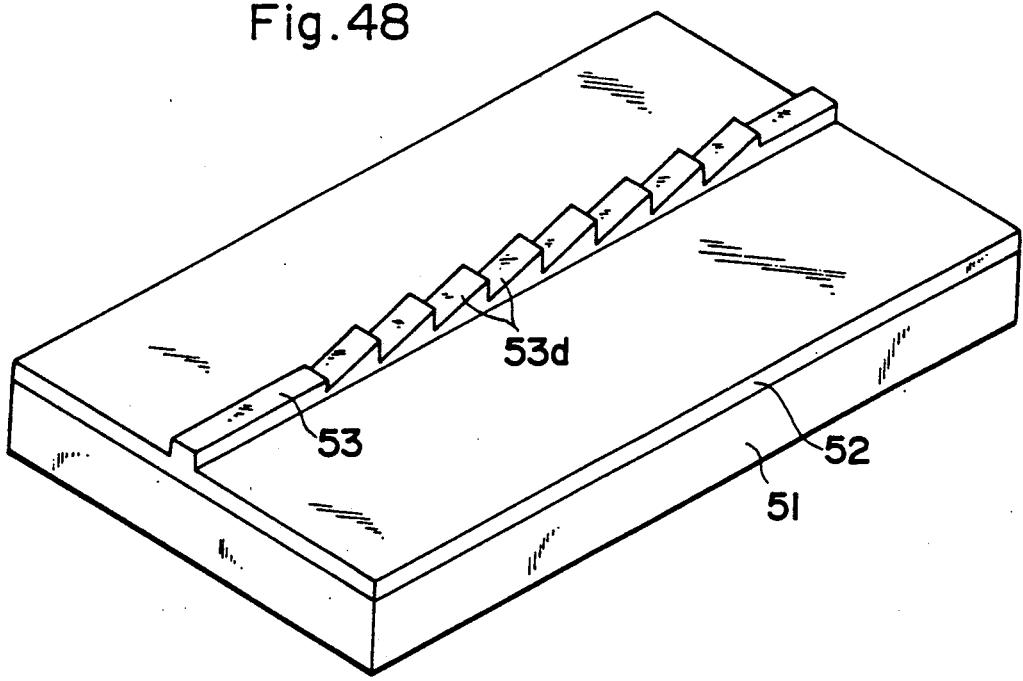

FIG. 48 shows an 11th embodiment according to the present invention in which a grating 53d is configured by periodically varying the thickness of a rib section 53. Moreover, the grating 53d is blazed (formed in a triangular shape). The grating 53d causes a propagation light beam to be emitted upward and furthermore has a function to guide a light entering thereto from a space thereabove into the waveguide.

Various kinds of gratings respectively having different periods may be formed in a plurality of different positions of the rib section. This results in a function to reflect lights in a broad wavelength range. Furthermore, a wavelength separation may be achieved on the propagation light.

On the core layer a clad layer may be fabricated to be tightly fixed thereto. The clad layer is formed with a material having a refractive index slightly less than a refractive index of the core layer. For example, for a core layer manufactured with a UV-setting resin, the clad layer may be formed with a UV-setting resin having a refractive index smaller than a refractive index of the core layer material. The refractive index of the UV-setting resin can be altered by changing the amount of fluorine contained therein. When the core and clad layers are fabricated with a UV-setting resin, the production method thereof is facilitated.

In addition to organic materials including the UV-setting resin, inorganic substances may also be employed to form the clad layer. When such an inorganic material is used, the clad layer may be produced, for example, through an evaporation process.

Furthermore, the core layer may be formed with, in addition to the UV-setting resin and the coating liquid forming a thermosetting film, such nonlinear organic and inorganic optical substances developing a nonlinear optical characteristic as MNA (refractive index=1.8), PTS (refractive index=1.88), and KDP ($KH_2PO_4$).

As above, with the provision of the clad layer disposed on the core layer, the core layer can be protected.

Moreover, a buffer layer may be disposed between the substrate and the core layer. The buffer layer is fabricated with a material having a refractive index slightly lower than the refractive index of the core layer.

For example, the substrate is fabricated with $LiNbO_3$, Si, GaAs, or the like such that an RF sputtering of an $SiO_2$ glass is carried out on the substrate to form a buffer layer. The core layer may be formed with such material as the UV-setting resin, the coating liquid forming a thermosetting film, or nonlinear organic and inorganic optical substances.

By disposing the buffer layer as above, an arbitray material may be selected for the substrate.

It is also possible to form a core layer over the substrate with a buffer layer disposed therebetween such that a clad layer is fabricated on the core layer.

FIGS. 49a to 49f show an example of a process of manufacturing a rib-type single-mode waveguide of FIG. 45.

Figure 49A:
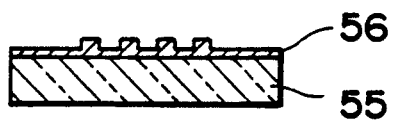
FIGS. 49a to 49f are cross-sectional views showing examples of processes of manufacturing the rib optical waveguide of FIG. 45.
Figure 49B:
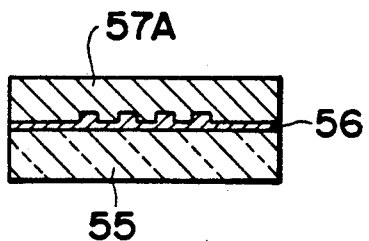

An original board or a master plate of the waveguide is created through an electron beam lithography. Namely, an electron beam resist is applied onto a glass substrate and then a pattern of a rib section having a grating is drawn by use of an electron beam. The resist film is then developed to attain a master board including a remaining resist layer 56, which serves as a rib section having a grating on the glass substrate 55 (FIG. 49a).

The remaining resist film 56 includes thick portions associated with the grating. In a case where an electron beam writing is not sufficient to form the remaining resist film for the rib section having an accurate contour, the process above including the resist coating, the electron beam writing, and development of the resist need only be repeatedly accomplished several times to form a remaining resist layer comprising a plurality of films thus accumulated.

Figure 49C:

Subsequently, nickel (Ni) film 57A is formed on the original board through an electroforming process (FIG. 49b) and then the board is removed, thereby attaining a nickel stamper 57 (FIG. 49c).

Figure 49D:
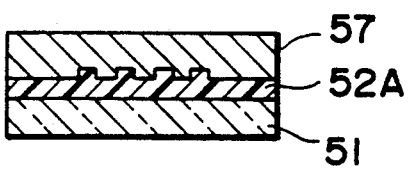

Next, a UV-setting resin 52A as a material of a core layer is applied onto the substrate 51 and then the nickel stamper 57 is placed thereon. The substrate 51 and the stamper 57 are depressed against each other to develop a predetermined gap therebetween. If necessary, a vibration is applied in this operation (FIG. 49d).

Figure 49E:
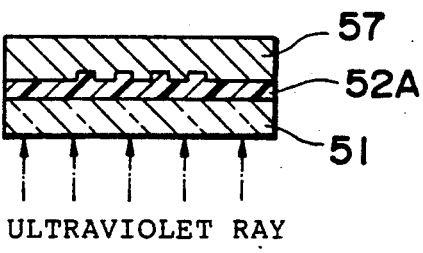

Through a rear side of the substrate 51, an ultraviolet ray is radiated to solidify the UV-setting resin (FIG. 49e).

Figure 49F:
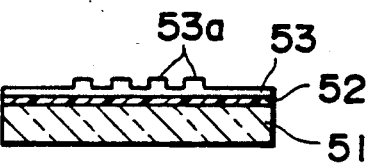

After the resin becomes solid, the stamper 57 is peeled off (FIG. 49f). As a result, a core layer 52 of the UV-setting resin is fabricated on the substrate 51. In the core layer 52, there is integrally formed a rib section 53 having a grating 53a.

Figure 50:
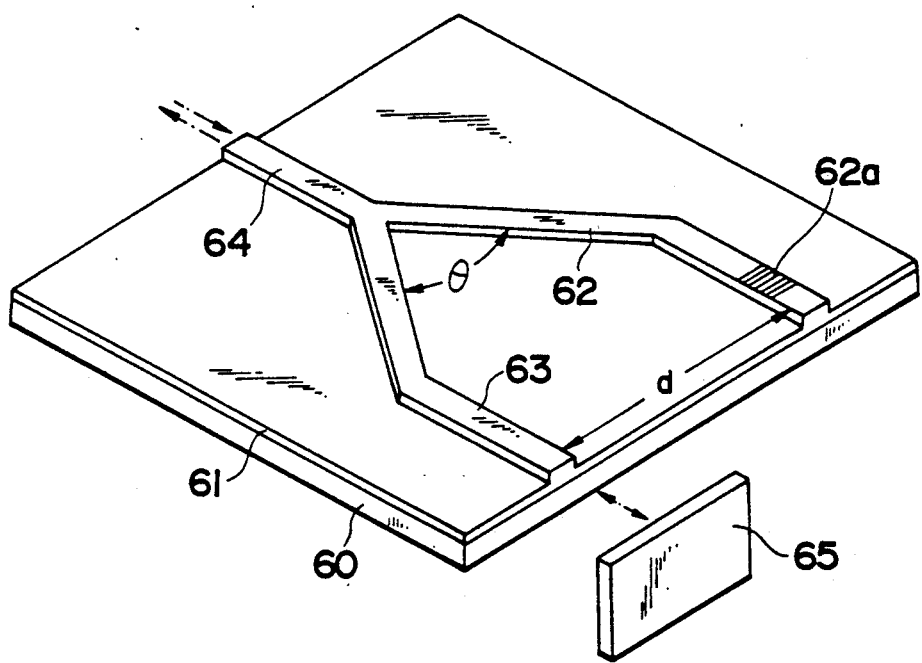
FIG. 50 is a perspective view showing an interference-type displacement sensor as an application example of rib optical waveguide in accordance with the present invention.

FIG. 50 shows an application of a rib-type optical waveguide in accordance with the present invention. This configuration is an interference-type displacement sensor in which the grating of the rib section is adopted as a reflector. The grating disposed in the rib section functions, depending on a period thereof, as a reflector, a wavelength separation filter for passing therethrough or for reflecting therefrom a light having a particular wavelength, or a mode converting unit for converting the mode of the propagation light. In this application example, the grating serves as a reflector.

On a substrate 60, there is formed a core layer 61 including a Y-shaped branching rib having three rib sections 64, 62, and 63. The rib section 62 includes a grating 62a in a portion thereof. The y-shaped branching rib constitutes a Y-shaped branching waveguide.

A light incident to an optical waveguide just under the rib section 64 is split at the branch section into two portions of lights passing through waveguides just beneath the rib sections 62 and 63, respectively. The light propagated through the waveguide just beneath the rib section 62 is reflected o the grating 62a. The light propagated through the waveguide just beneath the rib section 63 is reflected on a mirror 65 disposed at an outside position to be coupled in the branch section with the light reflected from the grating 62. The mirror 65 is arranged on an object of which a displacement is to be measured. A phase difference between these two light beams varies in association with the displacement of the mirror. In consequence, by sensing an interference signal emitted from the optical waveguide just under the rib section 64, the displacement of the mirror 65 can be measured on a submicron order.

Figure 118:
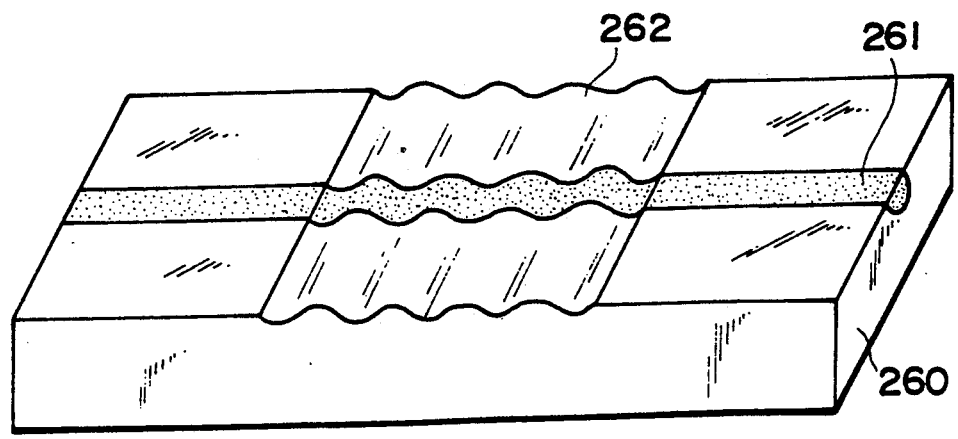
FIG. 118 is a perspective view showing the configuration of the conventional channel waveguide grating.
Figure 119:
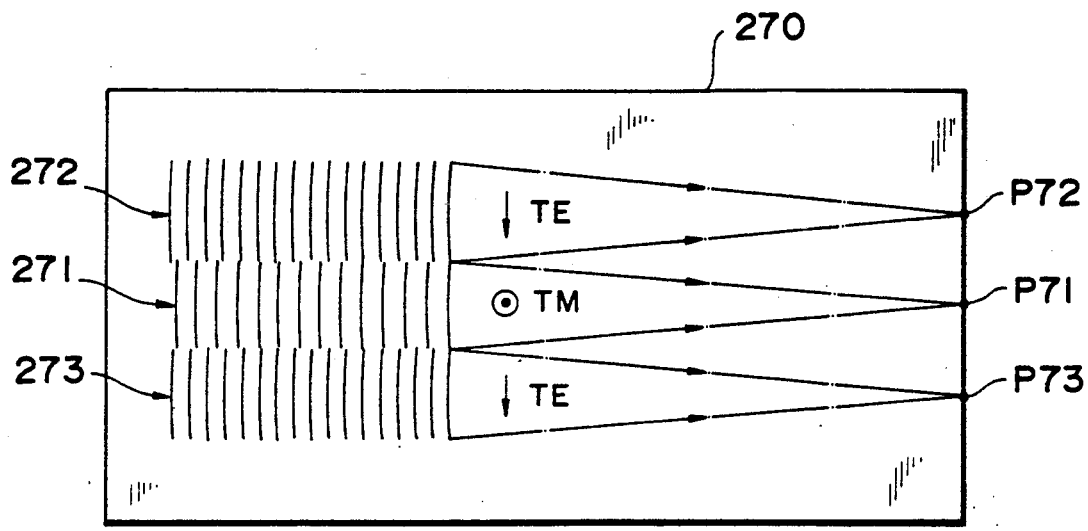
FIG. 119 is a plan view showing the structure of the conventional grating coupler.
Figure 120:
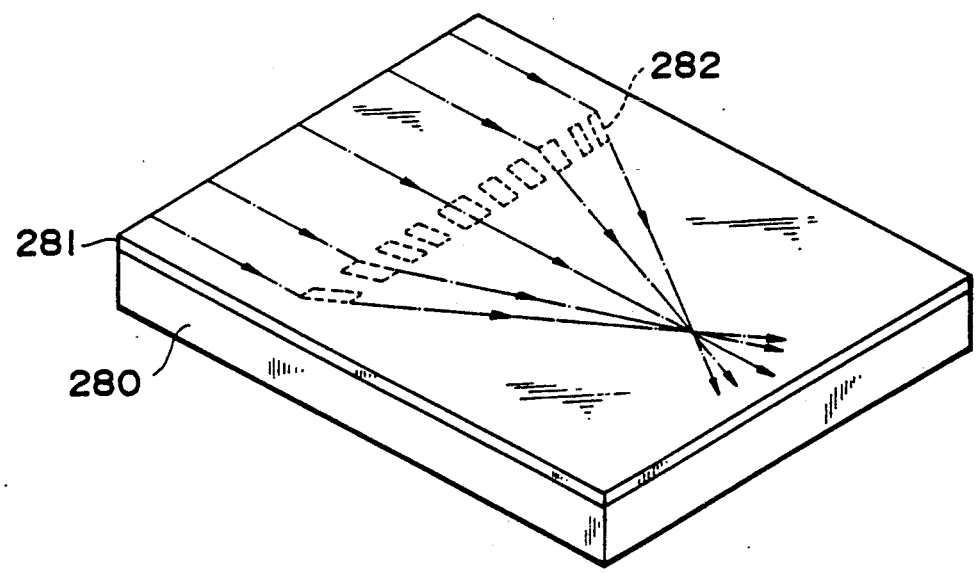
FIG. 120 is a perspective view showing an example of the conventional optical waveguide lens.

In a case of the conventional channel waveguide grating of FIG. 118 or an edge reflection mirror formed by evaporating a metal on an edge, the distance between the branching waveguides is required to be at least several hundreds of micrometers. In the application example above, however, the distance d between the rib sections 62 and 63 can be set to about ten micrometers. Consequently, since a branch angle θ becomes to be about 1°, the device length can be remarkably minimized from the conventional length of 15 mm to 5 mm.

Naturally, a depression such as one shown in FIG. 8 may be fabricated in the branch portion of the Y-shaped branch rib section of FIG. 50.

Figure 51:
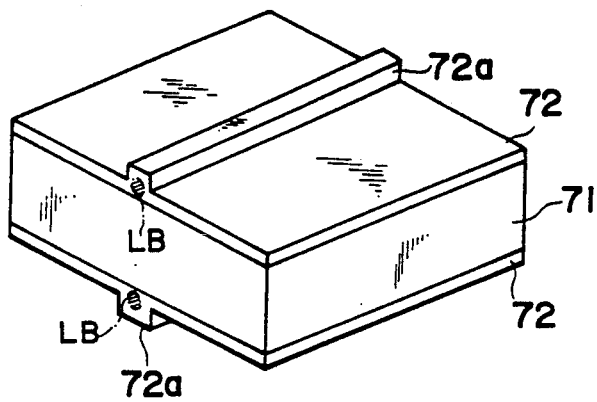
FIG. 51 is a perspective view of a rib-type polyhedral optical waveguide in a twelfth embodiment according to the present invention.

FIG. 51 shows a 12th embodiment of a rib-type polyhedral waveguide in accordance with the present invention.

The optical waveguide of FIG. 51 includes a substrate 71 and two core layers 72 formed to enclose the substrate 71 from both surfaces thereof. The core layers 72 have a refractive index larger than a refractive index of the substrate 71. Each core layer 72 includes at a center thereof a rib section 72a projecting outward and extending in a direction. Two rib sections 72a extend in an identical direction and are formed to be integral with the respective core layers 72. A light beam LB is propagated through the core layer 72 just beneath the rib section 72a as indicated by a broken line and a hatching portion.

The substrate 71 may be implemented with an $SiO_2$ glass, for example. The core layer 72 may be fabricated with a UV-setting resin. In addition to the resin, a thermosetting substance may also be employed to form the core layer 72.

The rib section 72a may have an arbitrary cross-sectional contour. In addition to the rectangular shape of FIG. 51, there may be adopted a semi-circle, a triangle, a generally rectangular contour with rounded corners, a generally rectangular shape with a small depressed groove formed at a center thereof, a generally rectangular form with a small projected band fabricated at a center thereof, and a trapezoidal contour. If necessary, a buffer layer may be disposed between the substrate 71 and the core layer 72. Moreover, a protective layer may be manufactured to cover the core layer 72 including the rib section 72a.

FIGS. 52a to 52g show an example of a process of manufacturing the polyhedral waveguide of FIG. 51. The core layer here is fabricated with a UV-setting resin.

First, a master board or an original plate of the rib optical waveguide is produced through an electron beam lithography. An electron beam resist is applied onto a substrate 75 and then a pattern of the rib section is drawn on the resist film by use of an electron beam. The resist film is then developed to produce a master plate including a remaining resist film 76 having a contour of the rib section on the substrate 75 (FIG. 52a).

A nickel film 77A is fabricated on the master plate by use of an electroforming method (FIG. 52b). The master board is then removed to obtain a nickel stamper 77 (FIG. 52c).

Subsequently, a UV-setting resin 72A as a material of the core layer is applied onto a transparent substrate 71. The nickel stamper 77 is placed on the substrate 71 and then the stamper 77 and the substrate 71 are deressed against each other to obtain a predetermined gap value therebetween. If necessary, a vibration is applied in this process (FIG. 52d).

Through a rear surface of the transparent substrate 71, an ultraviolet ray is irradiated to solidify the UV-setting resin (FIG. 52e).

After the resin becomes to be stiff, the stamper 77 is removed (FIG. 52f), thereby producing with a UV-setting resin, on a surface of the substrate 71, a core layer 72 having a rib section 72.

On a surface of the substrate 71 opposite to the surface where the core layer 72 has been formed, the process steps associated with FIGS. 52a to 52f are carried out (when the same stamper is adopted, the processes of FIGS. 52a to 52c are omissible) so as to manufacture a core layer 72 having a rib section 72a (FIG. 52g). As a result, there is produced a rib-type polyhedral optical waveguide in which, as shown in FIG. 51, the core layer 72 having the rib section 72a is fabricated on each of the surfaces of the substrate 71.

Figure 53:
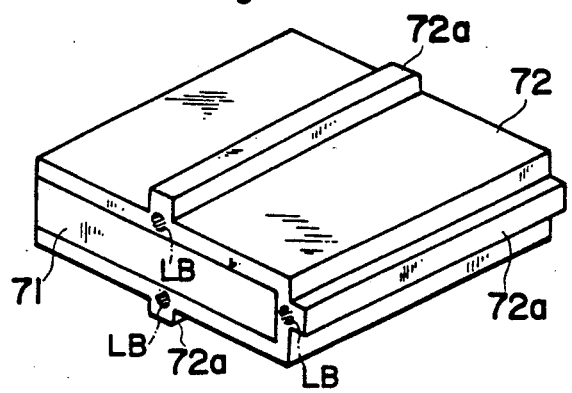
FIGS. 53 to 58 are perspective views respectively showing the thirteenth, fourteenth, fifteenth, sixteenth, seventeenth, and eighteenth embodiments of the waveguide.

FIG. 53 shows a 13th embodiment in accordance with the present invention. The rib-type polyhedral optical waveguide of FIG. 53 includes a core layer 72 having a rib section 72a on each of the upper and rear surfaces of the substrate 71. The rib sections 72 extend in an identical direction. Moreover, a core layer 72 having a rib section 72a is fabricated on a side surface of the substrate 71.

The core layer 72 on the side surface of the substrate 71 may be formed as follows. First, the waveguide of FIG. 51 is manufactured and then the process steps of FIGS. 52a to 52f are conducted on the side surface 71.

Figure 54:
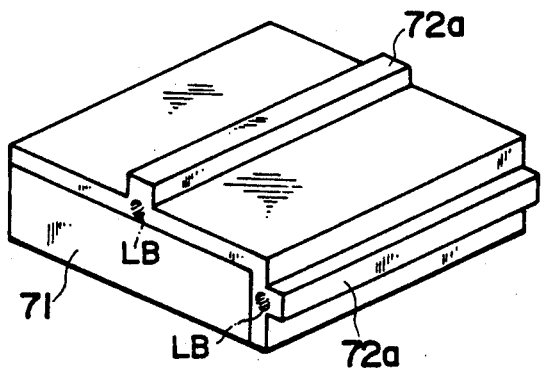
Figure 55:
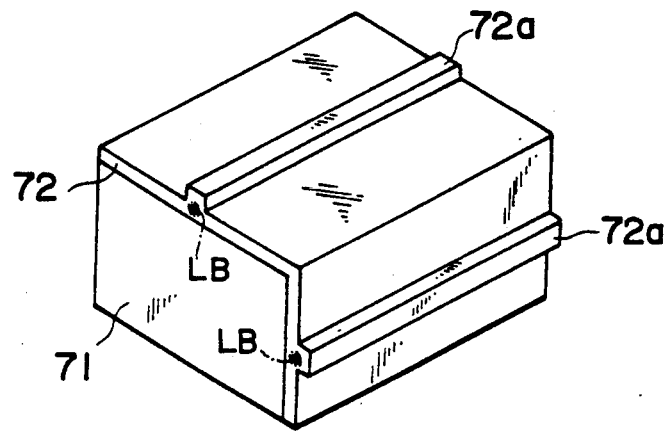

FIGS. 54 and 55 respectively show 14th and 15th embodiments in accordance with the present invention. Each embodiment of a rib-type polyhedral optical waveguide includes a substrate 71 and a core layer 72 on an upper surface and a side surface thereof, the core layer 72 having a rib section 72a extending in a direction. The substrate 71 of the waveguide of FIG. 55 has a larger thickness as compared with the substrate 71 of the waveguide FIG. 54.

Figure 56:
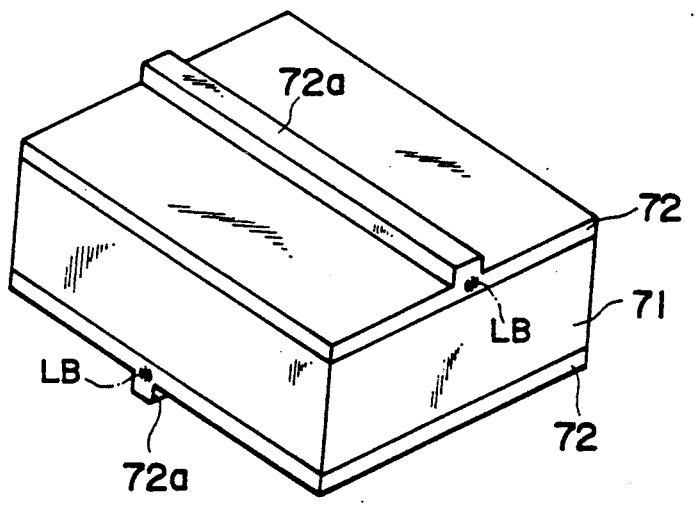

FIG. 56 shows a 16th embodiment according to the present invention. The rib-type polyhedra waveguide of FIG. 56 includes a substrate 71 and a core layer 72 formed on each of upper and rear surfaces thereof, the core layer 72 having a rib section 72a projecting upward. The longitudinal directions of the rib sections 72a are orthogonal to each other.

Figure 57:
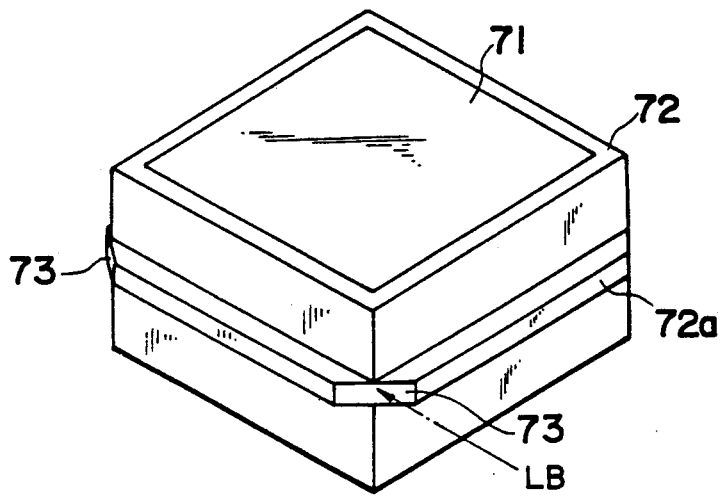

FIG. 57 shows a 17th embodiment according to the present invention. The rib-type polyhedral waveguide of FIG. 57 includes a substrate 71 and a core layer 72 formed on four side surfaces thereof. The core layer 72 has at a center thereof a rib section 72a extending outward. Namely, the rib section 72a encloses the substrate 71 on its four side surfaces. In each corner portion of the side surfaces of the substrate 71, the rib section 72a is recessed to form a surface. A semitransparent mirror 73 is then fabricated in the resultant surface.

The semitransparent mirror 73 may be produced by evaporating aluminum onto the surface. A light beam incident through the semitransparent mirror to the core layer 72 is propagated through an inner portion of the rib section 72a in the core layer 72. In a case where the surface thus formed by recessing the corner portion has an angle to entirely reflect the propagation light, the aluminum vaporization need not be accomplished.

Figure 58:
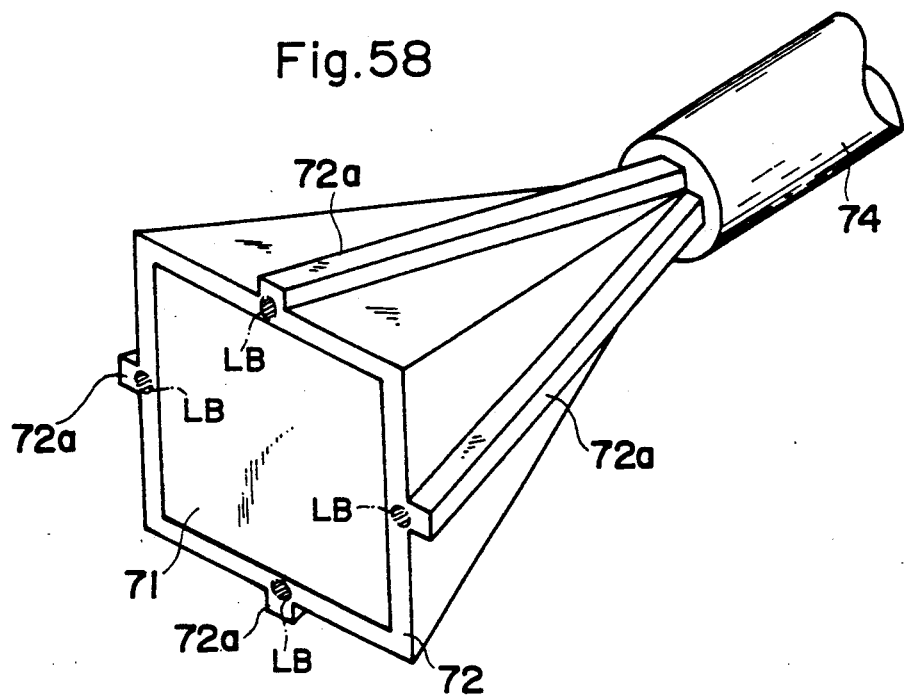

FIG. 58 shows an 18th embodiment according to the present invention. In the rib-type polyhedral waveguide of FIG. 58, a light beam LB propagated through an optical fiber 74 can be split into light beams in four directions to be emitted therefrom. Conversely, light beams from the four directions can be combined so as to pass the resultant light in the optical fiber 74. This waveguide includes a substrate 71 having a form like a quadrangular pyramid and a core layer 72 formed on four side surfaces thereof. In a center of each side surface of the substrate 71, the core layer 72 has a rib section 72a projecting outside and extending toward a vertex of the substrate (toward a deeper side in FIG. 58). The waveguide is attached onto an end surface of the optical fiber 74 at the vertex portion of the waveguide.

The rib-type polyhedral optical waveguides shown in FIGS. 53 to 58 can be manufactured by repeatedly accomplishing the process steps of FIGS. 52a to 52f. Alternatively, a stamper suitable for a resin molding of each waveguide may be prepared in advance to produce the waveguide. Furthermore, the waveguides above may naturally have any cross-sectional contours.

Figure 59:
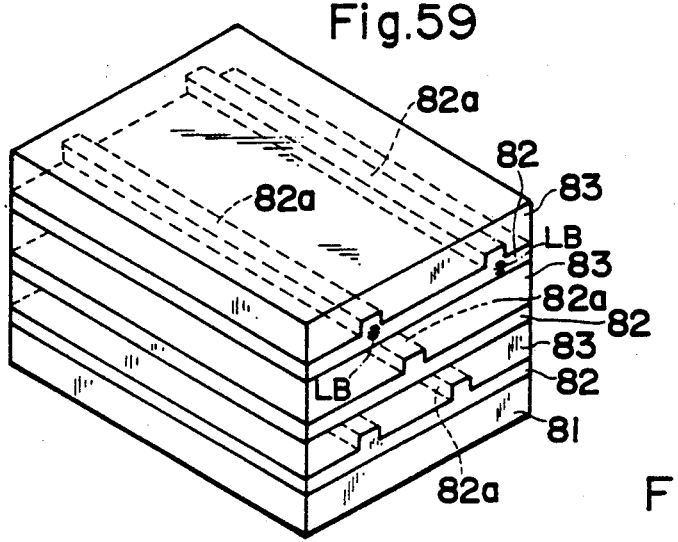
FIG. 59 is a perspective view of a three-dimensional optical circuit in an nineteenth embodiment of the waveguide according to the present invention.

FIG. 59 shows a 19th embodiment in which a rib optical waveguide according to the present invention is applied to a three-dimensional optical circuit. This circuit includes a substrate 81, a plurality of core layers 82 formed thereon, and clad layers 83 fabricated between the core layers 82. The core layers 82 and the clad layers 83 are alternately accumulated on the substrate 81. Each core layer 82 has a rib section 82a projecting upward and extending in a direction. The rib section 82a is formed to be integral with the core layer 82. The upper, intermediate, and lower core layers 82 have two, one, and two rib sections 82a, respectively. The core layers 82 and the rib sections 82a thereof are provided with a refractive index larger than a refractive index of the buffer layers 83 and the substrate 81.

A light beam LB is propagated through the core layers 82 just below the rib sections 82a respectively associated therewith as indicated with a broken line and a hatching portion for the upper core layer 82. The light beam LB is confined along a vertical direction in each core layer 82 owing to a refractive index difference between the core layer 82 and the air and a refractive index difference between the core layer 82 and the substrate 81 or the clad layer 83. In the horizontal direction of each core layer 82, the beam LB is confined in a position just below the rib section 82a thanks to a fact that the effective refractive index just beneath the rib section 82a is higher than those developed in the peripheral portions.

The substrate 81 may be fabricated with an $SiO_2$ glass, for example. The core layers 82 and the rib portions 82a may be formed with a UV-setting resin. The core layers 82 may be provided with a refractive index of 1.47, for example.

The clad layer 83 may be produced with a UV-setting resin having a refractive index slightly smaller than that of the core layers 82. For example, the refractive index of the clad layer 83 is set to 1.46. The refractive index of a UV-setting resin can be altered by changing the amount of fluorine contained therein. Since only a slight difference exists between the refractive indices respectively of the core layers 82 and the clad layers 83, the thickness of each core layer 82 and the width of each rib section 82a may be increased.

Moreover, the core layers 82 may be fabricated with a thermosetting material, for example. In addition to organic substances such as a UV-setting resin, inorganic materials may also be employed to form the clad layers 83. When using such an inorganic substance, the clad layer 83 may be manufactured through an evaporation process.

Furthermore, the core layers 82 may be fabricated with, in addition to the UV-setting resin and the coating liquid forming a thermosetting film, such nonlinear organic and inorganic optical materials as MNA (refractive index = 1.8), PTS (refractive index = 1.88), and KDP ($KH_2PO_4$).

Each rib section 82a may have an arbitrary cross-sectional contour. In addition to the rectangular form of FIG. 59, there may be used, for example, a semi-circular shape, a triangular contour, a generally rectangular shape with rounded corners, a generally rectangular form with a small recessed groove fabricated at a center thereof, a generally rectangular contour with a small projected band manufactured at a center thereof, and a trapezoidal shape.

In a case where the core layers 82, the rib sections 82a, and the clad layers 83 are fabricated with a resin, a stamper having grooves for the rib section 82a may be produced in advance such that a resin is injected between the stamper and the substrate 81 so as to thereafter solidify the resin. Subsequently, a clad layer 83 is formed and then a core layer 82 and a rib section 82a of the second stage are produced by use of the stamper in the similar fashion, thereby obtaining a three-dimensional optical circuit.

Figure 60:
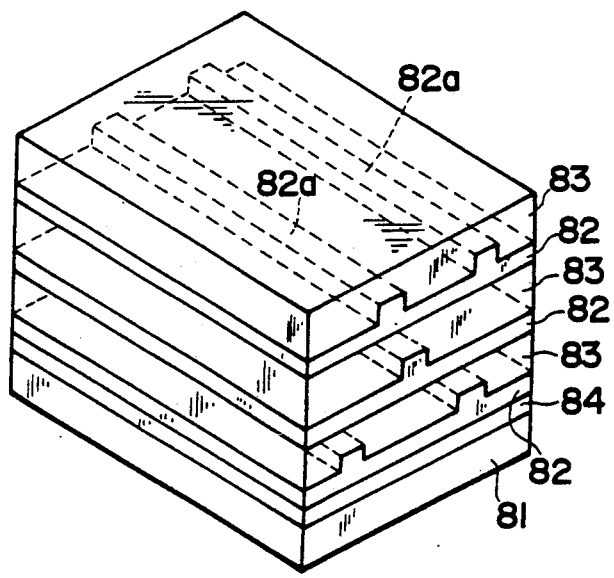
FIGS. 60 to 62 are perspective views respectively showing the twentieth, twenty-first, and twenty-second embodiments of the waveguide according to the present invention.

FIG. 60 shows a 20th embodiment in accordance with the present invention.

In the three-dimensional optical circuit of FIG. 60, a buffer layer 84 is formed between a substrate 81 and a lower core layer 82. The buffer layer 84 is fabricated with a material having a refractive index slightly smaller than a refractive index of the core layer 82.

For example, the substrate 81 is formed with a $LiNbO_3$, Si, or GaAs substrate such that an RF sputtering of an $SiO_2$ glass is achieved onto the substrate 81 to form the buffer layer 84. The core layer 82 may be manufactured with materials such as the UV-setting resin, the coating liquid forming thermosettig film, and nonlinear organic and inorganic optical materials.

By disposing the buffer layer, the substrate may be formed with any material.

Figure 61:
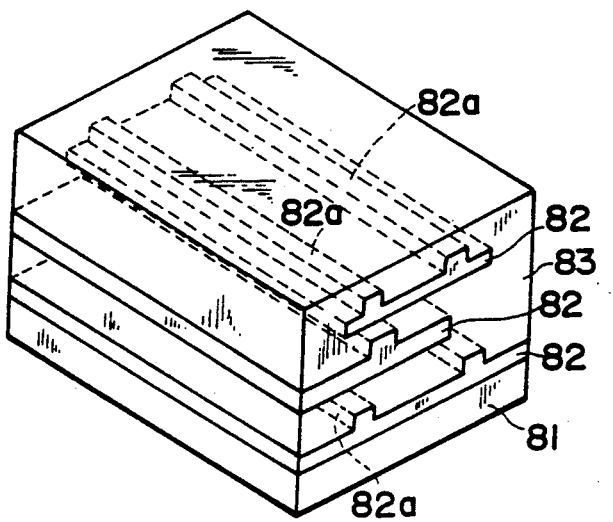

FIG. 61 shows a 21st embodiment according to the present invention. An upper core layer 82 and an intermediate core layer 82 are buried in a clad layer 83. Surfaces of light beam input and output sides are exposed. A lower core layer 82 is identical to the core layers shown in FIGS. 59 and 60.

Figure 62:
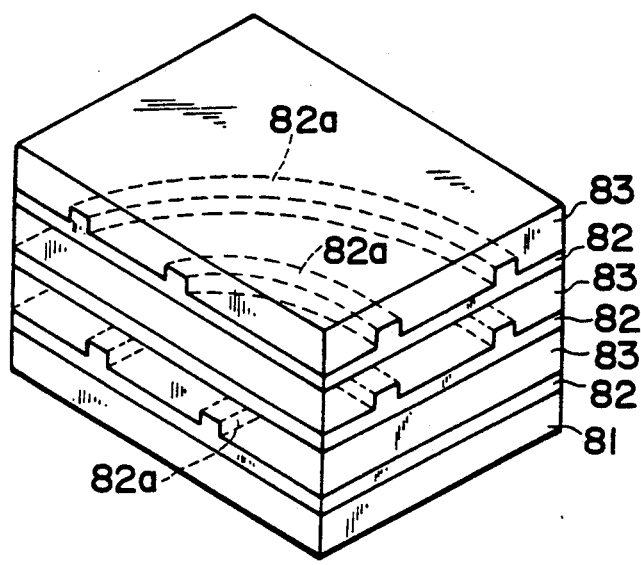

FIG. 62 shows a 22nd embodiment according to the present invention.

In this rib-type optical waveguide, an upper rib layer 82 has a rib section 82a, which may serve to change a light path of a propagation light beam. An intermediate core layer 82 possesses a rib section 82a, which spatially intersects a rib section 82a disposed in a lower core section 82. It is favorable that a curved rib section has a thicker inner side as described above.

Figure 63:
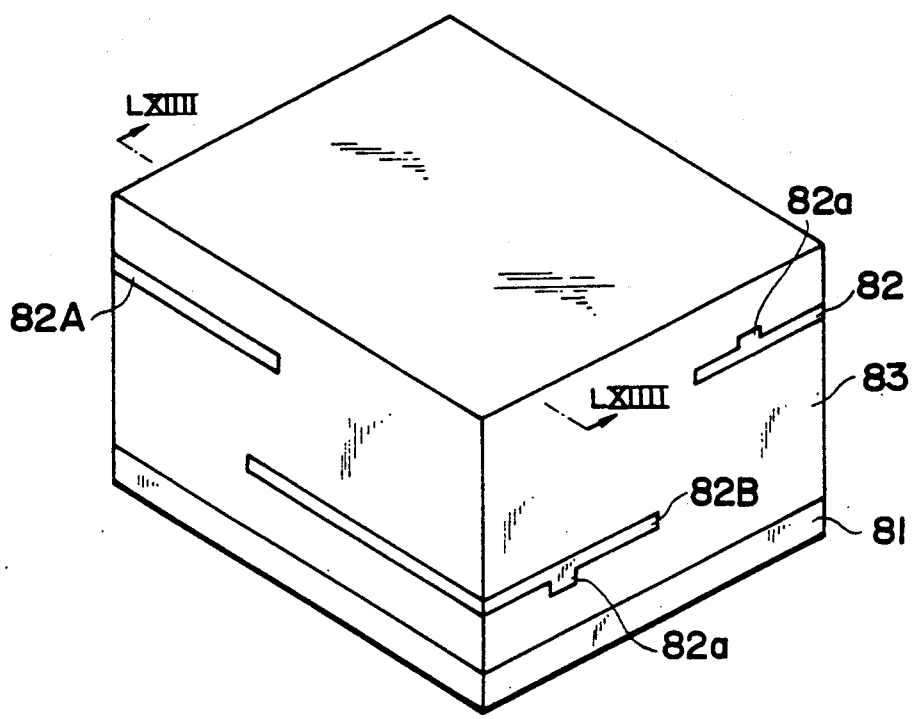
FIG. 63 is a perspective view showing a twenty-third embodiment of the waveguide in accordance with the present invention.
Figure 64:
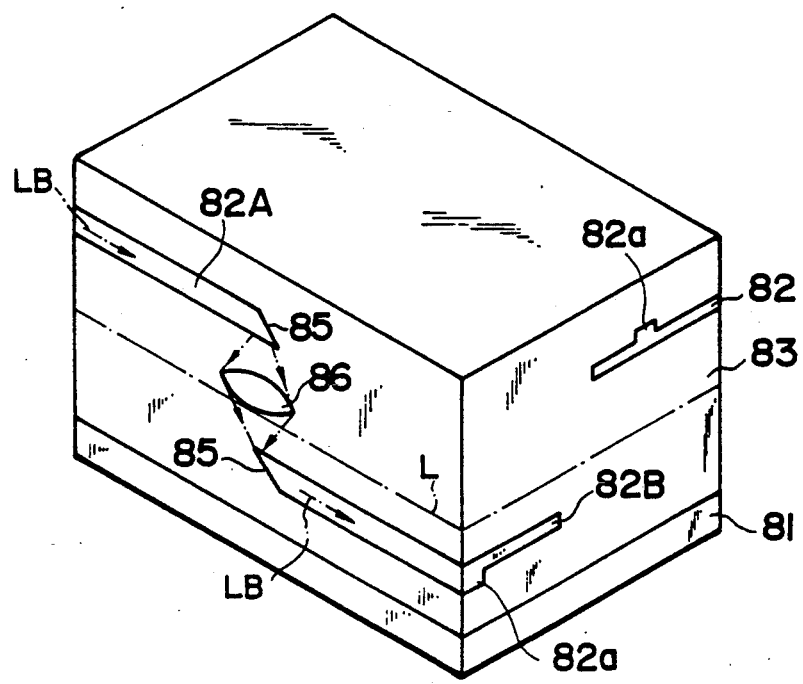
FIG. 64 is a cross-sectional view showing the embodiment of FIG. 63 along a line LXIIII—LXIIII.

FIG. 63 shows a 23rd embodiment according to the present invention, whereas FIG. 64 shows a cross section taken along a line LXIIII—LXIIII of FIG. 63.

The three-dimensional optical circuit of FIG. 63 is capable of optically coupling, as can be seen from FIG. 64, a light beam L8 propagated through an upper core layer 82A with a lower core layer 82B. The upper core layer 82A and the lower core layer 82B are formed only up to an intermediate point of the overall length. In the clad layer 83, each of the upper core film 82A and the lower core layer 82B has an inclined end surface. A reflection mirror 85 is formed on each end surface. The end surface of the intermediate core layer 82A where the reflection mirror 85 is disposed opposes the end surface of the lower core layer 82B where the reflection mirror 85 is formed such that a concave lens 86 is arranged therebetween.

A light beam LB incident to the upper core layer 82A is propagated therethrough to be reflected by the reflection mirror 85. Namely, the light path is changed so as to pass the light to a position immediately therebelow. The light is then focused through the convex lens 86 onto the reflection mirror 85 formed in the lower core layer 82B. The light path of the beam LB is again changed by the reflection mirror of the lower core layer 82B such that the beam LB is propagated through the lower core layer 82B to be emitted to an external space.

A three-dimensional optical circuit as above may be fabricated as follows. A portion of the circuit of FIG. 64 below the position marked with a broken line L is first produced through the resin molding or forming process or the like. Thereafter, a lens 86 is placed at a predetermined position such that a clad layer 83 is formed with an appropriate thickness to cover the lens 86. The remaining portion including the core layer 82A is then manufactured thereon to produce the three-dimensional optical circuit.

Figure 65:
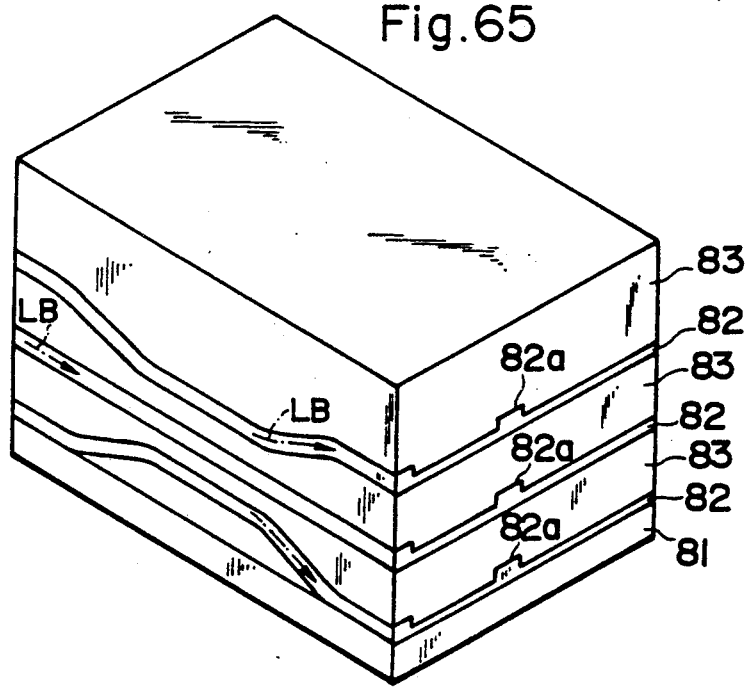
FIG. 65 is a perspective view showing a twenty-fourth embodiment of the waveguide according to the present invention.

FIG. 65 shows a 24th embodiment according to the present invention. This three-dimensional optical circuit may be employed as a directional coupler.

In the circuit of FIG. 65, the distance between an intermediate core layer 82 and each of upper and lower core layers 82 is considerably minimized in an inner portion of the optical circuit. In this portion associated with the reduced distances, a light coupling section is constituted with the upper, intermediate, and lower core films 82. In consequence, a portion of a light beam LB incident to the intermediate core layer 82 is optically coupled with the upper and lower core layers 82 in the optical coupler section so as to be propagated through these core layers 82.

Figure 66:
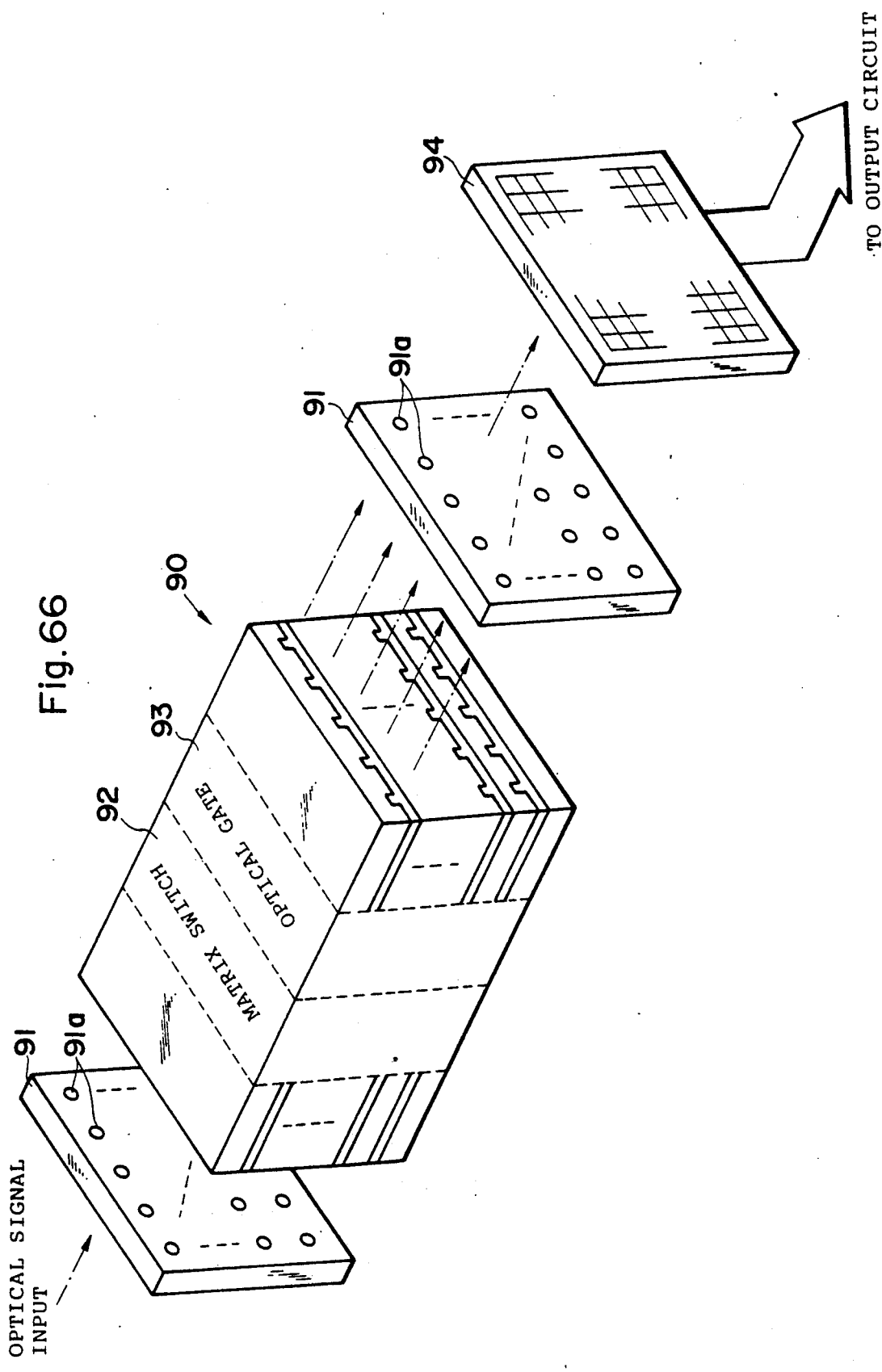
FIG. 66 is a perspective view showing an application example of the three-dimensional circuit to an optical computer.

FIG. 66 shows an embodiment in which a three-dimensional optical circuit is applied to an optical computer in accordance with the present invention. The three-dimensional optical circuit is namely adopted to process light signals.

An input light signal is supplied to a three-dimensional (3-D) optical circuit 90 via a first micro lens array 91 in which a plurality of micro lenses 91a are regularly arranged. The 3-D optical circuit 90 includes a portion configuring a matrix switch circuit 92 and an optical gate circuit 93. A light signal incident to the 3-D optical circuit 90 is subjected to a spatial optical processing in the matrix switch circuit 92 and the optical gate circuit 93 so as to be emitted therefrom.

A light signal outputted from the 3-D optical circuit 90 is sent via a second micro lens array 91 to an optical detector array 94, which in turn converts the received light signal into an electric signal to be delivered to an output circuit.

With the provision above, a 3-D spatial concurrent processing of light signals essential to the implementation of an optical computer can be achieved at a relatively high speed.

Figure 67:
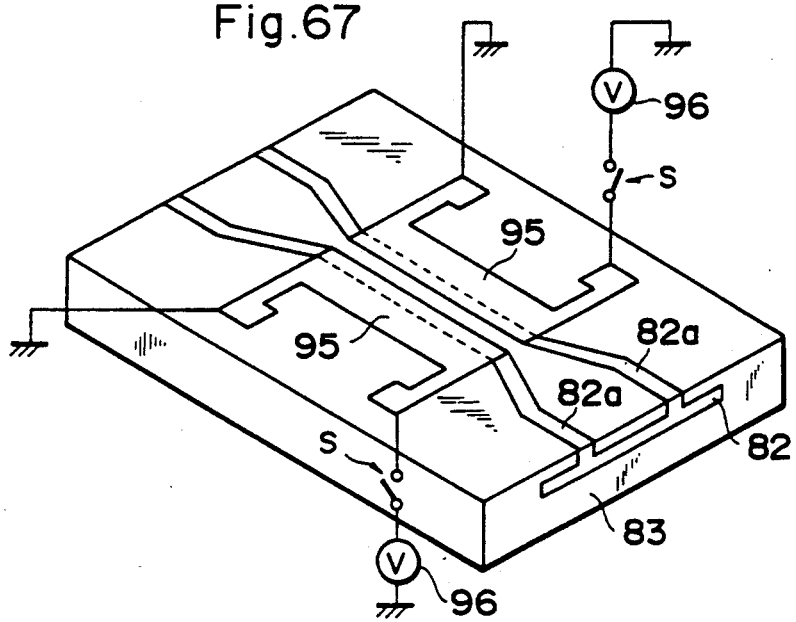
Figure 68:
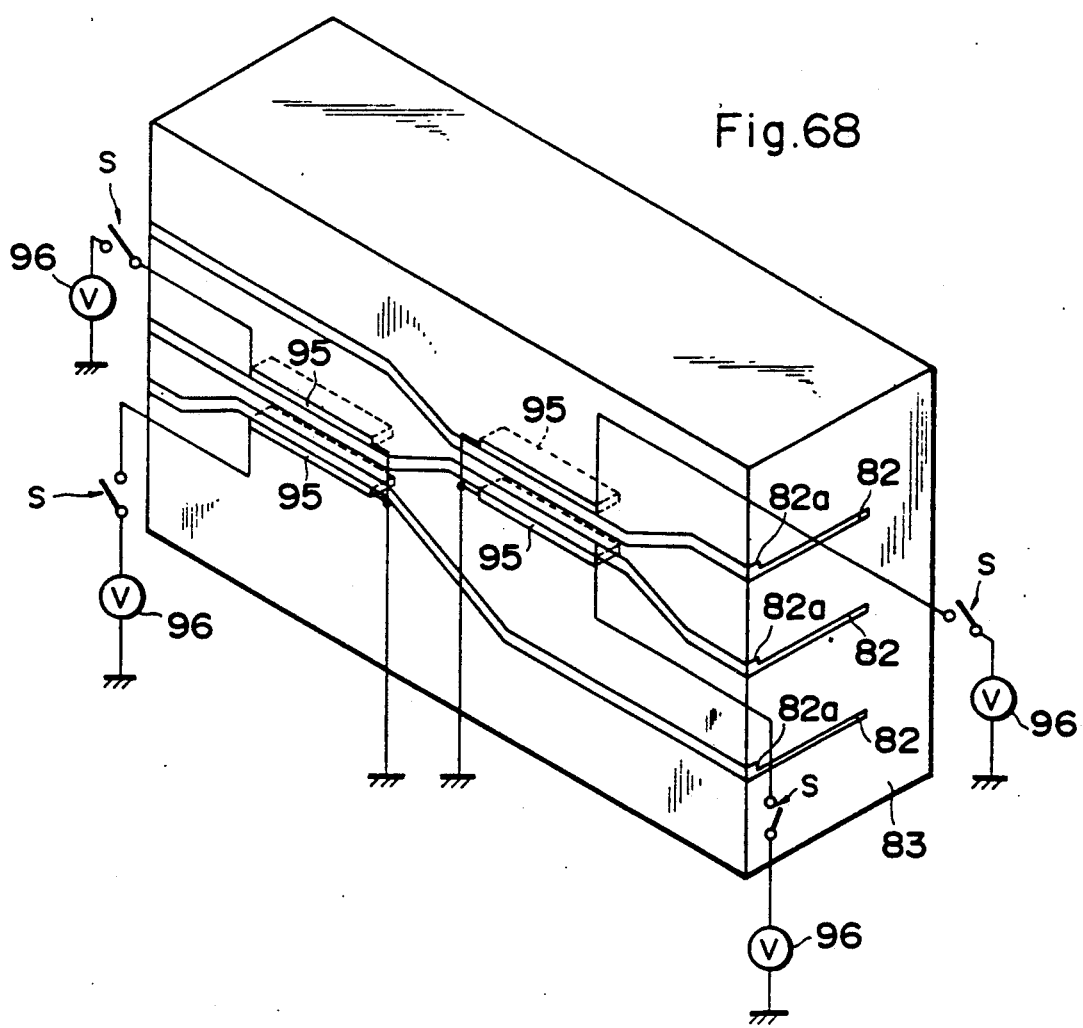

FIGS. 67 and 68 respectively show an optical switch and a directional coupler which constitute the matrix switch circuit 92 and the optical gate circuit 93 of the 3-D optical circuit 90 described above. The optical switch and the directional coupler are implemented by use of a thermooptical effect. FIGS. 67 and 68 show cases in which the coupling or switching operation is carried out in the horizontal and vertical directions, respectively.

In FIG. 67, a core layer 82 having two rib sections 82a is formed in a clad layer 83. The rib sections 82a are disposed to be in the vicinity of each other in a central portion of the optical waveguide to form an optical coupler section. On the optical coupler section above each rib section 82a, there is fabricated a heater electrode 95. The electrode 95 is connected to a variable direct-current source 96 such that when a control signals from the direct-current source 96 turns a switch associated therewith on, a voltage is applied to the electrode 95.

Depending on factors such as a voltage applied to each heater electrode 95 and a length of the optical coupler section of the rib section 82a, a light beam propagated through a location just beneath one of the rib sections 82a is passed to a location just below the other rib section 82a, or propagated through the location beneath the one rib section 82a to be emitted therefrom.

In the constitution of FIG. 68, in an internal portion of the optical waveguide, an upper rib section 82a is disposed in the neighborhood of an intermediate rib section 82a to form an optical coupler section. This is also the case of a combination between the intermediate rib section 82a and a lower rib section 82a. Each rib section 82a has a side surface on which a heater electrode 95 is disposed. The electrode 95 is supplied with a voltage via a switch to be turned on and off in response to a control signal S from a variable direct-current source 96.

Also in this vertical-directional coupling structure, depending on factors such as a voltage applied to each heater electrode 95 and a length of the optical coupler section of the rib section 82a, a light beam propagated through a location just beneath one of the rib sections 82a can be optically coupled with a location of another core layer 82 just below the rib section 82a thereof. The light beam is then propagated through the location to be emitted therefrom.

In these optical circuits, the clad layers 83 and the core layers 82 (including the rib sections 82a) may be fabricated with a UV-setting resin through a molding process or the like. In the process, the core layers 82 and the clad layers 83 are provided with refractive indices 1.47 and 1.46, respectively.

Figure 69:
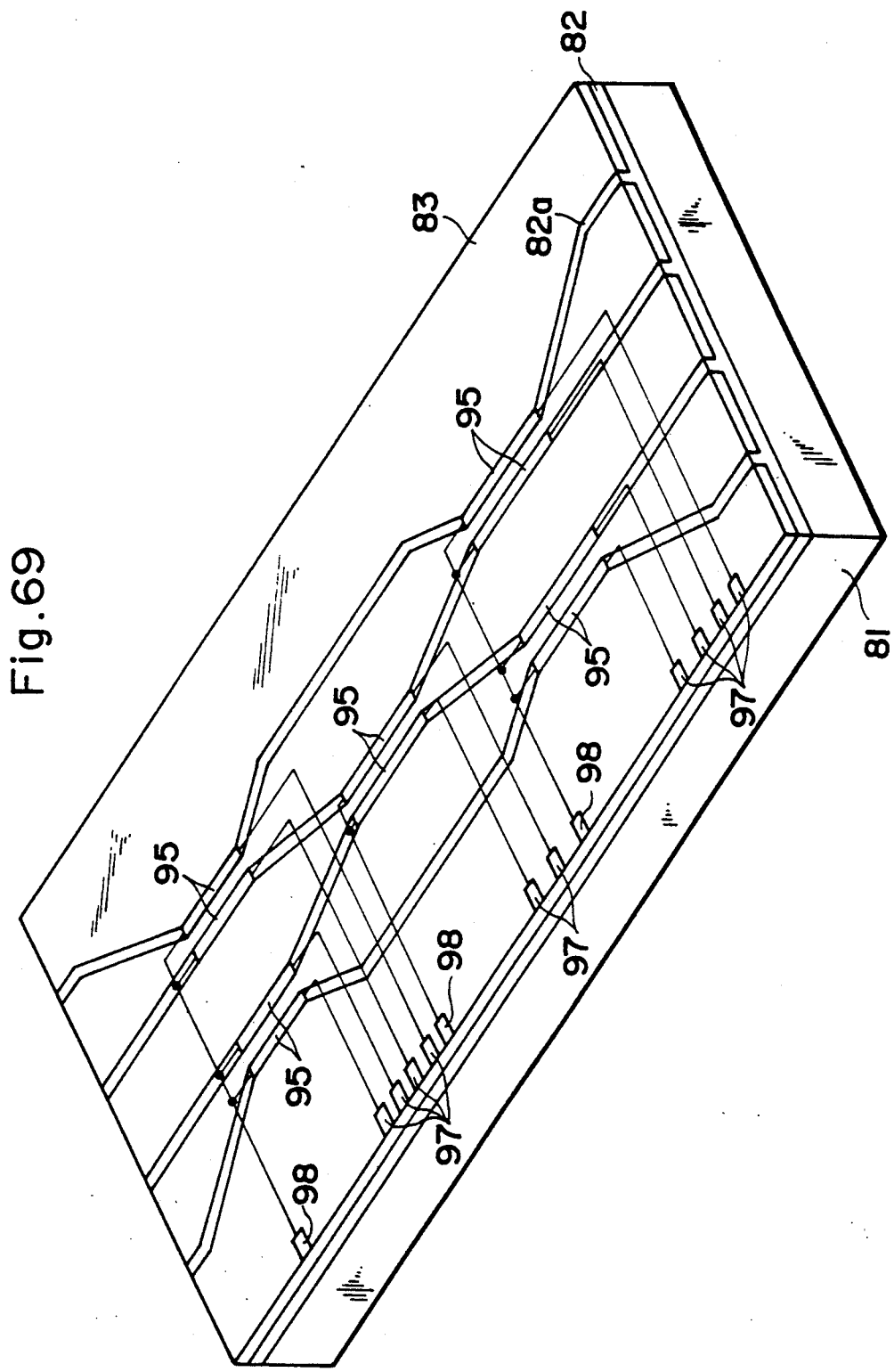
FIG. 69 is a perspective view showing an example of an optical switching network.

FIG. 69 shows a optical switch network associated with the directional coupler using the thermooptical effect.

This switching network includes five directional couplers integrated therein. The network configuration includes a substrate 81 and a core layer 82 having a plurality of rib sections 82a. A clad layer 83 is formed on the core layer 82 so as to occupy a space between the rib sections 82a. In each predetermined portion of the waveguide, adjacent rib sections 82a are disposed in the proximity of each other to constitute an optical coupler section. A heater electrode 95 is formed on the optical coupler section.

The heater electrode 95 has an end connected to an electrode 97 and the other end connected to electrode 98. The electrode 97 is disposed to be supplied with a voltage for a control signal, whereas the electrode 98 is to be linked with a grounding potential.

In this configuration, a switching operation is accomplished depending on the voltage applied to the heater electrode 95 via the electrode 97, a length of the optical coupler section, and the like.

In the waveguides of FIGS. 60 to 69, the rib section 82a may be formed with arbitrary cross-sectional contours.

Figure 70:
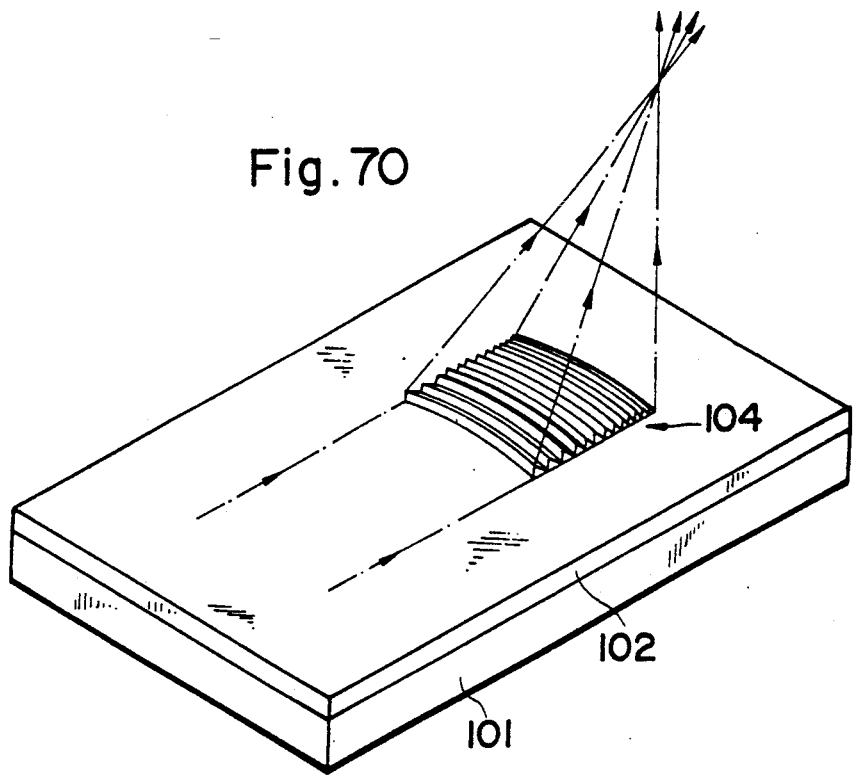
FIG. 70 is a perspective view showing a twenty-fifth embodiment of the waveguide according to the present invention applied to an optical grating coupler.

FIG. 70 shows a 25th embodiment of a waveguide-type grating in accordance with the present invention. More concretely, in this embodiment, the present invention is applied to a focusing grating coupler.

The configuration includes a substrate 101, an optical waveguide layer 102 disposed thereon, and a focusing grating coupler 104 integrally formed on the optical waveguide layer 102. The coupler 104 includes a circular grating of a chirped type in which a grating period is continuously altered. The substrate 101 is manufactured with an SiO$_2$ glass having a refractive index of 1.46, for example. The waveguide layer 102 is fabricated with a UV-setting resin having a refractive index of 1.47 slightly larger than the refractive index of the glass above. In addition to the UV-setting resin, substances such as thermosetting organic and inorganic materials may be adopted to form the optical waveguide layer 102.

In the coupler of FIG. 70, a light fed into the waveguide layer 102 is propagated therethrough and is then emitted from the grating coupler 104 into a free space thereabove so as to be focused therein.

FIGS. 71a to 71e show an example of a process of manufacturing the focusing grating coupler of FIG. 70. The optical waveguide layer 102 is fabricated with a UV-setting resin in this configuration.

First, a master board of the focusing grating coupler is produced in an electron beam writing method. Namely, an electron beam resist is applied onto a substrate 105 and then a pattern of the coupler is drawn thereon by use of an electron beam. The electron beam resist film is then developed to produce a master plate including a remaining resist film 106 having a contour of the coupler on the substrate 105 (FIG. 71a).

Next, a nickel film 107A is accumulated on the master board in an electronforming method (FIG. 71b) and then the board is removed to attain a nickel stamper 107 (FIG. 71c).

Subsequently, a UV-setting resin 102A as a material of the optical waveguide 102 is applied onto the SiO$_2$ glass substrate 101. The nickel stamper 107 is placed thereon such that the substrate 101 and the stamper 107 are depressed against each other to set a gap therebetween to a predetermined value d. If necessary, a vibration is applied in this process. Through a rear surface of the substrate 101, an ultraviolet ray is radiated to solidify the UV-setting resin (FIG. 71d).

After the UV-setting resin becomes to be solid, the stamper 107 is peeled off (FIG. 71e), thereby producing the optical waveguide layer 102 including a focusing grating coupler 104 with a UV-setting resin on a surface of the substrate 101.

For a mass production of the focusing grating coupler, the nickel stamper 107 manufactured through the steps of FIGS. 71a to 71c is employed to repeatedly achieve the process steps of FIGS. 71d and 71e.

Figure 72:
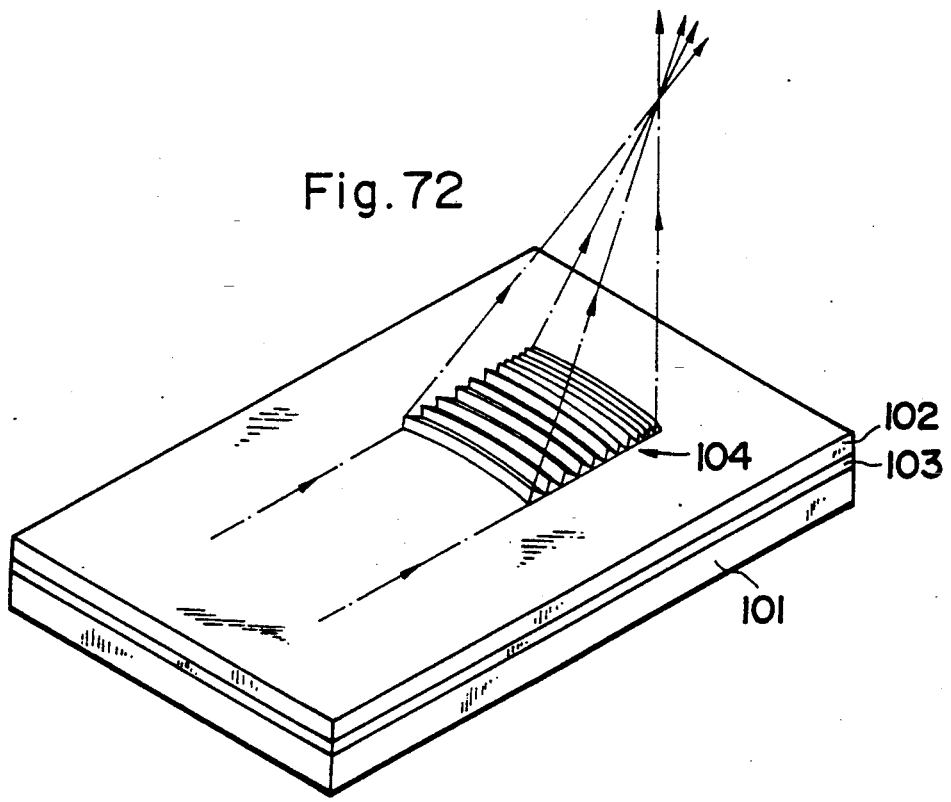
FIG. 72 is a perspective view showing a variation of the waveguide according to the present invention.

FIG. 72 shows a variation of the grating coupler in which the same components as those of FIG. 70 are assigned with the same reference numeral and a redundant description thereof will be eliminated. Between a substrate 101 and an optical waveguide layer 102, there is formed a buffer layer 103 having a refractive index slightly less than a refractive index of the waveguide layer 102. For example, the substrate 101 is formed with an LiNbO$_3$ substrate such that an SiO$_2$ glass is sputtered thereto to fabricate the buffer layer 103. With the provision of the buffer layer 103, the substrate 101 may be produced with an arbitrary material.

Figure 73:
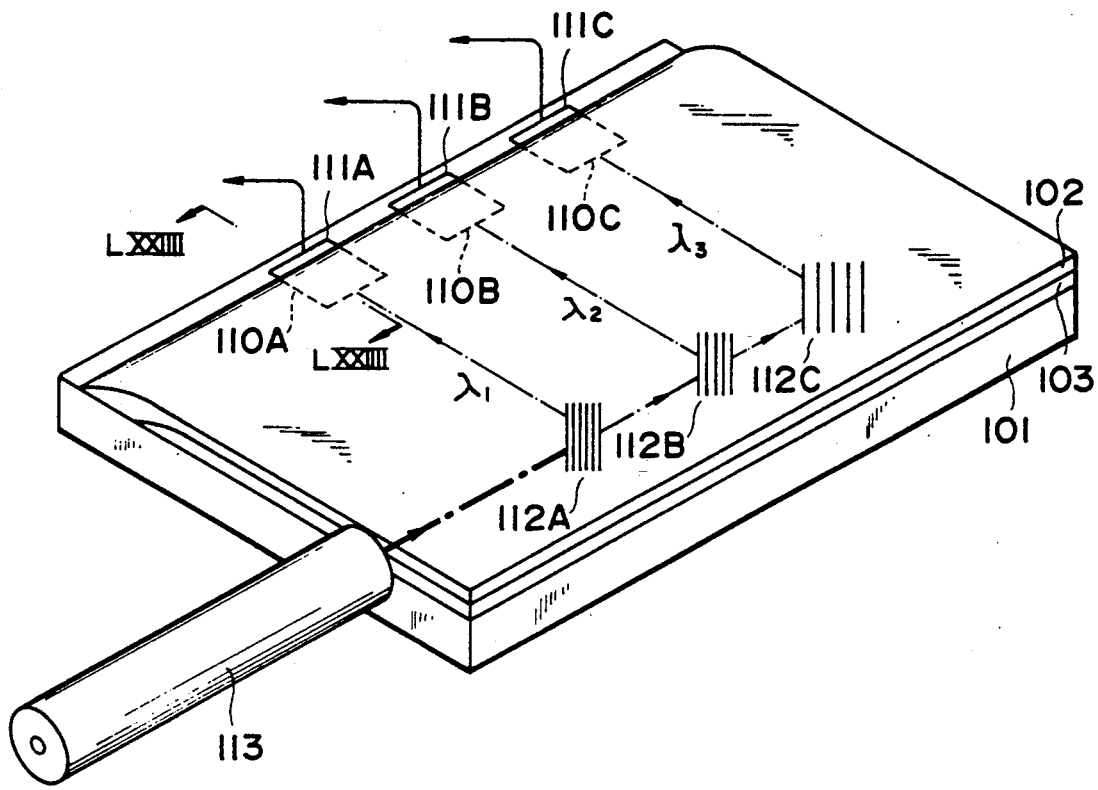
FIG. 73 is a perspective view showing a wavelength separation filter in a twenty-sixth embodiment according to the present invention.

FIG. 73 is a perspective view of a 26th embodiment of a wavelength separator in accordance with the present invention.

In this configuration, on a substrate 101, an optical waveguide layer 102 of a UV-setting resin is formed via a buffer layer 103. Th waveguide layer 102 is provided with three reflective gratings 112A, 112B, and 112C in an integral manner. The gratings 112A to 112C are arranged in a straight line and are appropriately inclined with respect to the straight line. These gratings 112A to 112C respectively have different grating periods. A light passed from an optical fiber 113 into the waveguide 102 is propagated in an arrangement direction of the reflective gratings 112A to 112C such that a component of the light having a particular wavelength $\lambda_1$ is reflected on the grating 112A, which passes therethrough other wavelength components of the light. Next, only a component of the light having another particular wavelength $\lambda_2$ is reflected on the grating 112B. Finally, a component of the light with still another particular wavelength $\lambda_3$ is reflected on the grating 112C. As a result, the incident light is separated into components of the light associated with the particular wavelengths respectively corresponding to the grating periods of the reflective gratings 112A to 112C.

Figure 74:
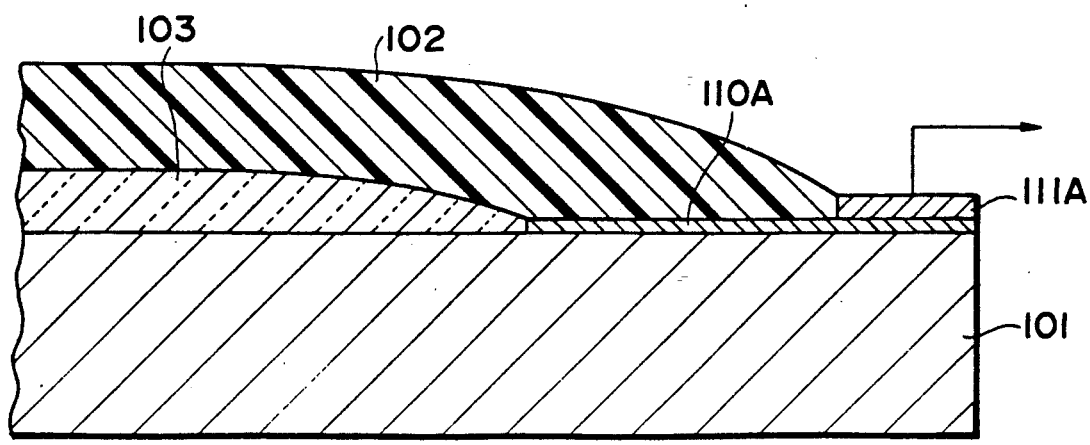
FIG. 74 is a magnified cross-sectional view showing the structure of a light receiving section of the embodiment of FIG. 73 taken along line LXXIIII—LXIIII.

The reflection lights thus separated depending on the wavelengths through the gratings 112A to 112C are propagated through the waveguide 102 to be respectively fed to light receiving sections 110A to 110C, which sense the respective lights. FIG. 74 shows a magnified cross section of the light receiving section 110A of FIG. 73 taken along a line LXXIIII—LXIIII.

In a location on the substrate 101 where the reflection light arrives, there are light receiving sections 110A to 110C with a material such as an amorphous silicon ($\alpha$—Si). On receiving the reflection lights, theses sections 110A to 110C generate electromotive force to be respectively fed via electrodes 111A to 111C to external devices. In order to lead the reflection lights to the light receiving sections 110A to 110C, the buffer layer 103 reduces its thickness in a directionn toward the light receiving sections 110A to 110C. As described above, the light delivered from the optical fiber 113 to the optical waveguide 102 is separated into lights depending on the particular wavelengths so that values of intensity of the separated lights are sensed by the light receiving sections 110A to 110C, respectively.

Figure 75:
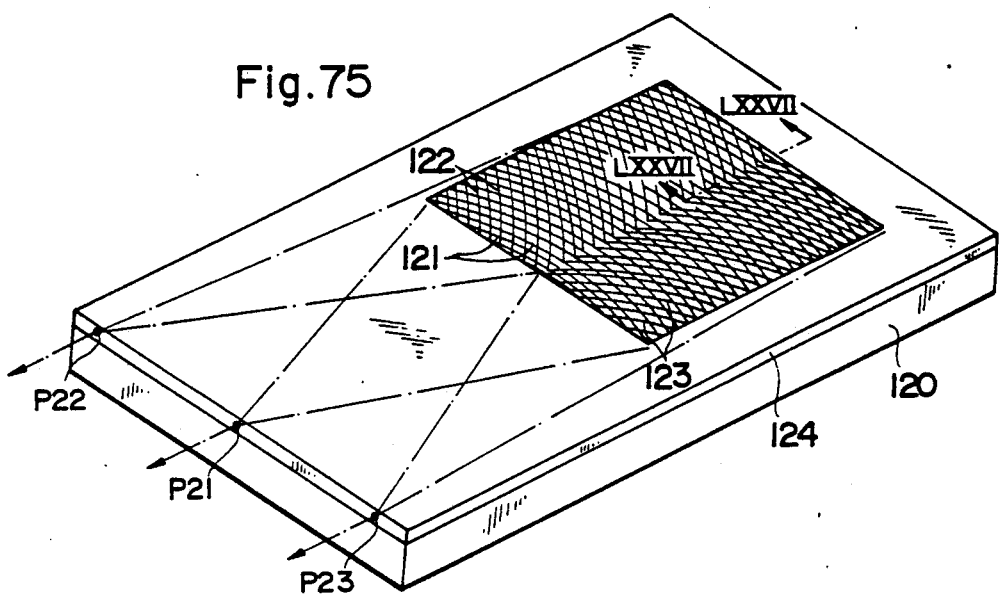
Figure 76:
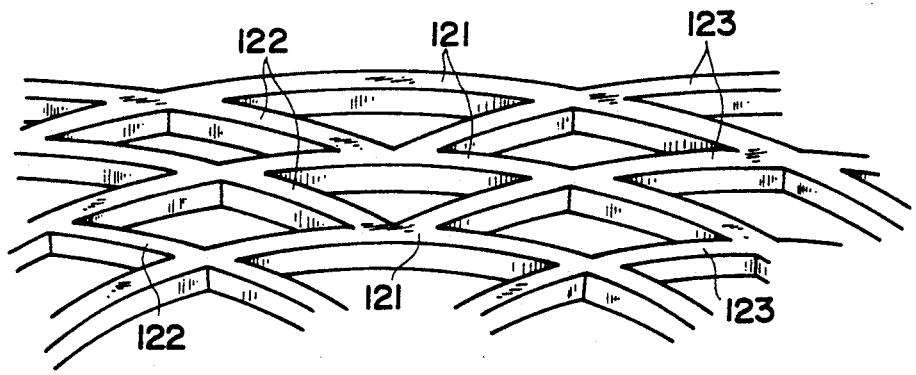
Figure 77:
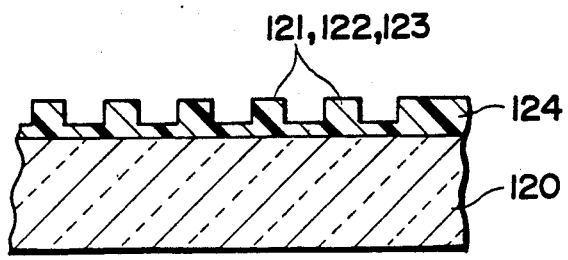

FIGS. 75 and 76 show a 27th embodiment according to the present invention. FIG. 75 is a perspective view showing the overall configuration of a composite grating coupler in which each grating is drawn with a line substantially without thickness and width. FIG. 76 is a magnified view showing the grating in detail. FIG. 77 shows a magnified cross section of FIG. 75 along a line LXXVII—LXXVII.

In this configuration, an optical waveguide 124 is disposed on a substrate 120 such that the waveguide 124 includes at predetermined locations thereof two kinds of gratings 121 and 122–123 in a superimposed or overlapped fashion. The grating 121 is a focusing grating formed in the overall region and has a period to excite a light having a particular wavelength in the TM mode. Of a light incident to this area from a position just thereover or from an inclined position thereover, an Ep component is coupled with the grating 121 to be propagated through the waveguide 124 so as to be focused onto a position P21 on an end surface of the substrate 120. The gratings 122 and 123 are respectively disposed in the left-half and right-half portion of the region above. These gratings 122 and 123 are focusing gratings with different focus positions P22 and P23 and are provided with periods to excite a light in the TE mode. Of the light incident to the area above, an Es component is coupled with the gratings 122 and 123 to be propagated through the optical waveguide layer 124 so as to be respectively focused onto focus positions P22 and P23 enclosing the focus position P21. The grating 121 is overlapped with the gratings 122 and 123, namely, as shown in FIG. 76, projected bands of these gratings intersect each other on an identical plane.

The grating coupler above is manufactured a follows.

An electron beam resist is applied onto a predetermined substrate and then a pattern of a composite grating as shown in FIG. 75 is drawn on the resist film. The resist film is then developed to attain a composite grating pattern constituted with a remaining resist film.

The remaining resist film is subjected to an electroforming process or the like to transcribe or to copy the composite grating pattern onto a nickel plate, thereby producing a nickel stamper having the grating pattern.

A UV-setting resin is injected between the stamper and a glass substrate 120. The stamper and the glass plate 120 is then depressed against each other; moreover, an ultraviolet ray is irradiated onto the resin to solidify the UV-setting resin. As a result, the optical waveguide film 124 and the gratings 121, 122, and 123 are integrally manufactured.

Figure 78:
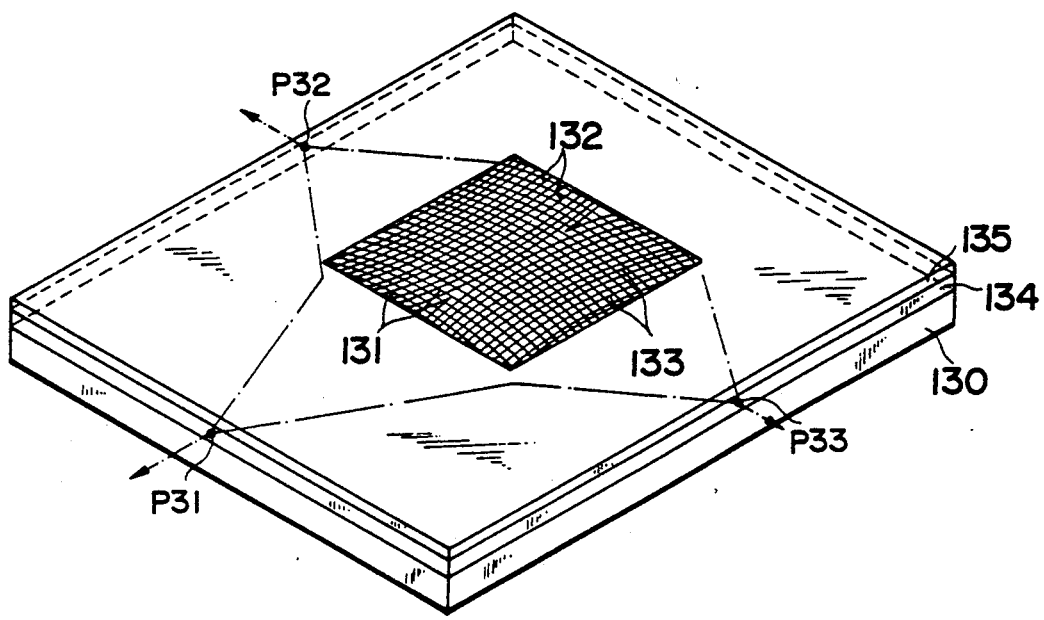
FIGS. 78 and 79 are perspective view showing a twenty-eighth embodiment of a composite grating coupler according to the present invention.
Figure 79:
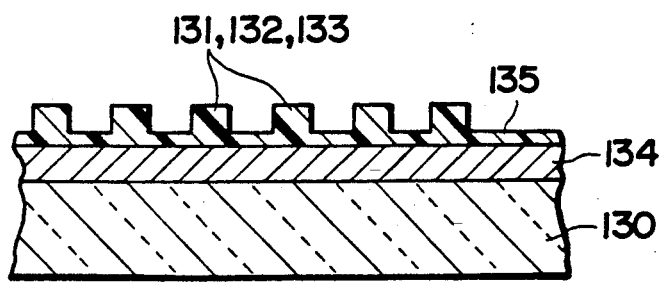

FIGS. 78 and 79 show a 28th embodiment according to the present invention. As compared with the embodiment of FIG. 75, this embodiment is different therefrom in the grating pattern direction, the focus positions and the optical waveguide layer.

Namely, an inorganic material such as ZnS or ZnO is sputtered onto a substrate 130 to fabricate an optical waveguide layer 134 such that gratings 131, 132, and 133 are formed thereon with a UV-setting resin. In this process to fabricate the gratings with a UV-setting resin, a thin film of the UV-seeting resin 135 is naturally produced.

The grating 131 is formed in the overall region of a predetermined area on the waveguide 134 to excite the TM mode. The light coupled with the grating 131 is propagated through the optical waveguide layer 134 to be focused onto a position P31 on an end surface thereof. The gratings 132 and 133 are respectively formed in a first-half region and a second half-region of the predetermined area above so as to be overlapped with the grating 131. These gratings 132 and 133 excite lights in the TE mode. Lights coupled therewith are propagated through the waveguide 134 to be respectively focused onto positions P32 and P33 respectively on other end surfaces of thereof.

The composite gating coupler of this kind may also be produced in a method similar to the method described above. Namely, the optical waveguide 134 is fabricated on the substrate 130 and then a UV-setting resin is injected between the waveguide 134 and a stamper prepared for the coupler. The resin is then irradiated with an ultraviolet ray to be solidified, thereby producing the composite grating coupler.

Since the waveguide 134 is manufactured with an inorganic material by use of a thin film technology such as a sputtering technology, the thickness of the film constituting the waveguide layer 134 can be easily controlled.

Figure 80:
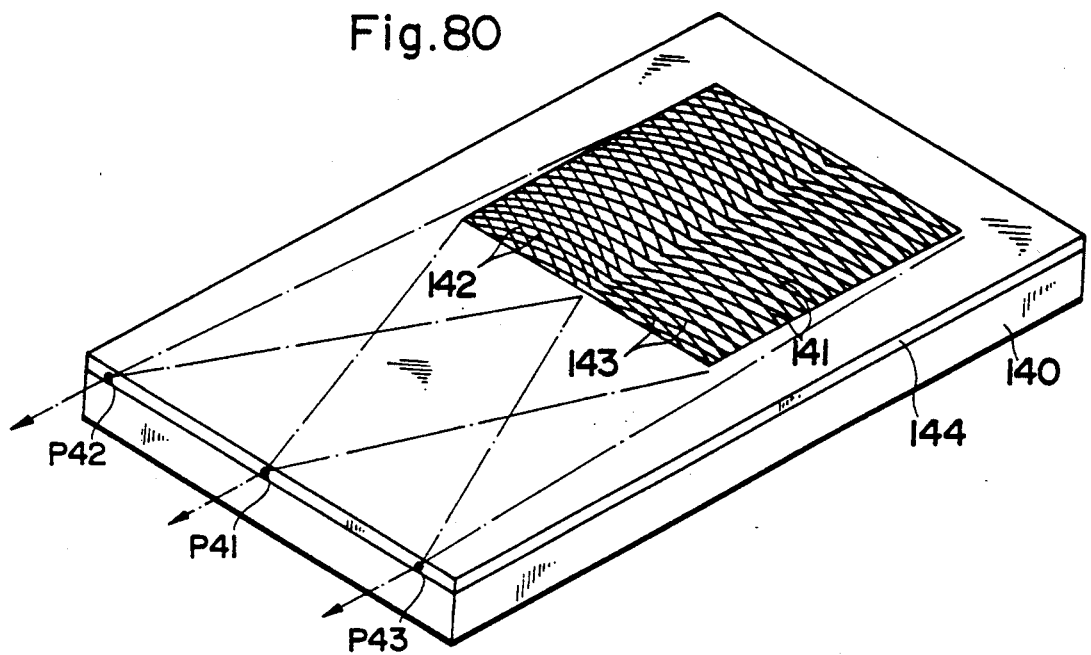
FIGS. 80 and 81 are perspective views showing a twenty-ninth embodiment of a composite grating coupler according to the present invention.
Figure 81:
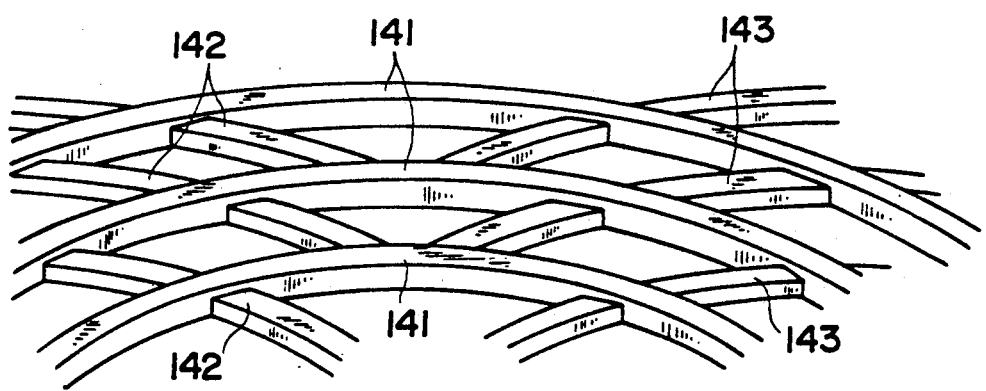

FIGS. 80 and 81 show a 29th embodiment according to the present invention.

In the basic structure of this embodiment, which is similar to that of FIG. 75, gratings 14 to 143 respectively correspond to the gratings 121 to 123: whereas focus positions P41 to P43 is respectively associated with the focus positions P21 to P23. This configuration is different from the constitution of FIG. 75 with respect to the thickness (height of a projected band portion) of the grating 141 to excite TM-mode lights and the thicknesses of the gratings 142 and 143 to excite TE-mode lights. The thickness of each grating influences a diffraction efficiency (coupling efficiency). By altering thicknesses respectively of the gratings 141 to 143, intensity values of lights respectively collected onto the focus positions P41 to P43 may be adjusted (for example, to be equalized to each other). This is usefully applicable in particular to an equalization of output levels in the TE and TM modes in a case where the gratings are adopted in an optical pickup device of an optomagnetic disk to attain a difference signal between lights of the TE and TM modes.

Although the embodiment above includes step-type gratings, the gratings may be formed in arbitrary cross-sectional contours such as a blazed shape.

Furthermore, the gratings above are focusing gratings provided with arc-shaped patterns in the embodiment above. However, the gratings are not restricted by this example, namely, arbitrary grating patterns, for example, a straight-light pattern may be adopted.

In addition, although the device of the embodiment above is utilized as a grating coupler to couple incident lights to an optical waveguide, the present invention is also applicable to a case where a light is to be emitted from an optical waveguide into an external space.

Although the embodiment includes gratings with periods which match operations in different modes, in order to apply the embodiment also to lights having plural different wavelengths, it is also possible to form gratings respectively having periods associated with the objective wavelengths in an overlapped structure.

Moreover, in order to change one a propagation direction of a light coupled with the optical waveguide, an identical period may be set to plural kinds of gratings formed in a region. In this situation, the gratings may be respectively formed with different thicknesses.

Figure 82:
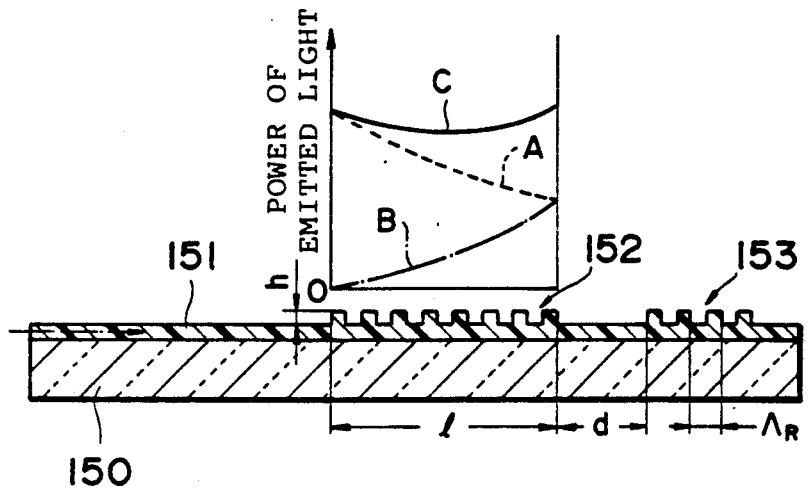
FIG. 82 is a cross-sectional view showing a 30th embodiment of a grating coupler in accordance with the present invention.

FIG. 82 shows a 30th embodiment of a grating coupler according to the present invention.

This configuration includes a substrate 150 and an optical waveguide 151 fromed thereon, the waveguide 151 having a light emitting grating 152 in a predetermined location thereof. Assuming that an incident light is fed from a left-hand side of FIG. 82 to the waveguide 151, a reflective grating 153 is disposed on the right of the grating 152 with a preset distance d therebetween. A light not reflected on the light emission grating 152 to pass therethrough toward the right-hand side in the figure is reflected on the refelctive grating 153 to be returned to the grating 152. As a result, the returned light is emitted from the grating 152 with a phase identical to a phase of the light beforehand emitted therefrom.

The reflective grating 153 has a period $\Lambda_R$, which is expressed as follows.

$$\Lambda_R = \lambda_g/2 \qquad (1)$$

where, $\lambda_g$ is a wavelength of a light propagated through the waveguide 151.

The distance d between the light emission grating 152 and the reflective grating 153 is represented as follows.

$$d = m\lambda_g/2 \qquad (2)$$

$$m = 1, 2, 3, \ldots$$

A refelctive grating section, when provided with many steps of grating, may completely reflect the incident light.

Intensity (power) of the light emitted from the grating coupler is determined by three parameters including a length l of the light emission grating 152, a radiation loss coefficient $\alpha_r$ decided by a height h and a cross-sectional contour of the grating 152, and a reflection coefficient associated with a light reflected on the reflective grating 153 (more concretely, this coefficient is decided by the number of steps of the grating 153 and a cross-sectional contour of the grating 153).

In FIG. 82, for an incident light to the grating 152, the distribution of emission light power from the grating 152 is drawn with a broken line A; whereas, for the reflection light, the power distribution of emission light from the grating 152 is indicated with a broken line B. The total of these power distributions is denoted with a solid line C. As can be seen from the power distribution of the solid line C, the emission light power develops a higher value in the end portions of the grating 152 and a smaller value in a central section thereof. This power distribution implies possibility of a super resolution. Namely, by focusing the lights emitted from the light emission grating 152, it is possible to form a light beam spot with a considerably small diameter.

The grating coupler of FIG. 82 may possibly be manufactured in a mass production. Namely, a stamper having the recessed and projected patterns of the gratings 152 and 153 is beforehand prepared such that a UV-setting resin is filed in a space between the stamper and the substrate 150. An ultraviolet ray is then radiated onto the UV-setting resin to solidify the resin. Finally, the stamper is removed to obtain a grating coupler in which the optical waveguide film 151 and the gratings 152 and 153 are integrally formed on the substrate 150.

Figure 83:
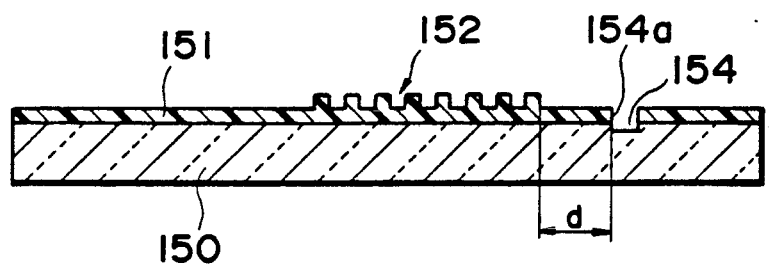
FIGS. 83 an 84 are cross-sectional views resepctively showing variations of a grating coupler.

FIG. 83 shows a variation of the grating coupler in accordance with the present invention.

In this example, in place of the reflective grating, a groove 154 is formed in the substrate 150 and in the waveguide layer 151 a wall surface 154a of the groove 154 is adopted as a reflection mirror. A reflection film of a material such as aluminum may favorably be produced on the wall surface 154a. The distance d between the light emission grating 152 and the wall surface 154a is represented by the expression (2) above.

Figure 84:
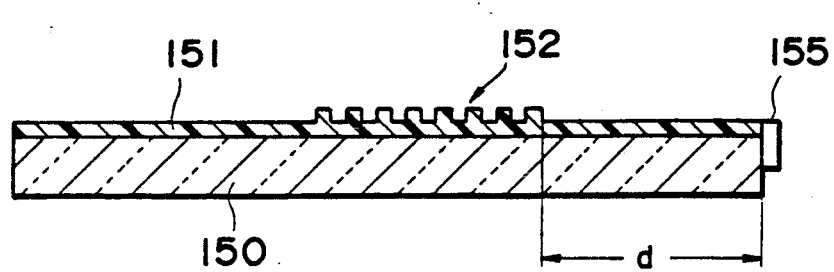

FIG. 84 shows another variation of the grating coupler in accordance with the present invention.

In this example, a reflection mirror 155 is formed in an end surface of the substrate 150. The mirror 155 is manufactured, for example, by evaporating aluminum on the surface.

Although the embodiment includes a grating of a step type, the grating may be fabricated in an arbitray contour, for example, in a brazed shape.

Figure 85:
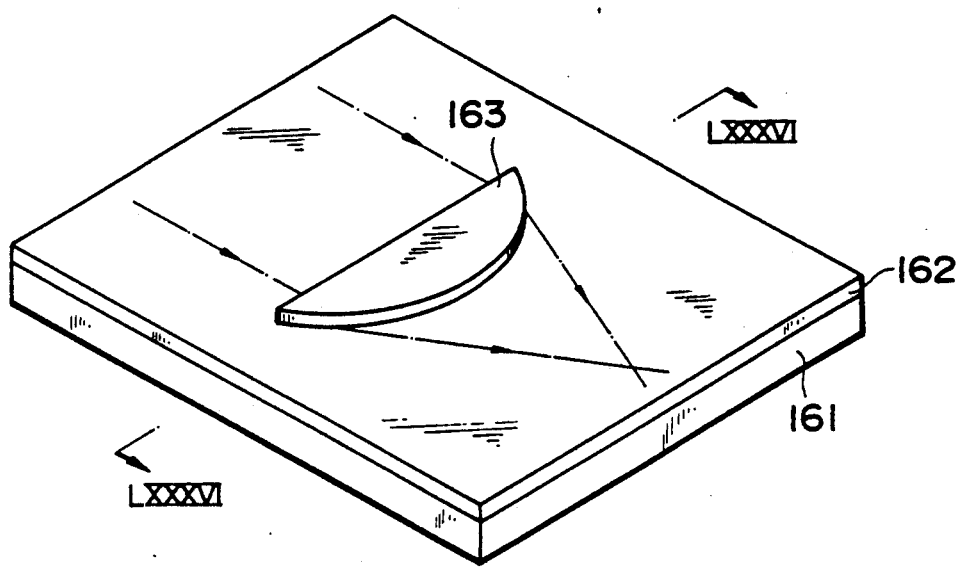
FIGS. 85 to 87 are diagrams showing a 31st embodiment of an optical waveguide according to the present invention.
Figure 86:
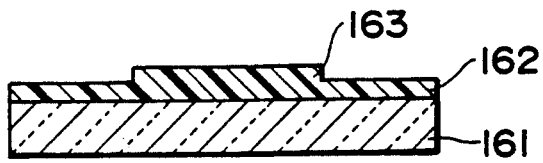
Figure 87:
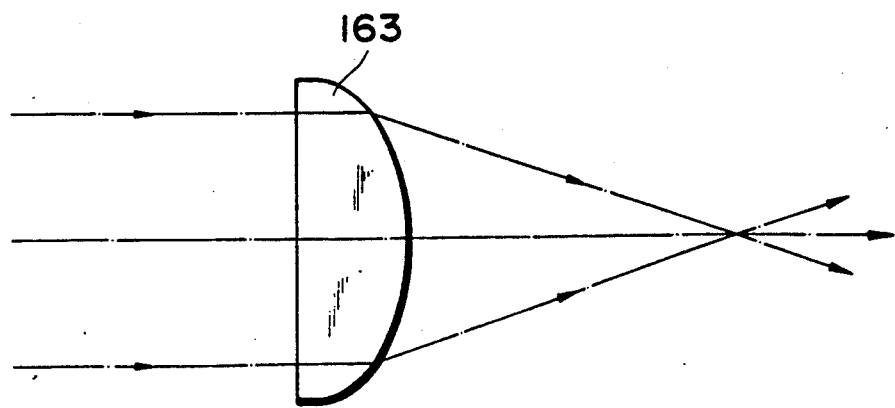

FIG. 85 is a perspective view showing a 31st embodiment of an optical waveguide lens according to the present invention. FIG. 86 shows a cross section of FIG. 85 along a line LXXXVI—LXXXVI, whereas FIG. 87 is a plan view showing a state where a propagation light is focused.

In the configuration associated with these figures, on a substrate 161 of a glass or the like, there is formed an optical waveguide layer 162 with a UV-setting resin having a reflective index larger than a reflective index of the substrate 161. The waveguide layer 162 includes a projected portion 163 for a lens in an integral manner. The projection 163 has a side formed in a straight line and another side manufacture in an arc shape such that the width along the propagation direction of a light propagated through the waveguide layer 162 develops the maximum value in a central portion thereof along a direction orthogonal to the propagation direction. The width is gradually reduced in a direction toward each side portion of the waveguide layer 162. A portion of the waveguide layer 162 just below the projected portion 163 for a lens has an effective refractive index larger than those developed in other portions of the waveguide layer 162. The distribution of the effective refractive index is developed in accordance with the contour of the projection 163. Consequently, the propagation light is diffracted according to the refractive index distribution to be focused as shown in the figures.

The thickness of the projection 163 may be varied to form a desired effective refractive index distribution in the optical waveguide film 162.

When the circular edge of the projected section 163 is formed to have a contour which equalizes the length of the light path from the projection 163 to the focus for all lights, there is fabricated a lens free from a spherical aberration.

FIGS. 88a to 88f show an example of a process of manufacturing the optical waveguide lens of FIG. 85, which corresponds to the cross section of FIG. 86. A UV-setting substance is employed here to fabricate a waveguide layer.

Figure 88A:
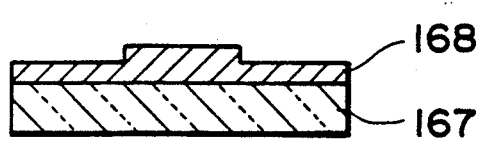
FIGS. 88a to 88f are cross-sectional views showing examples of processes of manufacturing the optical waveguide of FIG. 85 associated with the cross section of FIG. 86.

First, a master of the optical waveguide layer is created in an electron beam lithography. Namely, an electron beam resist is applied onto a substrate 167 such that a pattern of the projection for a lens is drawn thereon by use of an electron beam. The resist film is then developed to produce a master including a remaining resist film 168 of the contour of the projection on the substrate 167 (FIG. 88a).

Figure 88B:
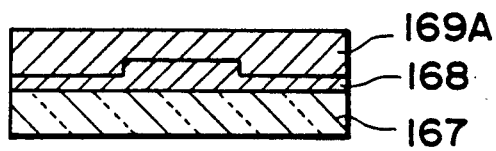
Figure 88C:

Subsequently, a nickle film 169A is formed on the master in an electronforming method (FIG. 88b). The master is then separated to attain a nickel stamper 169 (FIG. 88c).

Figure 88D:
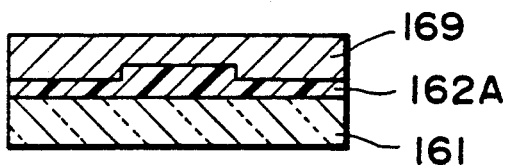
Figure 88E:
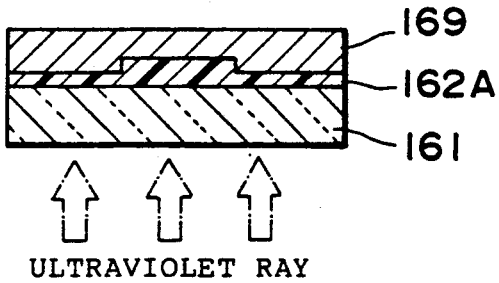
Figure 88F:
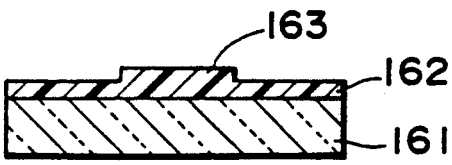

Next, a UV-setting resin 162A as a material of the waveguide layer is applied onto a glass substrate 161. The nickel stamper is placed on the resin 162A. The stamper and the substrate 161 are pushed against each other to set a gap therebetween to a preset value. If necessary a vibration is applied in this process (FIG. 88d). An ultraviolet ray is irradiated through a rear surface of the substrate 161 to solidify the UV-setting resin (FIG. 88e).

After the resin becomes to be stiff, the stamper 169 is peeled off therefrom, thereby producing an optical waveguide layer 162 having the projection 163 on a surface of the substrate 161 by use of a UV-setting resin.

Figure 89:
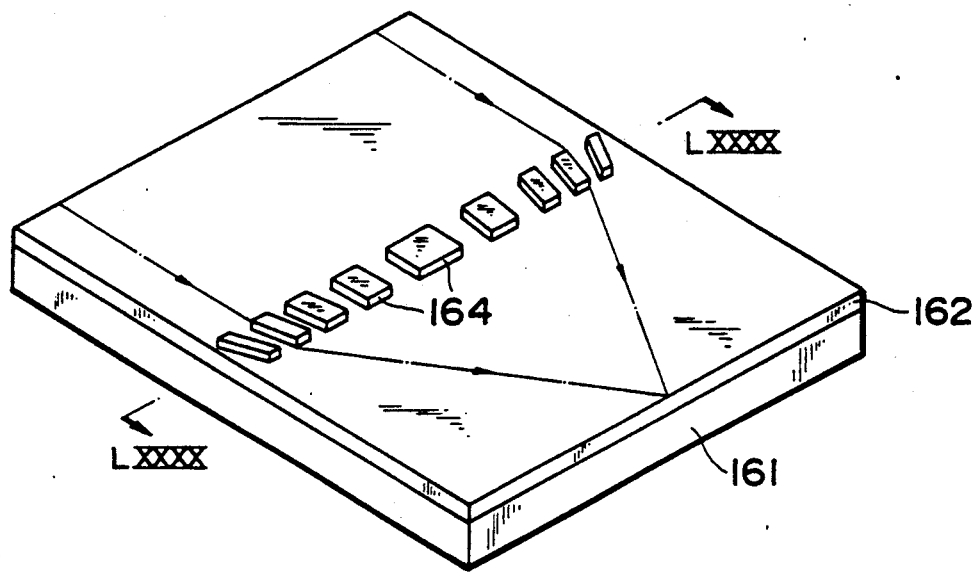
FIGS. 89 to 91 are diagrams showing a 32nd embodiment of a waveguide according to the present invention.
Figure 90:
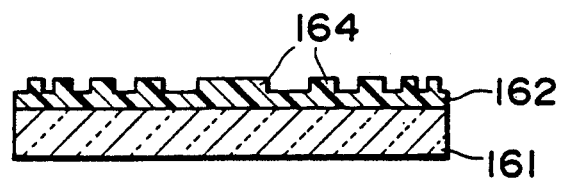
Figure 91:
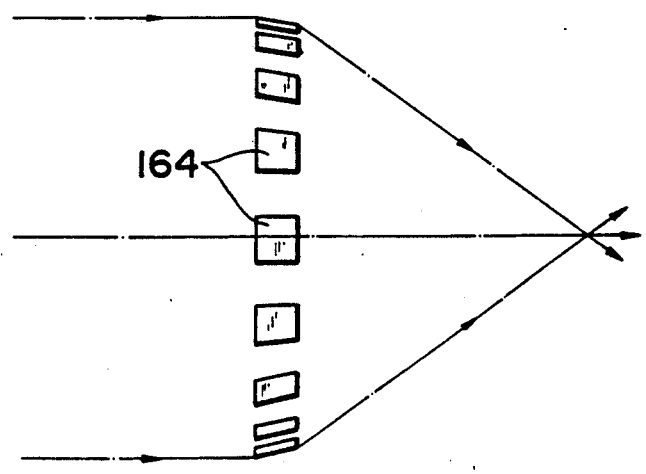

FIGS. 89 to 91 show a 32nd embodiment according to the present invention. FIG. 89 is a perspective view of an optical waveguide lens of the embodiment. FIG. 90 shows a cross section of FIG. 89 along a line LXXXX—LXXXX. FIG. 91 shows a state in a plan view in which a propagation light is focused. In these figures, the same components as those of FIGS. 85 to 87 are assigned with the same reference numerals and a redundant description thereof will be eliminated.

In the configuration of the 32n embodiment, on an optical waveguide layer 162, a lot of grating projections 164 are arranged in a direction orthogonal to the direction in which a light is propagated therethrough. These projections 164 are formed to be integral with the waveguide layer 162 and have periods (widths and intervals along the arrangement direction of the projected portions 164). The periods develop the maximum value in a central portion and are gradually minimized toward the outer sides. Due to existence of the grating projections 164, a grating of an effective refractive index modulation type is fabricated in the optical waveguide layer 162. Since the period varies as above, the propagation light is diffracted to be focused as shown in the figures. The thicknesses of the grating projections may be varied to form a desired refractive index distribution.

Figure 92:
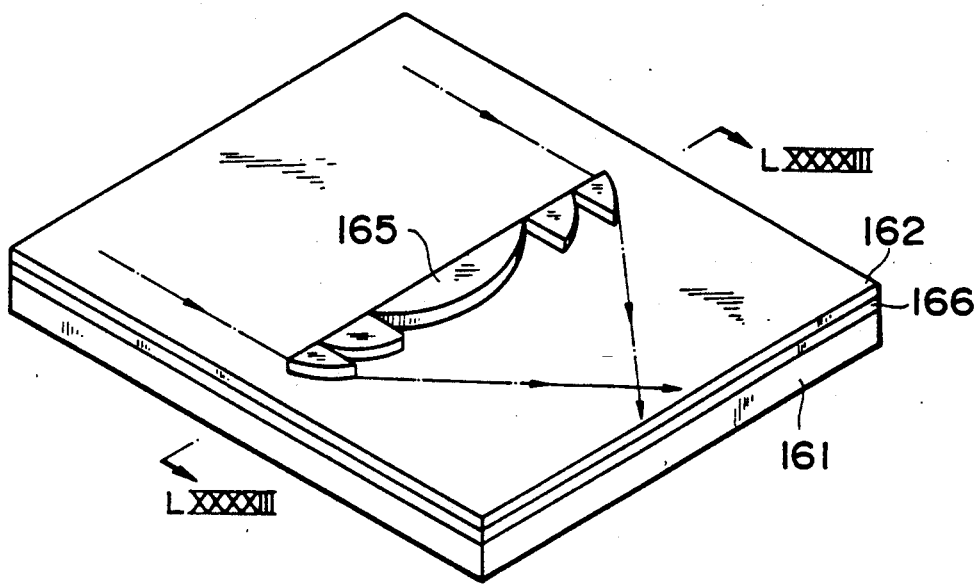
FIGS. 92 and 93 are diagrams showing a 33rd embodiment of a waveguide according to the present invention.
Figure 93:
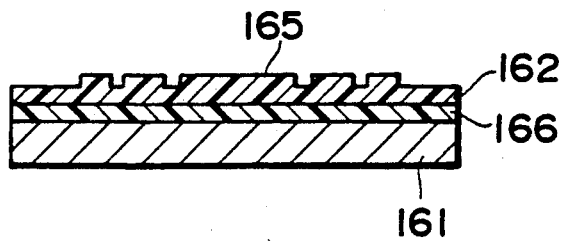

FIGS. 92 and 93 show a 33rd embodiment according to the present invention. FIG. 92 is a perspective view of the embodiment, whereas FIG. 93 shows a cross section of FIG. 92 along a line LXXXXIII—LXXXXIII. In these figures, the same components as those of FIGS. 89 to 91 are assigned with the same reference numerals and a redundant description thereof will be dispensed with.

The grating projected section 165 of the figures is formed to cause a phase modulation by use of the grating. The width of the grating projections is periodically varied in a light propagation direction. The period thereof is also changed in a direction orthogonal to the propagation direction. The grating projected section 165 forms an effective refractive index distribution in the optical waveguide layer 162. Thanks to the distribution, the propagation light is diffracted to be focused.

In this embodiment, moreover, between the substrate 161 and the waveguide layer 162, there is fabricated a buffer layer 166 having a refractive index less than a refractive index of the waveguide layer 162. The buffer layer 166 may also be created with a UV-setting resin. The refractive index of the UV-setting resin can be altered by changing the amount of fluorine contained therein.

Since the buffer layer 166 is disposed between the waveguide layer 162 and the substrate 161, an arbitrary material may be used to form the substrate 161.

The optical waveguide lens of FIGS. 89 to 93 may also be produced in a similar process to the process of FIGS. 88a to 88f. The buffer layer may be manufactured as follows. Namely, a UV-setting resin for the buffer layer is injected between the substrate and a stamper prepared for manufacturing the buffer layer. After the UV-setting resin is solidified, a UV-setting resin for an optical waveguide layer is filled in a space between the buffer layer and a stamper for a grating projection. Thereafter, the resin is solidified to complete the producuction of the waveguide lens.

Although the embodiment above includes an optical waveguide lens which focuses lights, an optical waveguide lens for collimating or for diverging lights may also be created in a similar fashion.

In the above embodiment, the waveguide layer 162 and the buffer layer 166 are formed with a UV-setting resin; however, the present invention is not restricted by the material above. Namely, any other organic or inorganic substance which changes its state from a liquid state into a solid state, for example, through a heating thereof may possibly used as the material. The thermosetting inorganic material may be, for example, a coating liquid to produce a thermosetting film. Moreover, a nonlinear organic substance developing a nonlinear optical characteristic may also be employed to form the optical waveguide layer 162.

Figure 94A:
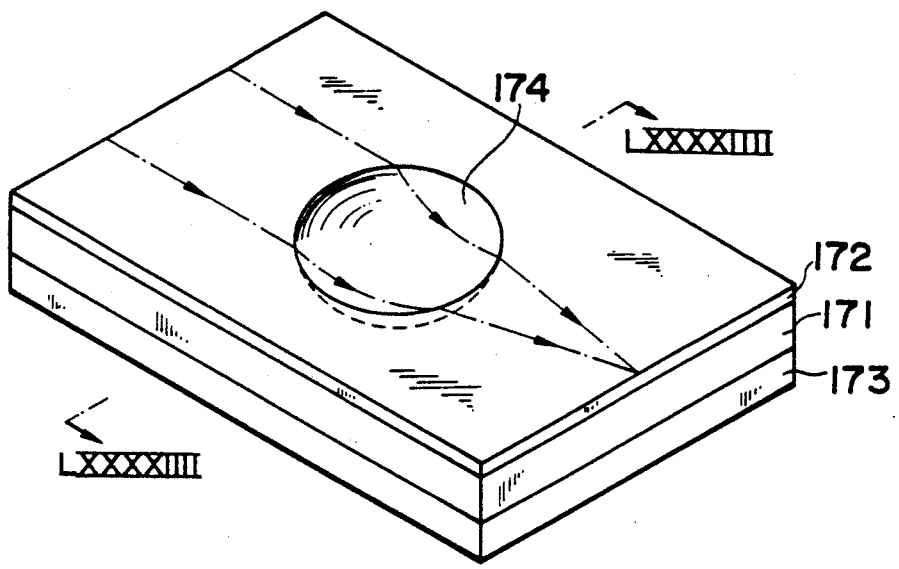
FIGS. 94a and 94b are diagrams showing a 34th embodiment of a waveguide according to the present invention.
Figure 94B:
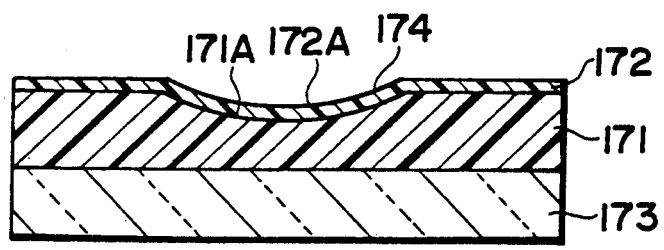

FIG. 94a is a perspective view showing an optical waveguide including an optical waveguide lens in a 34th embodiment according to the present invention. FIG. 94b shows a cross section of FIG. 94a along a line LXXXXIIII—LXXXXIIII.

The waveguide includes a substrate 173 formed with a material such as a glass and a clad layer 171 fabricated thereon. The clad layer 171 includes in its portion a recessed section 171A having a curved surface. An optical waveguide layer 172 is formed on the clad layer 171. The waveguide layer 172 has a uniform thickness and a refractive index larger than a refractive index of the clad layer 171. Also on the optical waveguide layer 172, there is formed a recessed portion 172A having a spherical surface at a location associated with the location of the recessed section 171A of the clad layer 171. An optical waveguide layer portion vertically enclosed with the recessed portions 171A and 172A serves as a geodesic lens 174. The waveguide layer 172 and the clad layer 171 are manufactured, for example, with a UV-setting resin.

A light introduced in the waveguide layer 172 is propagated therethrough toward the region of the geodesic lens 174. In this region, the propagation light proceeds along a curve according to the Fermat's principle to change the propagation direction. The light is consequently focused through the lens function of the geodesic lens 174.

FIGS. 95a to 95g show a process example to fabricate the optical waveguide layer including the geodesic lens of FIG. 94a. The clad layer and the waveguide layer are here manufactured with a UV-setting resin.

Figure 95A:
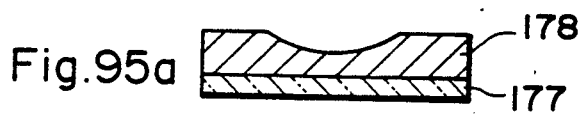

A mother board of the optical waveguide layer is first produced in an electron beam lithography. An electron beam resist is applied onto a substrate 177 and then a pattern of the depressed portion is drawn on the resist film. The resist film is then developed to obtain a mother board including a remaining resist film 178 of the contour of the recessed portion on the substrate 177 (FIG. 95a).

Figure 95B:
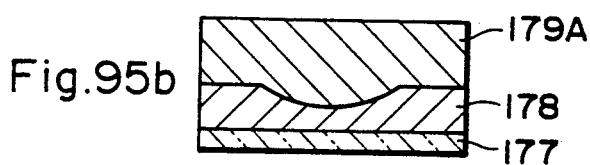

Next, a nickel layer 179A is formed on the mother board in an electronforming method (FIG. 95b). The mother board is then separated to attain a nickel stamper 179 (FIG. 95c).

Subsequently, a UV-resin 171C as a material of the clad layer is applied onto a transparent substrate 173. The nickel stamper 179 is placed thereon such that the substrate 173 and the stamper 179 are pressed against each other to set a gap therebetween to a predetermined value. If necessary, a vibration is also applied in this process. An ultraviolet ray is radiated through a rear surface of the substrate 173 to solidify the UV-setting resin (FIG. 95d).

After the resin becomes to be solid, the stamper 179 is peeled off (FIG. 95e), thereby forming a clad layer 171 including a recessed portion 171A on a surface of the substrate 173 by use of a UV-setting resin.

Figure 95C:
Figures 95D, 95F:
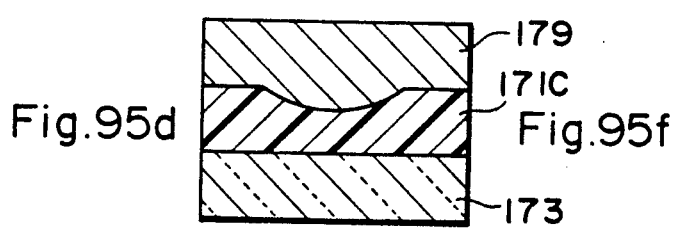
Figure 95E:
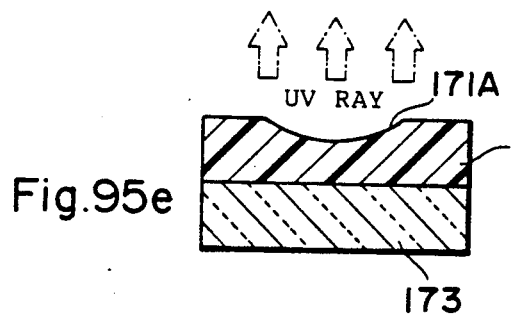
Figure 95G:
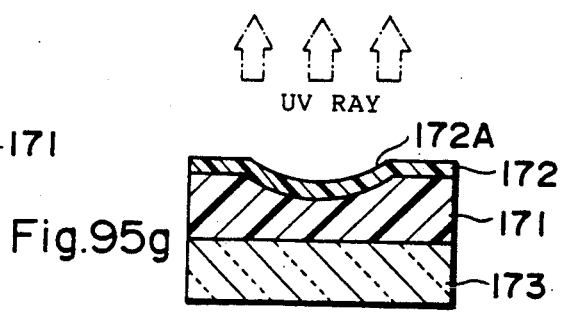

Next, a stamper 176 for producing the recessed portion 172A of the waveguide layer 172 is created in a similar manner as to the process of FIGS. 95a to 95c.

Thereafter, a UV-setting resin as a substance of the optical waveguide material is applied onto the clad layer 171 beforehand prepared. The nickel stamper 176 is placed thereon such that the substrate 173 and the stamper 176 are pressed against each other to set a gap therebetween to a predetermined value. If necessary, a vibration is also applied in this step. The UV-setting resin 172C used in this process has a refractive index larger than a refractive index of the UV-setting resin 171C of the clad layer 171. The UV-setting resin develops a refractive index of which the value is changed by altering the amount of fluorine contained therein. An ultraviolet ray is radiated through a rear surface of the substrate 173 to solidify the UV-setting resin (FIG. 95f).

After the resin becomes to be solid, the stamper 176 is peeled off (FIG. 95g), thereby obtaining an optical waveguide lens on a surface of the substrate 173 by use of UV-setting resin.

In the manufacturing process above, the separate stampers 179 and 176 are produced; however, the optical waveguide lens may be manufactured by use of only one stamper. Moreover, a spin-coating of a UV-setting resin may be achieved onto the clad layer 171 to fabricate the optical waveguide layer 172.

Figure 96A:
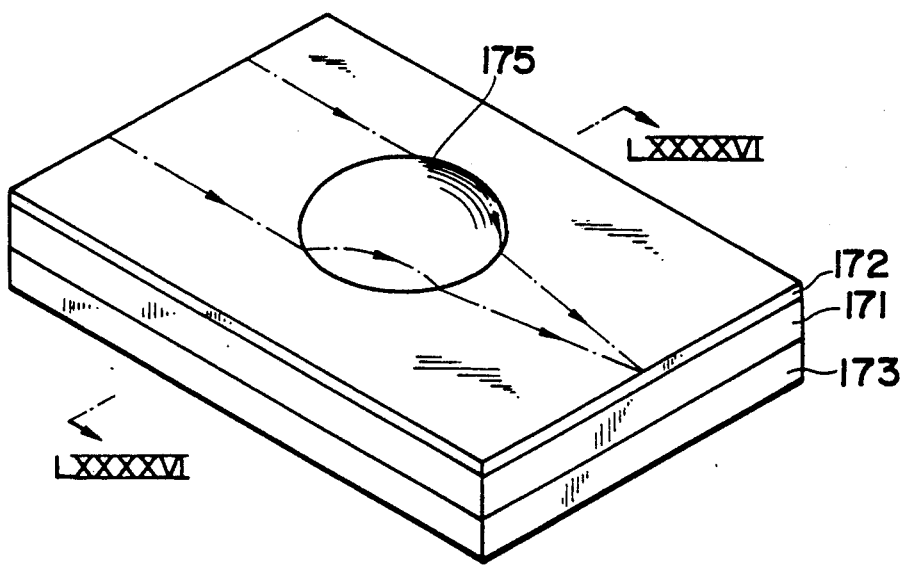
FIGS. 96a and 96b are diagrams showing a 35th embodiment of a waveguide according to the present invention.
Figure 96B:
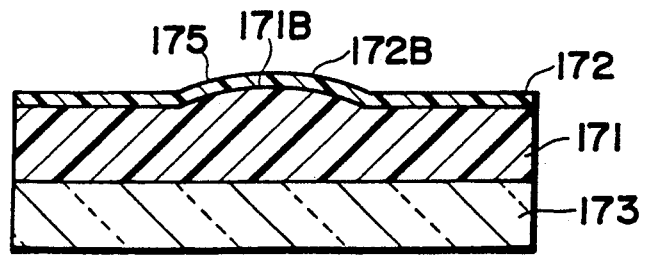

FIG. 96a is a perspective view of an optical waveguide having an optical waveguide lens in a 35th embodiment according to the present invention. FIG. 96b shows a cross section of FIG. 96a along a line LXXXXVI—LXXXXVI. In these diagrams, the same components as those of FIGS. 94a and 94b are assigned with the same reference numerals and a redundant description thereof will be dispensed with.

In the waveguide of FIGS. 96a and 96b, a projected section 171B having a curved surface is formed in a portion of a clad layer 171. Also on a waveguide layer 172, there is created a projected section 1728 having a curved surface in a portion thereof associated with the portion of the projected section 1718 of the clad layer 171. The waveguide portion enclosed with the projections 171B and 172B in a vertical direction functions as a geodesic lens 175.

Also in the waveguide of FIGS. 96a and 96b, a light fed to the waveguide film 172 is propagated therethrough to pass a region of the geodesic lens 175. In this region, the light propagates along a curve according to the Fermat's principle to change the propagation direction. The lens 175 serves a lens function to focus the propagation light.

The optical waveguide layer including the geodesic lens of FIGS. 96a and 96b may be manufactured, by preparing a stamper to form the projections 171B and 172B, in a similar process to the process of FIGS. 95a to 95g.

In the embodiment above, the clad layer 171 and the waveguide layer 172 are fabricated with a UV-setting resin, which however does not restrict the present invention. Namely, these layers may be produced with any organic or inorganic material which is solidified, for example, through a heating operation. Furthermore, an nonlinear organic substance may be adopted to form the waveguide layer 172.

In a method of manufacturing various kinds of optical function elements each including the optical waveguide layer above, there is employed a substance which is solidified under an energy irradiation thereonto. That is, the optical waveguide medium fabricated in the method above is limited to a liquid material which is solidified under an energy irradiation; moreover, the material is substantially a synthetic resin which develops only a thermo-optical effect. In consequence, the propagation light can be controlled only depending on the thermo-optical effect. Namely, the other optical effects such as an electro-optical effect, an acousto-optical effect, a magneto-optical effect, and a nonlinear optical effect cannot be easily used to control the propagation light. Moreover, in a case where a thermo-optical effect is adopted to control the propagation light, an electrode necessary to control the propagation light cannot be easily disposed on the material above.

Next, a description will be given of an embodiment of an optical waveguide device in which an electrode to control a propagation light based on the thermo-optical effect can be easily fabricated; moreover, optical effects other than the thermo-optical effect can be used for the control of the propagation light.

Figure 97:
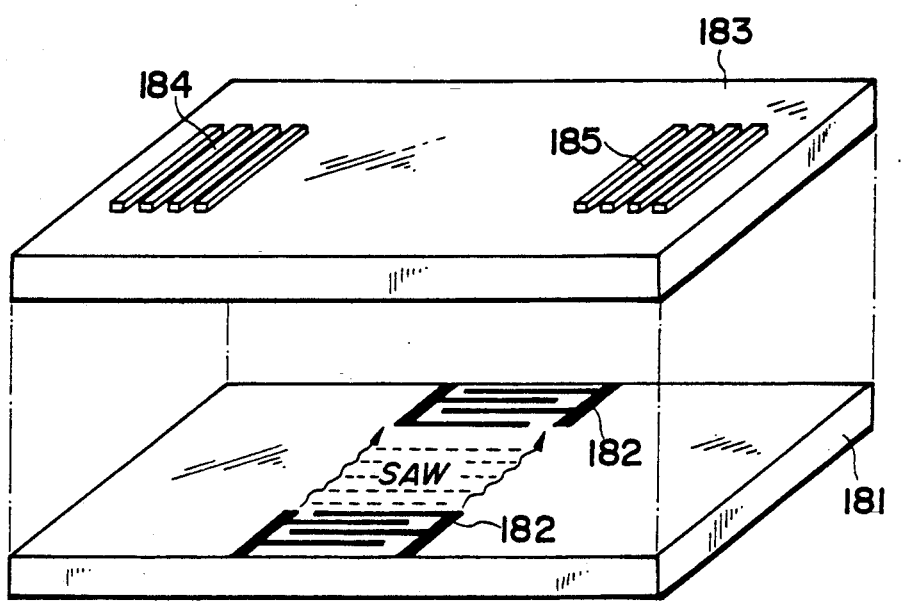
FIGS. 97 and 98 are diagrams showing a 36th embodiment of an optical waveguide device according to the present invention.
Figure 98:
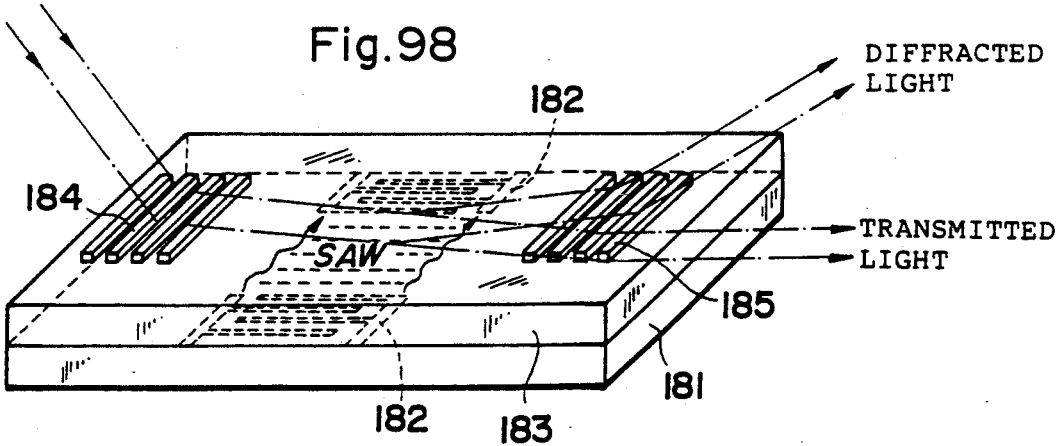

FIGS. 97 and 98 show a 36th embodiment in accordance with the present invention. FIG. 97 is a perspective view of a disassembled state of a Bragg-type modulator, whereas FIG. 98 is a perspective view of the modulator.

In this structure, a surface acoustic wave transducer (a so-called inter-digital transducer) 182 producing a surface acoustic wave (SAW) is formed on each side of substantially a center portion of a piezo-crystal substrate (e.g. an $LiNbO_3$ substrate) 181. The SAW transducer 182 may be manufactured, for example, by use of a photolithography. A surface acoustic wave generated from an SAW transducer 182 is propagated through a surface of the substrate 191 toward another SAW transducer 182. The SAW transducers need only be disposed on either one side of the substrate 181.

On the piezo-crystal substrate 181, there is integrally formed an optical waveguide layer 183 with a UV-setting resin or the like, which will be described later. The waveguide layer 183 is provided with an input grating coupler 184 and an output grating coupler 185 thereon.

On receiving a high-frequency electric signal, the SAW transducer 182 generates a surface acoustic wave onto the piezo-crystal substrate 181. A light is fed via the input grating coupler 184 into the waveguide 183 so as to be propagated therein in a direction, which satisfies the Bragg diffraction condition with resepct to the surface acoustic wave. The light propagated through the waveguide layer 183 undergoes the Bragg diffraction with the surface acoustic wave. The diffracted light is fed via the output grating coupler 185 to an external device. When the surface acoustic wave is missing the light propagated through the waveguide film 183 is delivered as a penetration light via the output grating coupler 185 to an external unit.

The Bragg-type modulator above can be manufactured as follows.

On the Piezo-crystal substrate 181, there are formed SAW transducers 182 through a photolithography process.

On the other hand, a mother board of the optical waveguide layer 183 having grating couplers is produced in an electron beam lithography. Namely, an electron beam resist is applied onto a glass substrate and then a pattern of grating couplers is drawn on the resist film by use of an electron beam. The resist film is then developed to attain a mother board including a remaining resist film of the grating coupler on the glass substrate. A nickel film is formed on the mother board in an electroforming method. The mother board is separated therefrom to attain a nickel stamper.

Next, a UV-setting resin as a material of the optical waveguide layer is applied onto a surface of the piezo-crystal substrate 181 where the SAW transducers 182 have been formed. The nickel stamper is placed on the resin and then the substrate 181 and the nickel stamper are pushed against each other to set a gap therebetween to a predetermined value. If necessary, a vibration is also applied in this process.

An ultravilet ray is irradiated to solidify the UV-setting resin.

After the resin becomes to be stiff, the stamper is removed, thereby obtaining a Bragg-type modulator in which an optical waveguide layer 183 of a UV-setting resin is fabricated on the piezo-crystal substrate 181 including SAW transducers 182 formed thereon.

Figure 99:
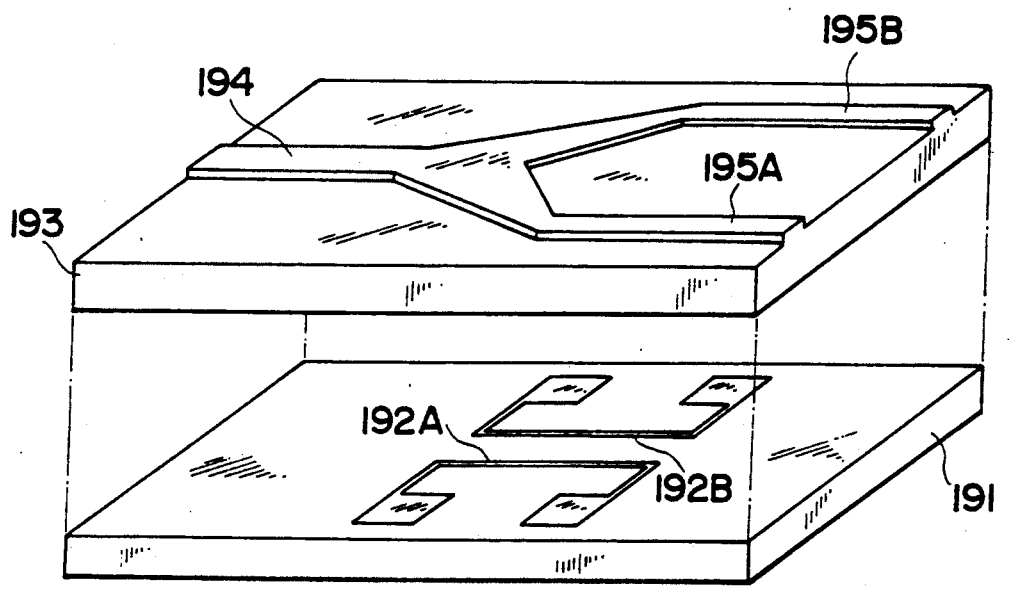
FIG. 99 is a disassembled perspective view of a branching switch in a 37th embodiment according to the present invention.

FIG. 99 shows a disassembled perspective view of a branching switch in a 37th embodiment according to the present invention.

in the configuration, thin-film heaters 192A and 192B are manufactured with a material such as titanium on a substrate 191. The substrate 191 need only be fabricated with a material on which the titanium heaters can be easily formed. On an optical waveguide layer 193, there are formed a rib optical waveguide 194 extending in a direction and two rib optical waveguides 195A and 195B branching from the waveguide 194 toward two directions. The waveguide 193 is fabricated with a material developting a thermo-optical effect so as to be integrally linked with the substrate 191. The heaters 192A and 192B are disposed Just beneath branch portions of the rib optical waveguides 195A and 195B.

Since the effective refractive index in positions just under the rib optical waveguide is higher than those developed in other positions, a light is propagated through the positions just under the rib optical waveguide. When either one of the thin-film heaters 192A and 192B is powered, the refractive index of a portion of the waveguide 193 just over the powered heater is increased. In consequence, a light propagated through the portion of the waveguide 193 just beneath the rib optical waveguide 194 is attracted at the branch point of the waveguide 193 toward a position associated with the waveguide 195A or 195B just above the powered heater. Namely, the light is passed to the waveguide 195A or 195B to be propagated therethrough. For example, when the heater 192A is powered, the light is emitted from the waveguide 195A; whereas, when the heater 192B is powered, the light is emitted from the waveguide 195B.

The switch of FIG. 99, like the Bragg-type modulator of FIGS. 97 and 98, can be manufactured as follows. Namely, thin-film heaters 192A and 192B are fabricated on a substrate 191. A stamper having a contour of the rib-type waveguides 194, 195A, and 195B is prepared such that branch portions of the waveguides are located above the heaters 192A and 192B. A UV-setting resin is injected between the stamper and a surface of the substrate 191 where the heaters 192A and 192B are formed. The resin is solidified and then the stamper is removed therefrom to complete the production of the branching switch.

In accordacne with the present invention, various kinds of light control functions can be achieved by appropriately selecting the materials of the substrates. For example, based on the electro-optical effects, the light amplitude and phase modulations, the light path switching, deflection, the light diffraction, the mode change, etc. can be accomplished. In such cases, the substrate may be formed with $LiNbO_3$, $LiTaO_3$, or the like. When the acousto-optical effects are utilized, there can be conducted operations such as the light diffraction and deflection, the mode change, and a single sideband wave generation. In these cases, the substrate may be implemented with an $LiNbO_3$ layer, an $As_2S_3$ film, or the like. When utilizing the magneto-optical effects, the optical nonreprocity, the mode change, etc. can be achieved. For these purposes, a YIG film/GGG, a paramagnetic glass, and the like may be used for the substrate. Based on the thermo-optical effects, there can be accomplished the optical path change, the light amplitude and phase modulations, etc. In such cases, various types of materials are applicable to the substrate. When the nonlinear optical effects are employed, the secondary harmonic wave generation, the parametric amplification, and the like can be conducted. For the substrate, an $LiNbO_3$ film, a ZnO layer, etc. may be adopted.

in the waveguide-type grating, the waveguide lens, and the like above (FIG. 70 to FIGS. 96a and 96b), the thickness of the waveguide layer is an essential parameter to decide the propagation constant of the propagation light. Particularly, in the grating coupler, when the thickness of the waveguide layer is deviated from a design value, the input and output angles of lights also shift from the design values. That is, a highly precise control is required to be achieved on the thickness of the waveguide film.

However, in the production method above in which a UV-setting resin is injected between a substrate and a stamper and then the resin is solidified under irradiation of an ultraviolet ray, the thickness of the optical waveguide film is determined by the gap between the stamper and the substrate. Furthermore, the gap is controlled depending on the pressure under which the UV-setting resin is injected therebetween, and hence the highly precise control of the film thickness cannot be easily achieved. In addition, it is difficult to set the gap between the stamper and the substrate to two micrometers or less. Namely, an optical waveguide layer having a thickness not exceeding two micrometers cannot be easily produced. In consequence, in the grating coupler, the input and output angles of lights are likely to be fluctuated.

Next, a description will be given of an optical waveguide device and a method of manufacturing of the same in which the thickness of the optical waveguide layer can be controlled with a high precision and a thin waveguide layer can be fabricated. As an example of the waveguide layer device, a grating couler will be described.

Figure 100:
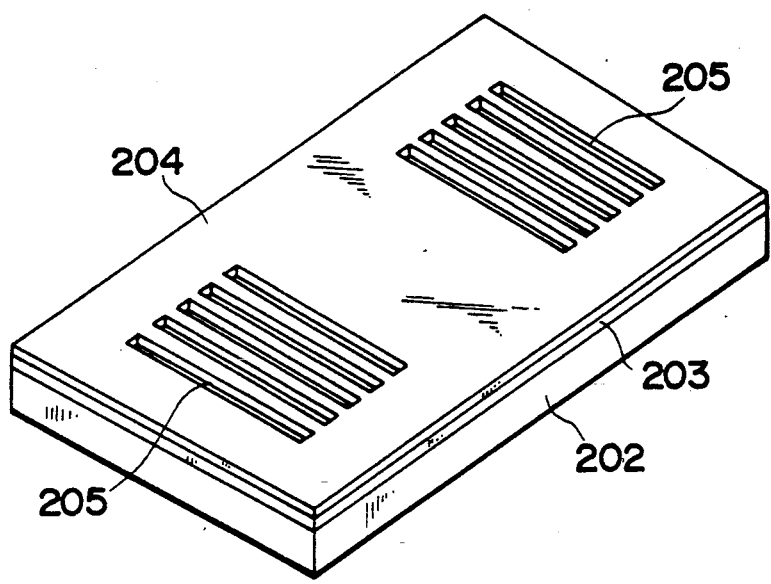
FIG. 100 is a perspective view showing a 38th embodiment of a grating coupler according to the present invention.
Figure 101:
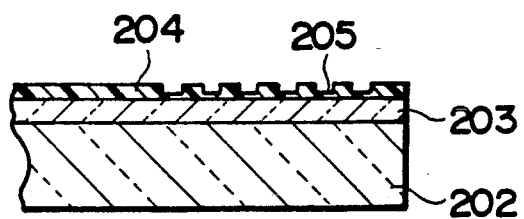
FIG. 101 is a partially cutaway cross-sectional view of the grating coupler.

FIGS. 100 and 101 show a grating coupler in a 38th embodiment according to the present invention. The coupler includes a substrate 202 and an optical waveguide layer 203 formed thereon with a transparent inorganic substance. On the waveguide layer 203, a grating layer 204 of a UV-setting resin is accumulated. The grating layer 204 includes a grating 205 fabricated thereon. The waveguide layer 203 is formed, for example, with inorganic materials listed in the following table by use of thin film forming technologies such as a sputtering and a chemical vapor deposition (CVD). Depending on selected substances, there are favorably employed manufacturing methods listed in the table.

| Material | Production Method |
|---|---|
| ZnS | Sputtering |
| ZnO | Sputtering, CVD |
| $Si_3N_4$ | CVD |
| PLZT | Sputtering |
| $LiNbO_3$ | Sputtering |
| YIG | Sputtering |

Figure 102A:
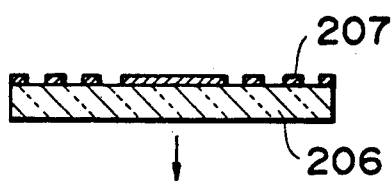
FIGS. 102a to 102e are cross-sectional views for explaining the method of manufacturing the grating coupler.
Figure 102C:
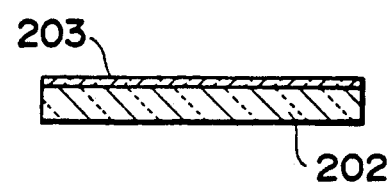
Figure 102B:
Figure 102D:
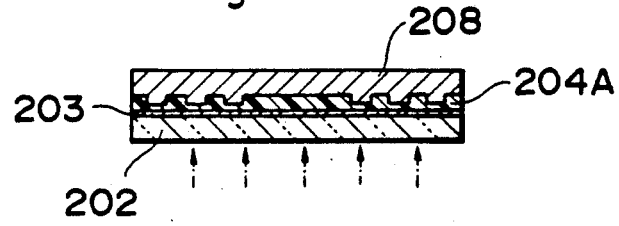
Figure 102E:
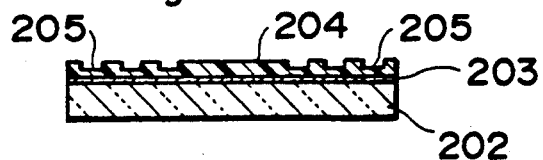

FIGS. 102a to 102e show an example of a method of manufacturing the grating coupler. FIG. 102a shows a process of manufacturing a mother board or an original plate of the grating coupler. In this step, based on an electron beam writing method, a grating pattern is drawn and is formed on a glass substrate 206 by use of an electron beam resist 207. Using the resultant mother board, a nickel stamper 208 of FIG. 102b is fabricated in an electroforming method. On the other hand, as shown in FIG. 102c, an optical waveguide layer 203 is formed with a desired film thickness on a glass substrate 202 by use of a transparent inorganic material selected from the table above in a sputtering or CVD process. The glass substrate 202 on which the waveguide layer 203 is formed is located to oppose, as shown in FIG. 202d, the stamper 208 with a small gap therebetween. A UV-setting resin 204A to be solidified is injected between the stamper 208 and the waveguide layer 203. An ultraviolet ray is irradiated through the grass substrate 202 to reach the resin 204A via the waveguide layer 203. In consequence, the resin 204A becomes to be solid to form a grating 204. After the solidification of the resin 204A, the stamper 208 is removed to obtain a grating coupler.

Furthermore, in addition to the embodiment above, various kinds of embodiments can possibly be configured in accordance with the present invention. Particularly, owing to the adoption of the sputtering, the CVD, and the like to form the optical waveguide layer, the inorganic substances of the table above having the acousto-optical and electro-optical effects as well as magnetic materials may be utilized to fabricate the optical waveguide layer. Consequently, an active optical waveguide device may also be manufactured by use of physical characteristics of these substances.

Figure 103:
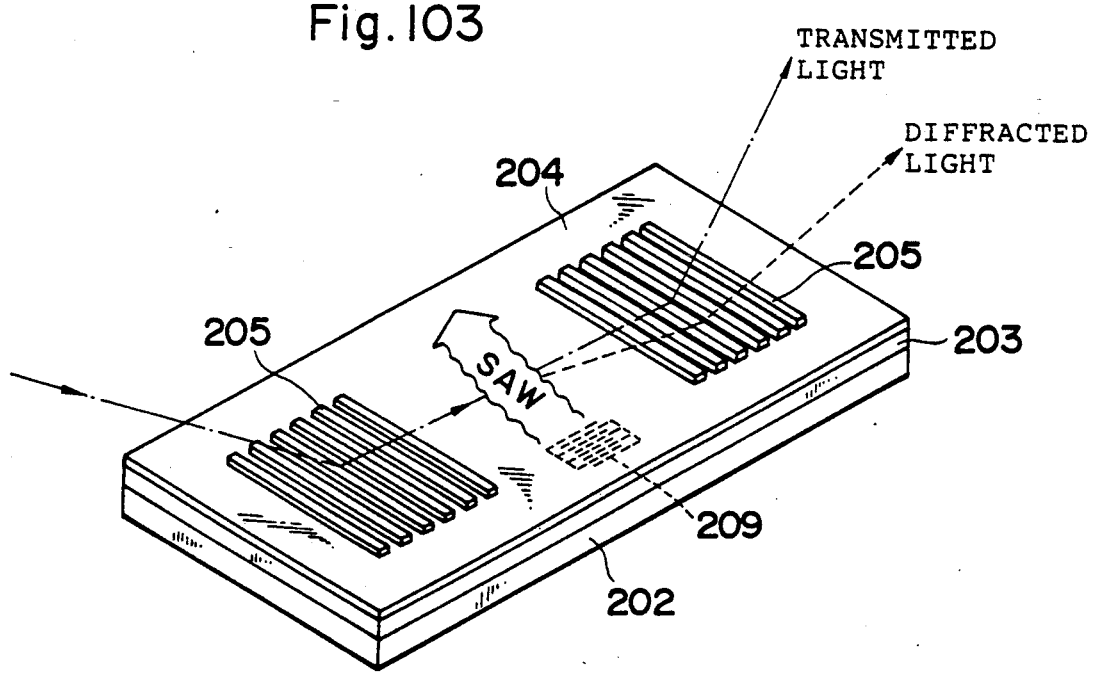
FIG. 103 is a perspective view showing a grating coupler in a 39th embodiment according to the present invention.

For example, in FIG. 103 showing a grating coupler in a 39th embodiment according to the present invention, an optical waveguide layer 203 is formed with ZnO having an acousto-optical effect. On a surface of the waveguide layer 203, an electrode material is evaporated to fabricate an inter-digital transducer 209 in a form of a comb. Moreover, a grating layer 204 having two gratings 205 is formed on the waveguide layer 203.

When an electric signal is applied to the inter-digital transducer (IDT) 209, a surface acoustic wave (SAW) is propagated through the surface of the waveguide layer 203 between the gratings 205. Consequently, when the wave is propagated as above, a light incident from a first grating 205 to be propagated to the optical waveguide layer 203 so as to be emitted as a penetration light from a second gating 205 in a case where the surface acoustic wave from the inter-digital transducer 209 is missing is subjected to a Bragg diffraction in the waveguide layer 203 due to the surface acoustic wave propagated from the inter-digital 209. Namely, the propagation light is emitted as a diffraction light from the gating 205 on the output side.

Although a material having the acoustic-optical effect is used in the embodiment above, any other material, for example, an inorganic substance developing an electro-optical effect may be adopted to form the optical waveguide film such that the waveguide layer conducts an optical shutter function.

Although not shown, between the optical waveguide layer and the glass substrate, there may be disposed a buffer layer fabricated with an optical material having a refractive index smaller than a refractive index of the optical waveguide layer.

The present invention is naturally also applicable to, in addition to the grating coupler, various grating elements such as a focusing grating coupler as well as a waveguide lens.

Figure 121:
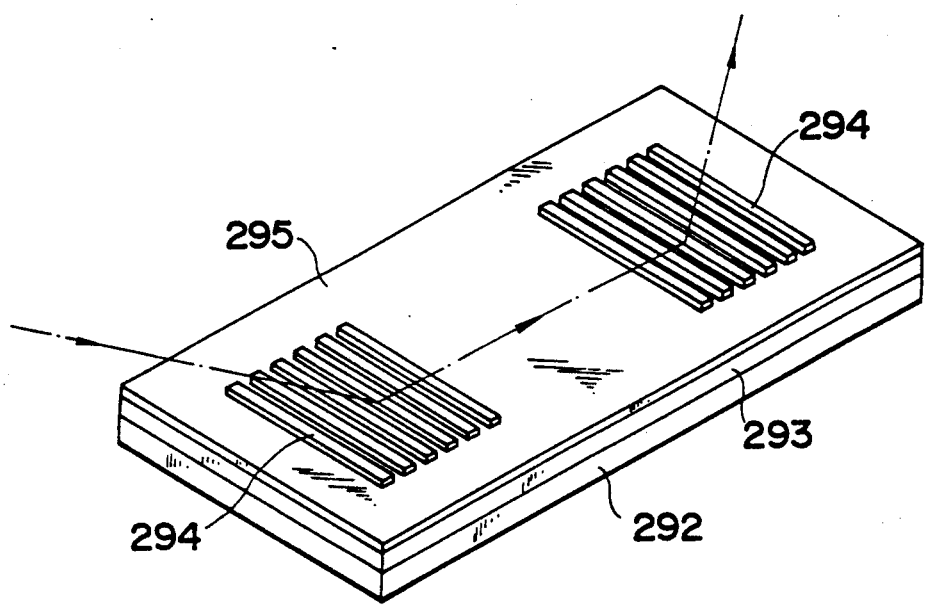
FIG. 121 is a partially magnified cross-sectional view of the grating coupler.

FIG. 121 shows a structure of a conventional grating coupler. In this constitution, a light incident to a grating 294 is propagated through an optical waveguide layer 295 so a to be emitted from another grating 294. This coupler includes a silicon substrate 292 and a buffer layer 293 formed thereon with silicon dioxide ($SiO_2$). On the buffer layer 293, there is formed an optical waveguide layer 295 provided with gratings 294 which are fabricated by sputtering thereonto $SiO_2$ having a refractive index slightly larger than a refractive index of the buffer layer 293.

Figure 122:
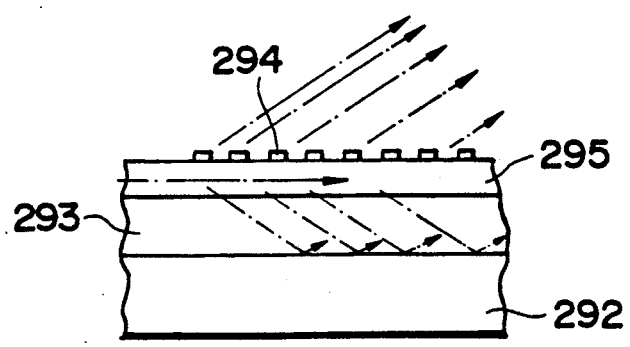
FIG. 122 is a cross-sectional view showing the constitution of the grating coupler.

Referring to FIG. 122 showing a magnified view of the grating 294 on the light output side, the propagation light is diffracted therethrough in an upward direction (to the air) and to a downward direction (to the side of the buffer layer 293). By appropriately selecting the thickness of the buffer layer 293, the light diffracted to the buffer 293 side can be reflected on a surface of the silicon substrate 292 so as to be emitted into the air with a phase identical to a phase of the light diffracted to the upward direction. As a result, the amount of light to be emitted into the air is increased and hence the coupling efficiency is improved.

However, in a grating coupler using a silicon substrate as described above, due to reflection and absorption conducted by the substrate with respect to ultraviolet rays, the ultraviolet rays cannot be penetrated from a rear side of the silicon substrate into the side of the optical waveguide film. Consequently, the method above in which a UV-setting resin is employed as a material to form the grating and the optical waveguide layer cannot be adopted to manufacture the grating coupler.

Next, in the following description of a 40th embodiment of a grating element according to the present invention, a UV-setting resin is used to produce the grating element to develop a high coupling efficiency.

Figure 104:
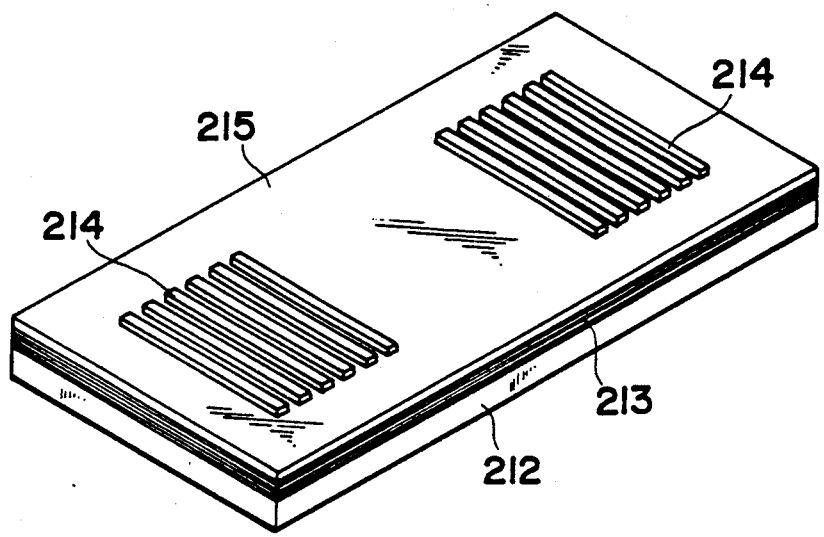
FIG. 104 is a perspective view showing a grating coupler in a 40th embodiment according to the present invention.
Figure 105:
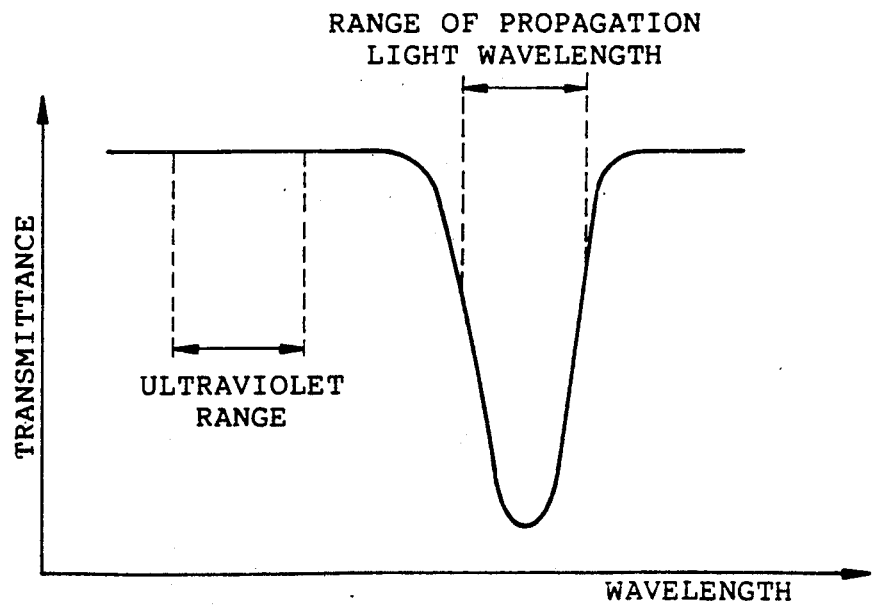
FIG. 105 is a graph showing a characteristic of a dielectric multi-layer filter employed in the grating coupler.

FIG. 104 shows a 40th embodiment of a grating coupler according to the present invention. This coupler includes a glass substrate 212 and a multi-layer dielectric filter 213 formed thereon as a wavelength selective transmitting film. On the filter 213, there is formed an optical waveguide layer 215 having gratings 214 fabricated with a UV-setting resin. The multi-film dielectric filter 213 passes therethrough an ultraviolet ray and reflects lights in and near a wavelength range of a propagation light passing through the waveguide layer 215. FIG. 105 shows an example of characteristics of the multi-layer dielectric filter 213, namely, a band-stop characteristic thereof in the wavelength region of a propagation light. The filter 213 may be formed to develop a band-pass characteristic in an ultraviolet region. By using the filter 213 having a band-pass characteristic in the ultraviolet region or a band-stop characteristic in the propagation light region, it is possible to irradiate an ultraviolet ray also from the side of the glass substrate 212 onto an optical waveguide layer 215 via the glass substrate and the multi-layer dielectric filter 213. Moreover, since a light propagated through the optical waveguide layer 215 is reflected on a surface of the filter 213, the grating 214 develops a high emission efficiency.

Figure 106:
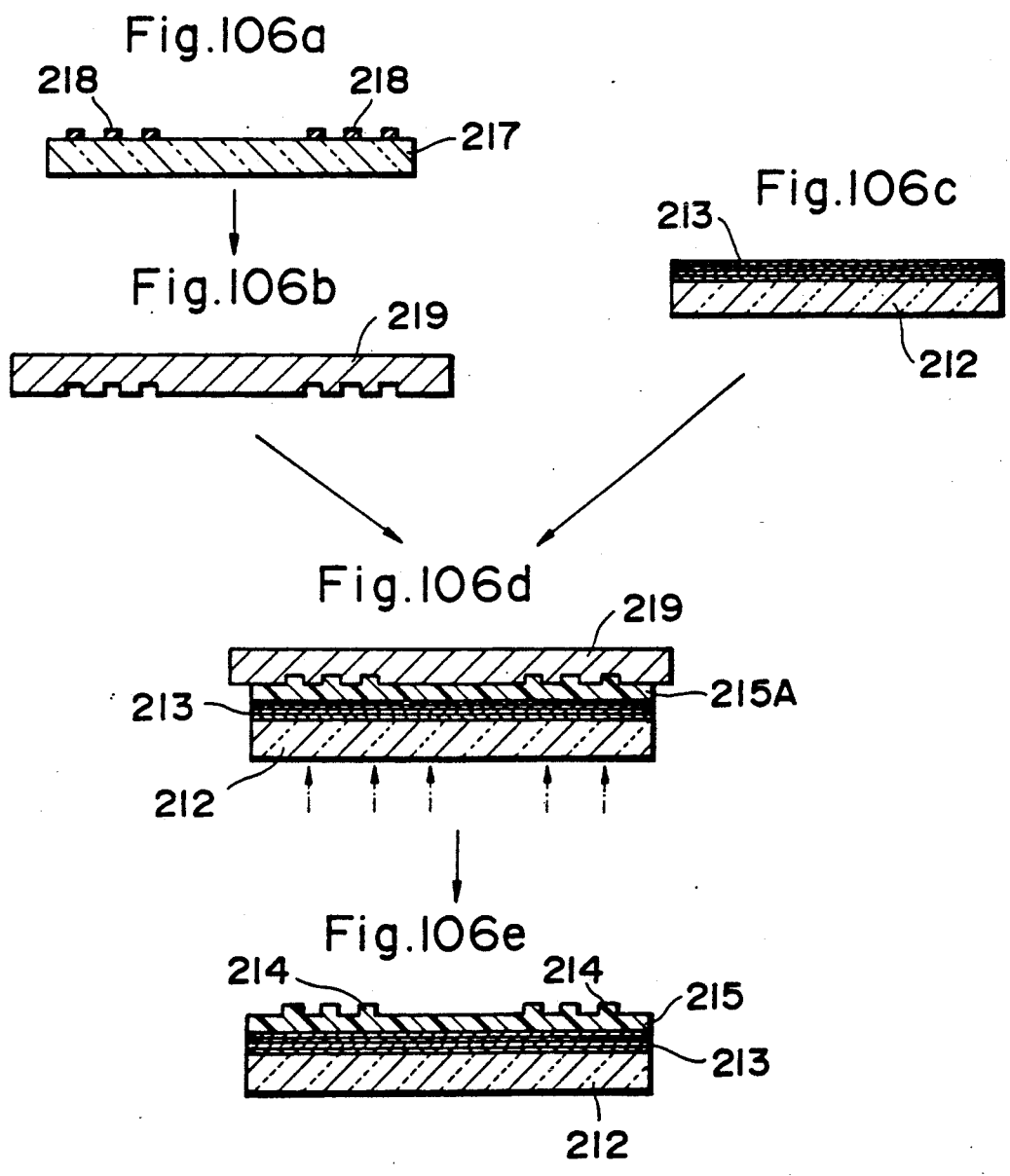
FIGS. 106a to 106e are cross-sectional views showing a method of manufacturing a grating coupler.

FIGS. 106a to 106e show a method of producing the grating coupler above. FIG. 106a shows a process of manufacturing a mother board of the grating coupler. On a glass substrate 217, a grating pattern is formed with an electron beam resist 218 in an electron beam writing method. Using the mother board, a nickel stamper 219 is created in an electroforming method as shown in FIG. 106b. A multi-layer dielectric filter 213 having the characteristic above is formed as shown in FIG. 106c on the glass substrate 212 by use of an evaporation method. The glass substrate 212 on which the filter 213 has been formed is placed as shown in FIG. 106d to oppose the stamper 219 with a small gap therebetween. A UV-setting resin 215A to be solidified is injected in the gap therebetween. An ultraviolet ray is irradiated from the side of the glass substrate 212 to pas through the glass substrate and the filter 213 so as to reach the UV-setting resin 215A. The resin 215 is resultantly becomes to be stiff, thereby forming gratings 214 and an optical waveguide layer 215. Finally, as shown in FIG. 106e, the stamper 219 is peeled off to obtain the grating coupler.

Figure 107:
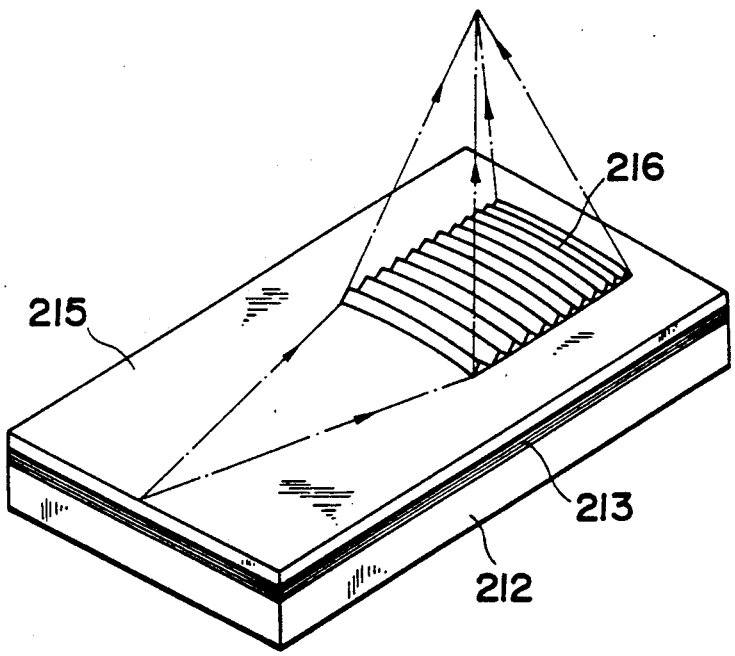
FIG. 107 is a perspective view showing a 41st embodiment of a waveguide device according to the present invention.

The grating element according to the present inventon is not necessarily limited to the grating coupler above. For example, there may be fabricated a focusing grating coupler as a 41st embodiment of FIG. 107 in accordance with the present invention.

The focusing grating coupler also includes a glass substrate 212 and a multi-layer dielectric filter 213 formed thereon such that an optical waveguide layer 215 of a UV-setting resin is fabricated thereon to form a grating 216. This filter 213 may also develop, for example, like the filter described above a band-pass characteristic in the ultraviolet region or a band-stop characteristic in the wavelength region of a propagation light. In this coupler, a light propagated through the optical waveguide layer 215 is emitted from the grating 216 into the air to be focused therein. Furthermore, the focusing grating coupler is produced also in the same fashion as for the embodiment above.

In the 41st embodiment, although a multi-film dielectric filter is manufactured on a surface of a glass surface to obtain a wavelength selective layer, it may also be possible that the substrate itself has a characteristic to pass therethrough an ultraviolet ray and to reflects on a surface thereof lights in a wavelength region of a propagation light. Moreover, a buffer layer of a silicon oxide may be disposed on a lower surface of the optical waveguide layer.

Finally, a description will be given of an optical element and a method of manufacturing the same which achieves operations such as waveguide, branching, diffraction, coupling, reflection, and scattering of lights.

FIGS. 108a to 108e show an example of a process of manufacturing a grating coupler (an optical device).

Figure 108A:
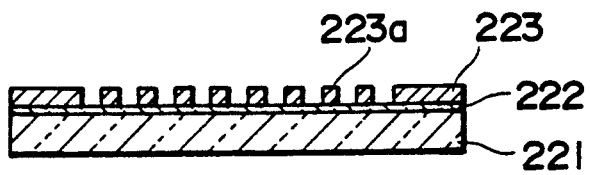
FIGS. 108a to 108e are cross-sectional views showing an example of a method of manufacturing a grating coupler.

A master of an objective grating coupler is first produced in an electron beam lithography. On an SiO₂ substrate 221, there is formed an ITO film 222 preventing a charge-up phenomenon such that an electron beam resist 223 is applied onto the ITO film 222. A grating pattern is drawn on the resist film 223 in an electron beam writing method. Thereafter, the resist film 223 is developed to obtain a master including a remaining resist film 223 having a grating pattern 223a on the SiO₂ substrate 221 (FIG. 108a).

Figure 108B:
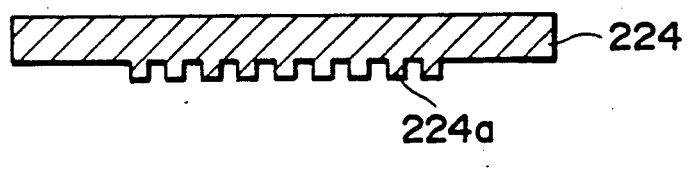

Subsequently, a nickel film is formed on the master in an electroforming method. The master is removed to attain a nickel stamper 224 on which a grating pattern 224a is formed (FIG. 108b).

Figure 108C:
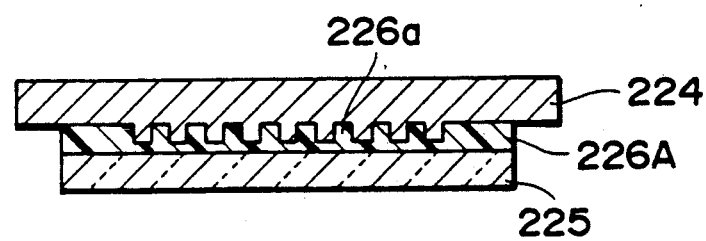

Next, a UV-setting resin 226A as a material of an optical waveguide film is injected between the substrate 225 and the nickel stamper 224. The substrate 225 and the stamper 224 are depressed against each other to set a gap therebetween to a predetermined value. If necessary, a vibration is applied in this step. An ultraviolet ray is irradiated from a rear surface of the substrate 225 to solidify the resin 226A (FIG. 108c).

After the resin 226A is solidified, the stamper 224 is removed, thereby producing with a UV-setting resin 226A a UV-setting resin forming layer (an optical element forming layer) 226 having a grating pattern 226a. In order to set an attractive force between the stamper 224 and the resin 226A to be less than an attractive force between the resin 226A and the substrate 225, considerations are given to, for example, a combination of the UV-setting resin 226A, the stamper 224, and the substrate 225.

Figure 108D:
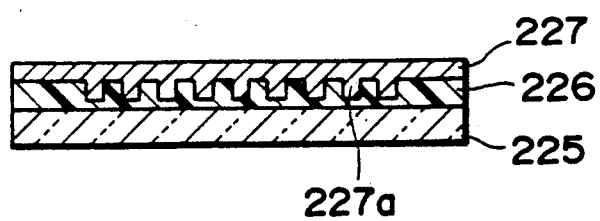

Thereafter, an optical substance such as ZnO or ZnS is accumulated on the optical element forming layer 226 to fabricate an optical waveguide layer (optical element layer) 227 having a grating 227a thereon (FIG. 108d).

As a result, there is attained an optical waveguide layer 227 including a grating coupler formed thereon.

In the process of manufacturing the optical waveguide layer 227, the surface thereof may possibly be formed to be flat by accumulating the optical material thereon by use of a bias sputtering method (reference is to be made, for example, to "Study Of Planarized Sputter-Deposited SiO₂" written by C. Y. Ting, V. J. Vivalda, and H. G. Schaeter in page 1105 of J. Vac. Sci. Tech.,15 (3) (1978) and to "SiO₂ Planarization By Two-Step rf Bias-Sputtering" written by T. Mogami, M. Morimoto, H. Okabayashi, and E. Nagasawa in page 857 of J. Vac. Sci. Tech. B 3 (3) (1985).

Figure 108E:
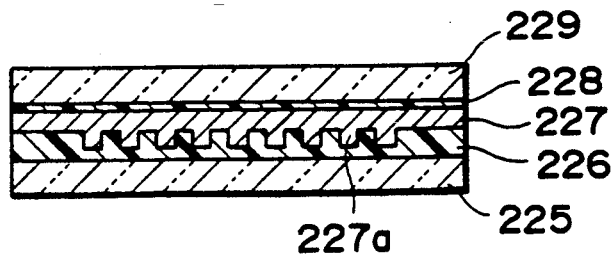

Furthermore, when necessary, an SiO₂ substrate is fixed onto the optical waveguide film 227 by use of a UV-setting resin 228 (FIG. 108e).

In general, since the materials such as ZnO and ZnS have a larger refractive index as compared with the UV-setting resin, the light is propagated through the optical waveguide layer 227. A light fed via the grating 227a to the waveguide layer 227 may be supplied either from the substrate 225 or the substrate 229. This is also the case of a light which is emitted from the waveguide layer 227 via the grating 227a.

By disposing the substrates 225 and 229 respectively on the sides of the waveguide layer 227, the optical waveguide layer 227 can be protected.

Furthermore, in order to expose a surface of the optical waveguide layer 227 on the side of the grating 227a, the SiO₂ substrate 225 and the UV-setting resin forming layer 226 may be peeled off from the optical waveguide layer 227. In this case, in order to set an attractive force between the UV-setting resin forming layer 226 and the waveguide layer 227 to be smaller than an attractive force between the UV-setting resin fixing layer 228 and the waveguide layer 227, considerations are given to a combination of the UV-setting resin forming layers 226 and 228 and the optical waveguide layer 227.

In place of the UV-setting resin, there may be adopted a thermosetting substance, for example. As a thermosetting inorganic material, a material such as a coating liquid forming a thermosetting film may be used. Of many kinds of coating liquids above, there may be favorably employed coating liquids which contain such a material forming a film under a heating process as $ZrO_2$, $TiO_2$, $Al_2O_3$, or $SiO_2$. Moreover, in place of the UV-setting material, nonlinear organic and inorganic optical substances including MNA (refractive index=1.8), PTS (refractive index=1.88), and KDP ($KH_2PO_4$) may also be utilized.

Figure 109:
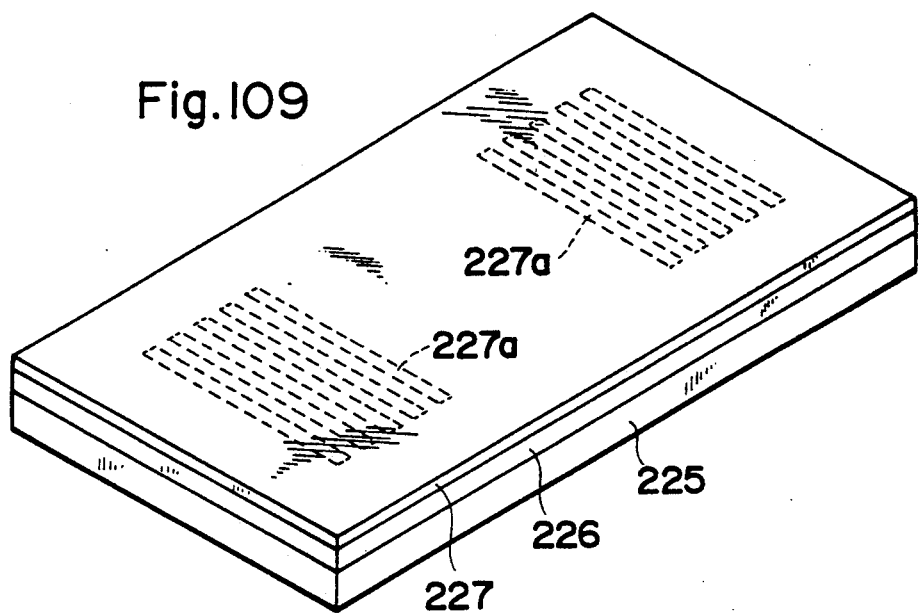
FIGS. 109 to 111 are perspective views showing examples of a grating ooupler manufactured in accordance with the manufacturing method above.
Figure 110:
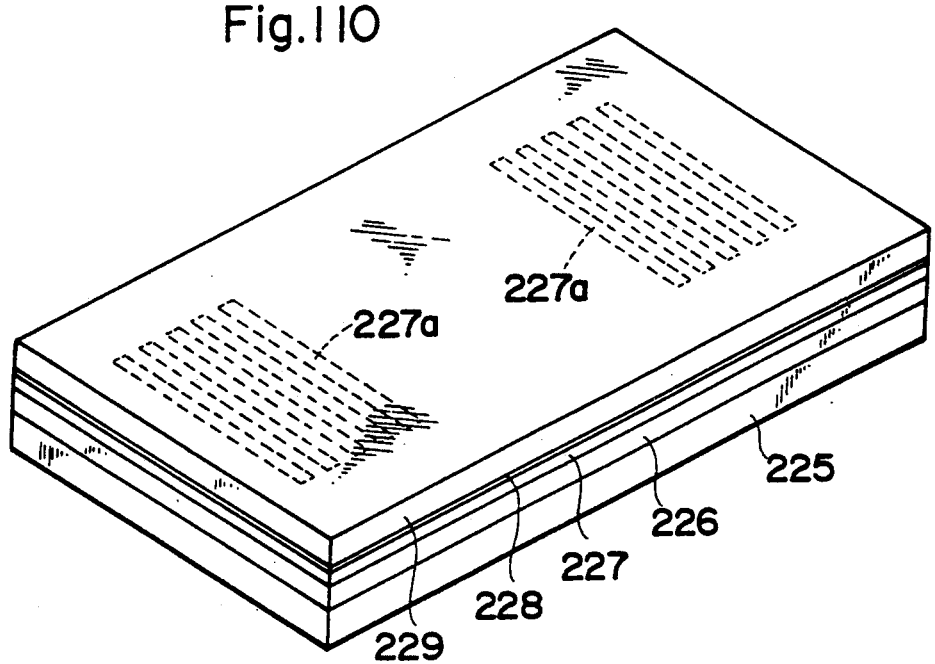
Figure 111:
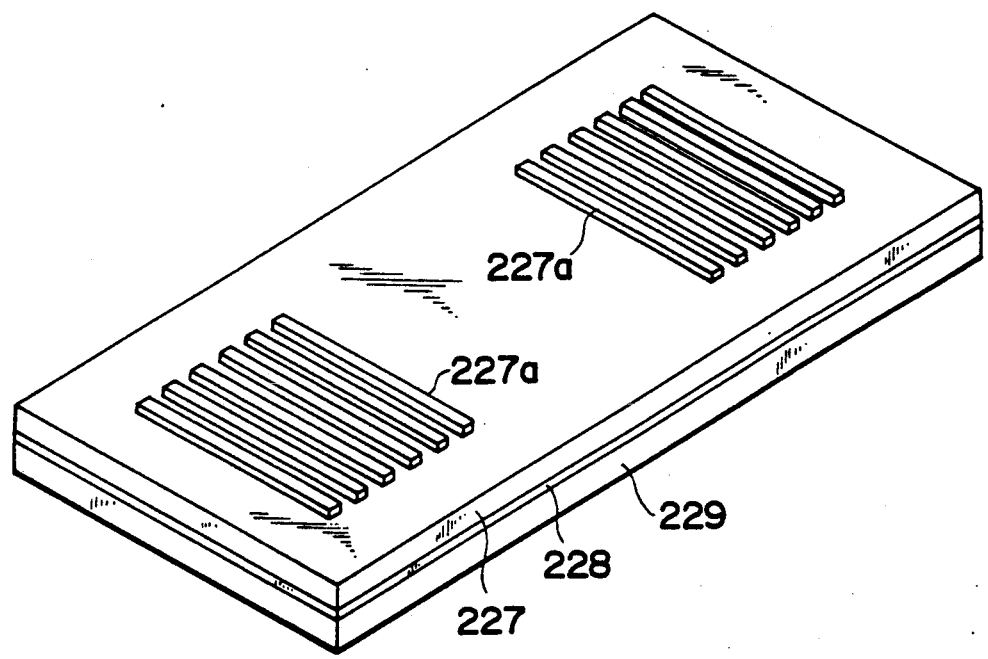

FIGS. 109 to 111 are perspective views showing grating couplers manufactured in the method above.

In a grating coupler of FIG. 109, an optical waveguide layer 227 having a gratings 227a is formed via a UV-setting resin forming layer 226 on a $SiO_2$ substrate 225. This grating coupler can be produced through the process of FIGS. 108a to 108d.

In a grating coupler of FIG. 110, on the waveguide layer 227 of the grating coupler of FIG. 109, an $SiO_2$ substrate 229 is disposed via a UV-setting resin fixing layer 228. This grating coupler can be produced through the process of FIGS. 108a to 108e.

A grating coupler of FIG. 111 is implemented by removing, rom the grating coupler of FIG. 110, the $SiO_2$ substrate 225 and the UV-setting resin forming layer 226. As a result, the optical waveguide layer 227 is exposed to the air having a refractive index smaller than a refractive index of the optical waveguide layer 227. Consequently, the grating coupler is provided with a large refractive index difference.

Figure 112:
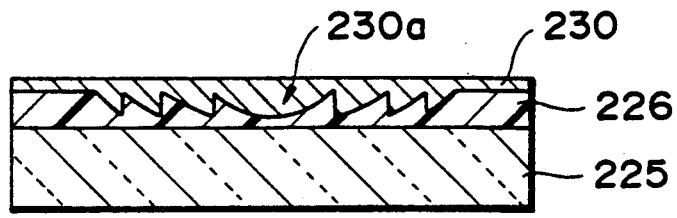
FIGS. 112 to 114 are cross-sectional views showing examples of a micro Fresnel lens produced in the manufacturing method above.
Figure 113:
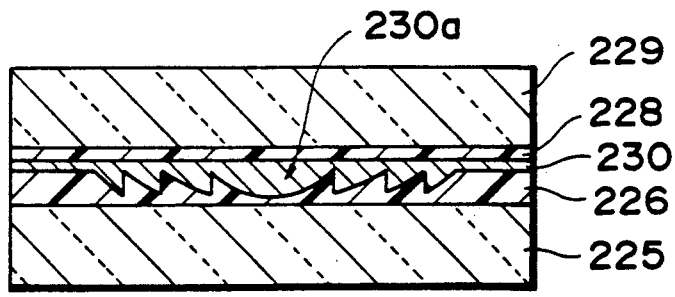
Figure 114:
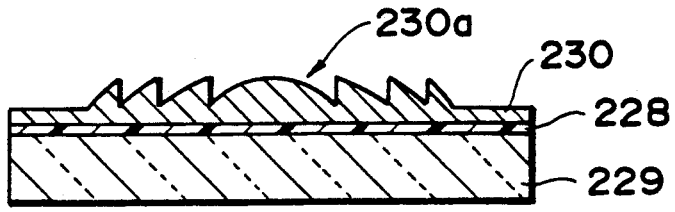
Figure 115:
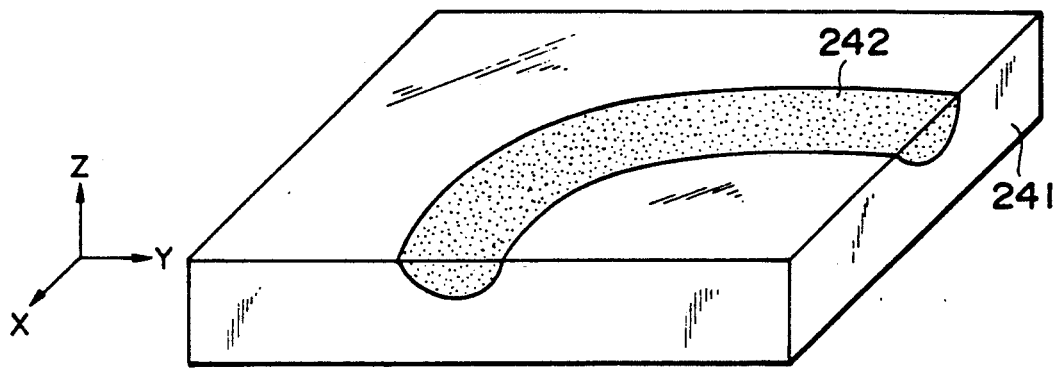
FIG. 115 is a perspective view showing an example of the conventional corner-bent optical waveguide.
Figure 116:
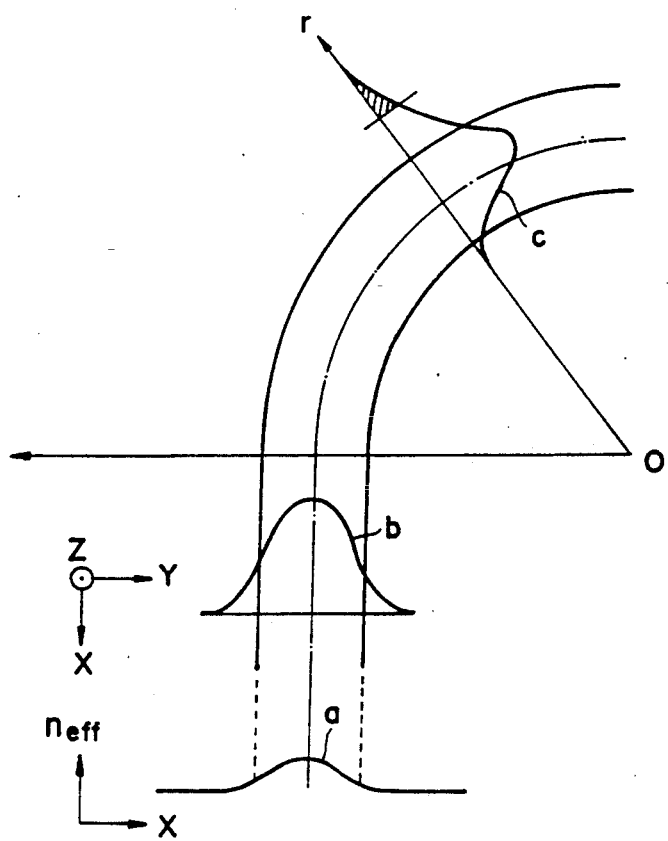
FIG. 116 is a graph showing a field distribution in the conventional waveguide.
Figure 117:
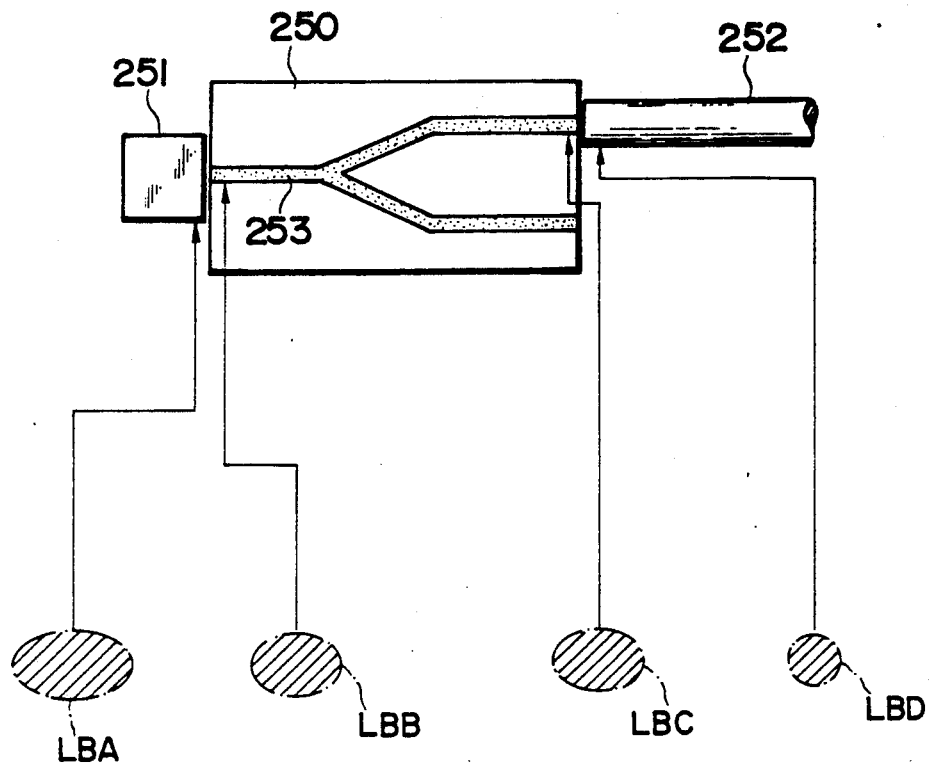
FIG. 117 is a diagram including a plan view shwoing an example in which a conventional Ti-diffusion LiNbO$_3$ waveguide is adopted to optically couple a laser diode with an optical fiber and a cross-sectional view of a beam of propagation lights thereof.

FIGS. 112 to 114 show cross sections of a micro Fresnel lens.

In the micro Fresnel lens of FIG. 112, a micro Fresnel lens layer 230 having a micro Fresnel lens pattern 230a is fabricated on an $SiO_2$ substrate 225 via a UV-setting resin forming layer 226. When producing this lens, a nickel stamper having the micro Frenel lens pattern is first manufactured in the process of FIGS. 108a and 108b. Thereafter, a manufacturing process similar to the process of FIGS. 108a to 108d is conducted by use of the nickel stamper to create the micro Fresnel lens.

In a micro Fresnel lens of FIG. 113, an $SiO_2$ substrate 229 is further disposed on the micro Fresnel lens layer 230 of FIG. 112 via a UV-setting resin fixing layer 228. For a production of this lens, a micro Fresnel lens of FIG. 112 is first formed and then an $SiO_2$ substrate 229 is fixed thereon by use of a UV-setting resin fixing layer 228. The obtained lens has flat surfaces, which hence facilitate handling thereof. Moreover, the $SiO_2$ substrates 225 and 229 protect the micro Fresnel lens layer 230.

A micro Fresnel lens of FIG. 114 is implemented by removing, from the lens of FIG. 113, the $SiO_2$ substrate 225 and the UV-setting resin forming layer 226. In this structure, since the micro Frenel lens layer 230 is exposed to the air, the thickness of the layer 230 can be reduced.

The production method above may be used to manufacture a three-focus focusing grating coupler, which may also be applicable to an optical pickup for an optomagnetic disk (reference is to be made to the foregoing material of Sunagawa, et al.)

While particular embodiments of the invention have been shown and described, it will be obvious to those skilled in the art that various changes and modifications may be made without departing from the present invention in its broader aspects.

What is claimed is:

1. A rib-type branching optical waveguide comprising:
   a first rib section forming a basic optical waveguide; and
   at least two second rib sections respectively forming branch optical waveguides branching from said basic optical waveguide, said second rib sections branching from said first rib section wherein
   in a section where said first and second rib sections are connected to each other, at least either a center portion of said first rib section or an inner portion of each of said second rib sections has a smaller thickness than the remaining portion thereof.

2. An optical waveguide as in claim 1, wherein said center portion of said first rib section has a smaller thickness than a remaining portion of said first rib section.

3. An optical waveguide as a in claim 1, wherein an inner portion of each of said second rib sections has a smaller thickness than a remaining portion of each of said second rib sections.

4. An optical waveguide as in claim 1, wherein said center portion of said first rib section has a smaller thickness than a remaining portion of said first rib section, and an inner portion of each of said second rib sections has a smaller thickness than a remaining portion of each of said second rib sections.

5. An optical waveguide as in claim 2, wherein each of said second rib sections has a respective inner wall, the inner walls of said second rib sections meeting at a branch point, said smaller thickness center portion of said first rib section forming an extension from said branch point in a direction of said first rib section.

6. An optical waveguide as in claim 5, wherein said smaller thickness center portion of said first rib section forms a recess of rectangular contour in plan view.

7. An optical waveguide as in claim 5, wherein said smaller thickness center portions of said first rib section forms a recess of triangular contour in plan view.

8. An optical waveguide as in claim 4, wherein said smaller-thickness portions of said first rib section and of said second rib sections form a Y-shape recess in said first and second rib sections.

9. An optical waveguide as in claim 3, wherein said smaller thickness portion of each of said second rib sections has a substantially rectangular contour in plan view.

10. An optical waveguide as in claim 3, wherein each of said second rib sections has an inner wall, the inner wall of said second rib sections meeting at a branch point, and the smaller thickness portion of each of said second rib sections has a substantially triangular contour in plan view which becomes narrower in width in the direction from said branch point toward the end of a respective second rib section.

11. An optical waveguide as in claim 4, wherein the smaller thickness portions of said first rib section and of said second rib sections form a recess having a contour in plan view of two triangle contours centered on a light propagation direction of said first rib section.

12. An optical waveguide as in claim 4, wherein the smaller thickness portions of said first rib section and of said second rib sections form a recess having a contour in plan view of a respective rectangle contour in each of said first and second rib sections.

13. An optical waveguide as in claim 4, wherein the smaller thickness portions of said first rib section and of said second rib sections form a recess having a contour in plan view of a rectangle contour in said first rib section and a respective triangular contour in each of said second rib sections.

14. An optical waveguide as in claim 4, wherein the smaller thickness portions of said first rib section and of said second rib sections form a recess having a contour in plan view of a respective triangle contour in each of said first and second rib sections and a trapezoid contour in said first rib section.

15. An optical waveguide as in claim 1, wherein said smaller thickness portion of at least said first rib section or said second rib sections has a cross-sectional shape along a line which passes through the longitudinal center of the first rib section, said cross-sectional shape having a rectangular contour.

16. An optical waveguide as in claim 4, wherein said smaller thickness portion of at least said first rib section or said second rib sections has a cross-sectional shape along a line which passes through the longitudinal center of the first rib section, said cross-sectional shape having a triangle contour which has an increasing depth approaching a branch point where the inner walls of said second rib sections intersect.

17. An optical waveguide as in claim 1, wherein said smaller thickness portion of at least said first rib section or said second rib sections has a cross-sectional shape along a line which passes through the longitudinal center of the first rib section, said cross-sectional shape having a pentagon profile.

18. An optical waveguide as in claim 1, wherein said smaller thickness portion of at least said first rib section or said second rib sections has a cross-sectional shape along a line which passes through the longitudinal center of the first rib section, said cross-sectional shape having a triangle contour with the vertex of said triangle contour being on said substrate.

19. An optical waveguide as in claim 1, wherein said smaller thickness portion of at least said first rib section or said second rib sections has a cross-sectional shape along a line which passes through the longitudinal center of the first rib section, said cross-sectional shape having a pentagon contour with the vertex of said pentagon contour being on said substrate.

20. An optical waveguide as in claim 2, wherein said first rib section has a rectangular cross-sectional shape and the smaller thickness portion of said first rib section forms a recess having a cross-section in the width direction of said first rib section which is of rectangular shape.

21. An optical waveguide as in claim 2, wherein said first rib section has a rectangular cross-sectional shape and the smaller thickness portion of said first rib section forms a recess having a cross-section in the width direction of said first rib section which is of rectangular shape.

22. An optical waveguide as in claim 2, wherein said first rib section has a rectangular cross-sectional shape and the smaller thickness portion of said first rib section forms a recess having a cross-section in the width direction of said first rib section which is of spherical groove shape.

23. An optical waveguide as in claim 2, wherein said first rib section has a rounded corner trapezoidal cross-sectional shape and the smaller thickness portion of said first rib section forms a recess having a cross-section in the width direction of said first rib section which is of a rounded groove shape.

24. An optical waveguide as in claim 3, wherein the smaller thickness portions of each of said second rib sections form respective recesses in said second rib sections and each of said second rib sections has a cross-section shape at a portion of said second rib sections which includes the respective recess, which is in a stair shape.

25. An optical waveguide as in claim 3, wherein the smaller thickness portions of each of said second rib sections form respective recesses in said second rib sections and each of said second rib sections has a cross-section shape at a portion of said second rib sections which includes the respective recess, which is in a shape of a rectangle with an inclined surface.

26. An optical waveguide as in claim 3, wherein the smaller thickness portions of each of said second rib sections form respective recesses in said second rib sections and each of said second rib sections has a cross-section shape at a portion of said second rib sections which includes the respective recess, which is in a shape of a rectangle with a rounded inner portion.

27. An optical waveguide as in claim 1, wherein the smaller thickness portions form a recess in at least either said first rib section or in said second rib sections, said recess being asymmetrical positioned width-wise of a longitudinal center line of said first rib section.

28. An optical waveguide as in claim 27, wherein said recess has a rectangular contour width-wise cross-sectional shape.

29. An optical waveguide as in claim 27, wherein said recess has a width-wise cross-sectional shape in the form of a V.

30. An optical waveguide as in claim 27, wherein a portion of said recess is provided in each of said second rib sections and is asymmetrical provided in said second rib sections with respect to a longitudinal center line of said first rib section.

31. An optical waveguide as in claim 29, wherein said recess has an asymmetrical stair shaped cross-sectional contour in said second rib sections.

32. An optical waveguide as in claim 29, wherein said recess has an asymmetrical inclined inner side contour in said second rib sections.

33. An optical waveguide as in claim 1, further comprising a third rib section connected to said first rib section.

34. An optical waveguide as in claim 32, wherein an outer portion of said third rib section has a smaller thickness than a remaining portion of said third rib section.

35. A rib-type corner-bent optical waveguide comprising:
a substrate; and
a core layer formed on said substrate and having a raised rib section, said rib section being raised in a thickness direction of said core layer and including a bent section which has a radially outer portion and a radially inner portion, said radially inner portion of said bent section having a larger dimension in said thickness direction than said radially outer portion of said bent section.

36. An optical waveguide as in claim 35, wherein said rib section has at least one straight section connected to said bent section, said straight section having an end portion of rectangular cross-sectional shape, the cross-sectional shape of said straight section gradually changing along its length from said rectangular cross-sectional shape to a cross-sectional contour of said bent section.

37. An optical waveguide as in claim 35, wherein said bent section has a trapezoidal cross-sectional contour.

38. An optical waveguide as in claim 35, wherein said bent section has a triangular cross-sectional contour.

39. An optical waveguide as in claim 35, wherein said bent section has a semi-quadrant cross-sectional contour.

40. An optical waveguide as in claim 35, wherein said bent section has a generally triangular cross-sectional contour with a convex upper edge.

41. An optical waveguide as in claim 35, wherein said bent section has a generally trapezoidal cross-sectional shape with a convex upper edge.

42. An optical waveguide as in claim 35, wherein said bent section has a generally rectangular contour with a concave upper edge.

43. An optical waveguide as in claim 35, wherein said bent section has a generally trapezoidal contour with a concave upper edge.

44. An optical waveguide as in claim 35, wherein said bent section has a stair shape contour.

45. An optical waveguide as in claim 35, wherein said bent section has a stair shaped contour with a inclined edge at an intermediate point.

46. An optical waveguide as in claim 35, wherein said bent section has a generally triangular contour with rounded corners.

47. An optical waveguide as in claim 36, wherein said rib section has a constant outer thickness and an inner thickness which successively increases form said straight section to said curved section.

48. An optical waveguide as in claim 36, wherein said rib section has a constant inner thickness and a outer thickness which successively decreases from said straight section to said curved section.

49. An optical waveguide as in claim 36, wherein an inner thickness of said rib section continuously decreases and an outer thickness of said rib section continually decreases from said straight section to said curved section.

50. A beam contour conversion device comprising:
a substrate; and
a core layer formed on said substrate, said core layer including a rib section wherein
said rib section is formed, in order to convert a beam contour of a propagation light into a predetermined shape, to have a cross-sectional contour which is continuously varied along a longitudinal direction of the rib section.

51. A beam contour conversion device as in claim 50, wherein said rib section has a rectangular cross-sectional contour which has a continuously increasing width from one end of said rib section to another.

52. A beam contour conversion device as in claim 50, wherein said rib section has a rectangular cross-sectional contour at one end of said rib section and a trapezoidal cross-sectional contour at another end of said rib section.

53. A beam contour conversion device as in claim 50, wherein said rib section has a rectangular cross-sectional contour, said core layer and rib section having respective heights which continuously increase from one end of said core layer and rib section to another.

54. A beam contour conversion device as in claim 52, wherein a width of said rib section also continuously increases from said one end of said rib section to said another end of said rib section.

55. A beam contour conversion device as in claim 50, further comprising a light source providing a light beam of a first cross-sectional shape to one input side of said core layer beneath said rib section, and a light receiver for optically receiving a light beam of a second cross-sectional shape and optically coupled to an output side of said core layer beneath said rib section, said core layer and rib section being configured to accept a light beam having first cross-sectional shape at said input side and providing a light beam of said second cross-sectional shape at said output side to said light receiver.

56. A beam contour conversion device as in claim 54, wherein said rib section includes a first rib section and a plurality of second rib sections branching off said first rib section, said input side being at either said first rib section or at least one of said second rib sections, said output side being at the other of said first rib section or at least one of said second rib sections.

57. A rib optical waveguide comprising:
a substrate; and
a core layer formed on said substrate, said core layer including a rib section,
said core layer being formed with a liquid material which is solidified under an energy irradiation,
said rib section including at a predetermined position thereof a grating which is integral with said rib section, said grating being formed by a periodically altered thickness of said rib section.

58. A rib optical waveguide in accordance with claim 57 wherein said grating is formed by periodically altering a a width of said rib section.

59. A rib optical waveguide according to claim 57 wherein said grating is blazed.

60. A rib optical waveguide according to claim 57, wherein said thickness of said rib section has a rectangular contour in the direction of the length of said rib section which periodically alternates between two thickness values.

61. A rib optical waveguide according to claim 58, wherein said width of said rib section has a rectangular contour which periodically alternates between two width values.

62. A rib optical wave guide according to claim 57, wherein said thickness of said rib section has a semi-circle contour in the direction of the length of said rib section.

63. A rib optical wave guide according to claim 57, wherein said thickness of said rib section has a triangle contour in the direction of the length of said rib section.

64. A rib optical wave guide according to claim 57, wherein said thickness of said rib section has a generally rectangular contour with rounded corners in the direction of the length of said rib section.

65. A rib optical wave guide according to claim 57, wherein said thickness of said rib section has a generally rectangular contour with a depressed grooved at the center thereof in the direction of the length of said rib section.

66. A rib optical wave guide according to claim 57, wherein said thickness of said rib section has a generally rectangular contour with a projected band at the center thereof in the direction of the length of said rib section.

67. A rib optical waveguide according to claim 57, wherein said rib section includes a first rib section and a pair of second rib sections connected to said first rib section, at least one of said first and second rib sections containing said grating.

68. A rib optical waveguide according to claim 67, wherein said grating is formed in one of said second rib sections and functions as a light reflector, said optical waveguide having a first light beam input/output at an end of said core layer beneath and corresponding to an end of said first rib section, and a second light beam input/output at an end of said core beneath and corresponding to an end of the other of said second rib sections, the end of said other second rib section facing a mirror, said optical waveguide receiving an input light beam at said first input/output, passing it through said first rib section to said pair of second rib sections, whereupon said light beam is reflected back to said first input/output by said grating in said one second rib section and is passed through said other second rib section to said second input/output and from there to said mirror, which reflects said light beam back to said second input/output, said light beam after reflection by said mirror returning to said first input/output through said other second rib section and said first rib section.

69. A rib optical waveguide according to claim 68, wherein said waveguide is used in a displacement sensor, said mirror being mounted on an object, the displacement of which is to be measured, the reflected light beams from said grating and mirror being representative of object displacement.

70. A three-dimensional optical circuit comprising:
a substrate; and
a plurality of core layers, each including a rib section, arranged said substrate, said plurality of core layers being spatiality separated in a direction normal to an upper surface of said substrate to provide a three-dimensional array of said plurality of core layers.

71. An optical circuit as in claim 70, wherein at least two of said core layers are at least partly superimposed over said substrate.

72. An optical circuit as in claim 71, wherein said at least two core layers are coextensively superimposed over said substrate.

73. An optical circuit as in claim 71, wherein said at least two core layers are not coextensive over said substrate.

74. An optical circuit as in claim 70, wherein clad layers are provided between said core layers, said core layers and clad layers alternating.

75. An optical circuit as in claim 70, wherein a buffer layer is provided between said substrate and said plurality of core layers.

76. An optical circuit as in claim 74, wherein at least one of said core layers is buried within a clad layer, said at least one buried core layer having exposed light beam input/output surfaces.

77. An optical circuit as in claim 71, wherein rib sections from one core layer spatially intersect with rib sections from another core layer.

78. An optical circuit as in claim 76, wherein at least one of the spatially intersecting rib sections is a curved rib section.

79. An optical circuit as in claim 70, wherein one of said plurality of core layers is an upper core layer and another of said plurality of core layers is a lower core layer, each of said upper and lower core layers terminating at an intermediate point of a length of said substrate and having terminating end surfaces, each of the terminating end surfaces of said upper and lower core layers having an inclined surface at which a reflection mirror is formed, the reflection mirrors of said upper and lower core layers being in optical communication with each other so that a light beam passing through one of the upper and lower core layers can be transmitted to the other of the upper and lower core layers.

80. An optical circuit as in claim 79, further comprising a concave lens arranged between said reflection mirrors.

81. An optical circuit as in claim 71, wherein one of said at least two core layers includes at least one portion thereof which is closer to the other of said at least two core layers than other portions of said one core layer.

82. An optical circuit as in claim 81, wherein said at least one portion is at an inner portion of said optical circuit.

83. An optical circuit as in claim 81, wherein a portion of a light beam passing through said one core layer enters said other core layer at said at least one portion.

84. An optical circuit as in claim 70, wherein at least one of said core layers includes at least two separate rib sections and said optical circuit further comprises means for selectively passing at least a portion of a light passing through one of said separate rib sections into the other of said separate rib sections.

85. An optical circuit as in claim 84, wherein at least respective portions of each of said two separate rib sections are in proximity to each other and said means for selectively passing comprises means for selectively optically coupling said respective portions.

86. An optical circuit as in claim 85, wherein said means for optically coupling includes means for selectively heating at least one of said respective portions.

87. An optical circuit as in claim 70, further comprising means for selectively optically coupling a rib section from one of said core layers to a rib section of another of said core layers.

88. An optical circuit as in claim 87, wherein a portion of a rib section of said core layer is disposed in proximity to a portion of a rib section from another core layer, and said optically coupling means includes means for selectively heating at least one of said proximate portions of said rib sections.

89. A rib optical waveguide comprising:
a substrate; and
a core layer formed on said substrate, said core layer including a rib section,
said core layer being formed on at least two surfaces of said substrate.

90. An optical waveguide as in claim 89, wherein said at least two surfaces includes opposite surfaces of said substrate.

91. An optical waveguide as in claim 90, wherein said at least two surfaces further includes a third side surface of said substrate.

92. An optical waveguide as in claim 89, wherein said at least two surfaces includes at least two adjacent surfaces of said substrate.

93. An optical waveguide as in claim 89, wherein the rib sections of said core layers on said at least two surfaces extend in the same direction.

94. An optical waveguide as in claim 89, wherein the rib sections of said core layers on said at least two surfaces extend in orthogonal directions.

95. An optical waveguide as in claim 91, wherein the rib sections of said core layers on said at least two surfaces extend in the same direction.

96. An optical waveguide as in claim 92, wherein the rib sections of said core layers on said at least two surfaces extend in the same direction.

97. An optical waveguide as in claim 89, wherein a plurality of core layers are formed on respective side surfaces of said substrate, the rib sections of said core layers surrounding said substrate, the corners of the rib sections at the side corners of said substrate being recessed to form a surface, at least one of the surfaces serving as an input/output area for a light beam.

98. An optical waveguide as in claim 89, wherein said substrate has an expanding cross-sectional contour from one side to another and said core layers and associated rib sections extend in the direction of the expansion.

99. An optical waveguide as in claim 98, wherein said substrate has the form of a quadrangular pyramid and said core layers are formed on four side surfaces thereof.

* * * * *